United States Patent
Fan et al.

(10) Patent No.: US 11,991,358 B2
(45) Date of Patent: May 21, 2024

(54) INDICATION OF MULTIPLE TRANSFORM MATRICES IN CODED VIDEO

(71) Applicants: Beijing Bytedance Network Technology Co., Ltd., Beijing (CN); Bytedance Inc., Los Angeles, CA (US)

(72) Inventors: Kui Fan, San Diego, CA (US); Kai Zhang, San Diego, CA (US); Li Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/994,856

(22) Filed: Nov. 28, 2022

(65) Prior Publication Data

US 2023/0269374 A1 Aug. 24, 2023

Related U.S. Application Data

(63) Continuation of application No. PCT/CN2021/095390, filed on May 24, 2021.

(30) Foreign Application Priority Data

May 27, 2020 (WO) ............... PCT/CN2020/092592

(51) Int. Cl.
*H04N 19/12* (2014.01)
*H04N 19/124* (2014.01)
(Continued)

(52) U.S. Cl.
CPC ........... *H04N 19/12* (2014.11); *H04N 19/124* (2014.11); *H04N 19/129* (2014.11); *H04N 19/176* (2014.11); *H04N 19/18* (2014.11)

(58) Field of Classification Search
CPC ...... H04N 19/176; H04N 19/70; H04N 19/61; H04N 19/18; H04N 19/124; H04N 19/159;
(Continued)

(56) References Cited

U.S. PATENT DOCUMENTS

2020/0128249 A1  4/2020  Karczewicz et al.
2020/0322636 A1*  10/2020  Egilmez ................ H04N 19/91

FOREIGN PATENT DOCUMENTS

CN  110546952 A  12/2019
WO  2020009556 A1  1/2020
(Continued)

OTHER PUBLICATIONS

Document: JVET-M0102-v5, De-Luxan-Hernandez, S., et al., "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 9 pages.
(Continued)

*Primary Examiner* — Farhan Mahmud
(74) *Attorney, Agent, or Firm* — Conley Rose, P.C.

(57) ABSTRACT

Devices, systems and methods for digital video coding, which includes methods for transform design, are described. In a representative aspect, a method of video processing includes performing a conversion between a current video block of a video and a bitstream of the video based on a rule, wherein the rule specifies that a selection of a transform matrix set for performing a transform operation during the conversion is based on a low-frequency non-separable transform index indicated in the bitstream, wherein the rule specifies that the transform operation includes, during an encoding operation, coding the current video block into the bitstream by applying a forward transform on residual
(Continued)

values of the current video block, or wherein the rule specifies that the transform operation includes, during a decoding operation, generating from the bitstream the current video block by applying an inverse transform to scaled coefficients indicated in the bitstream.

17 Claims, 34 Drawing Sheets

(51) Int. Cl.
*H04N 19/129* (2014.01)
*H04N 19/176* (2014.01)
*H04N 19/18* (2014.01)

(58) Field of Classification Search
CPC ...... H04N 19/46; H04N 19/13; H04N 19/122; H04N 19/50; H04N 19/174; H04N 19/103; H04N 19/172; H04N 19/513; H04N 19/147
See application file for complete search history.

(56) References Cited

FOREIGN PATENT DOCUMENTS

| WO | 2020036390 A1 | 2/2020 |
| WO | 2020071736 A1 | 4/2020 |

OTHER PUBLICATIONS

Document: JVET-M0057, Abdoli, M., et al., "CE8: BDPCM with horizontal/vertical predictor and independently decodable areas (test 8.3.1b)," Joint Video Experts Team (JVET) of ITU-T SG 16 WP 3 and ISO/IEC JTC 1/SC 29/WG 11 13th Meeting: Marrakech, MA, Jan. 9-18, 2019, 7 pages.

Document: JVET-N0413, Karczewicz, M., et al., "CE8-related: Quantized residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.

Document: JVET-N0193, Koo, M., et al., "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, 19 pages.

Document: JVET-K0099, Salehifar, M., et al., "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, 12 pages.

Document: JVET-L0133, Koo, M., et al., "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, 8 pages.

Document: JVET-N0217, Pfaff, J., et al., "CE3: Affine linear weighted intra prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, 17 pages.

Document: JVET-O2001-vE, Bross, B., et al., "Versatile Video Coding (Draft 6)," Joint Video Experts Team (JVET) of ITU-T Sg 16 WP 3 and ISO/IEC JTC 1/SC 29/WG 11 15th Meeting: Gothenburg, SE, Jul. 3-12, 2019, 455 pages.

Document: JVET-P0052-v2, Zhao, X., et al., "CE6-2.2d: Combination of CE6-2.2a and CE6-2.3," Joint Video Experts Team (JVET) of ITU-T SG 16 WP 3 and ISO/IEC JTC 1/SC 29/WG 11 16th Meeting: Geneva, CH, Oct. 1-11, 2019, 27 pages.

Foreign Communication From A Related Counterpart Application, International Application No. PCT/CN2021/095390, International Search Report dated Aug. 23, 2021, 12 pages.

Foreign Communication From A Related Counterpart Application, Indian Application No. 202227068477, Indian Office Action dated Feb. 21, 2023, 6 pages.

* cited by examiner

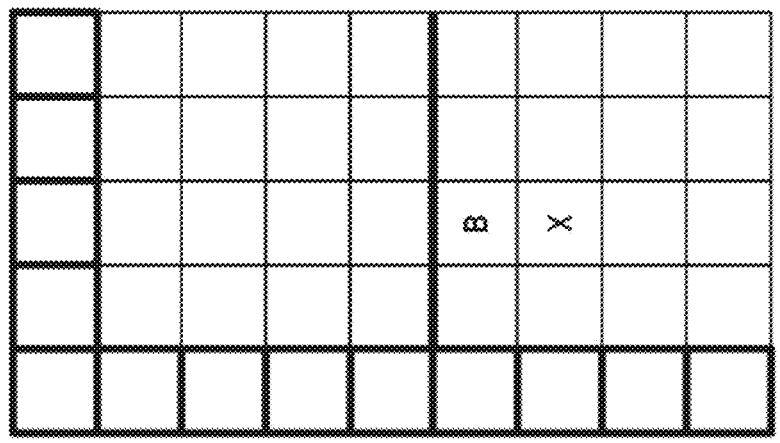
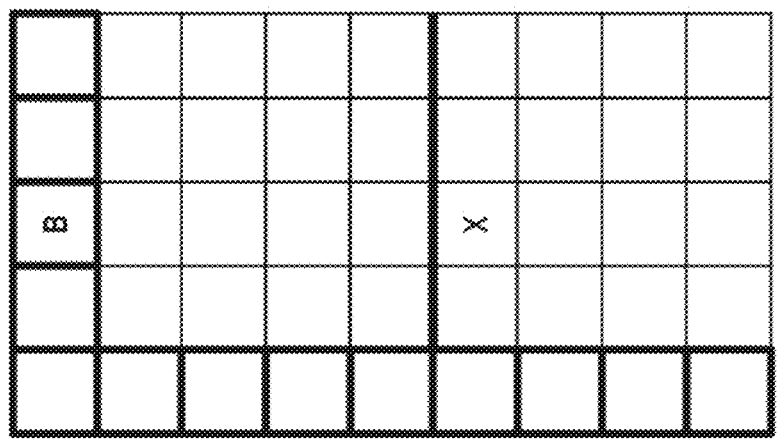
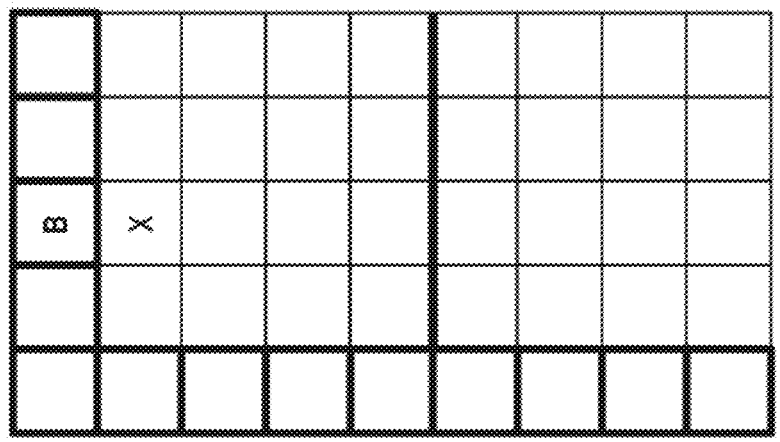
FIG. 8

FIG. 9

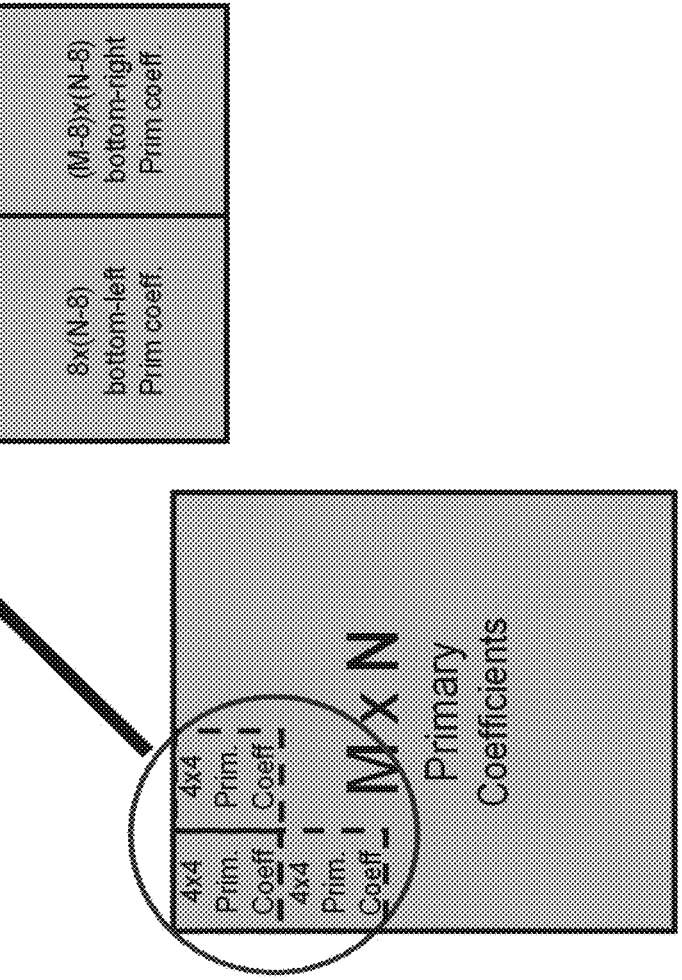
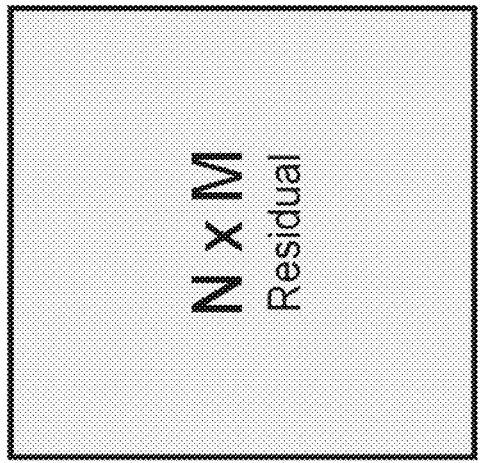
FIG. 13

2200

2202 — Performing a conversion between a current video block of a video and a bitstream of the video based on a rule, wherein the rule specifies that a selection of a transform matrix set for performing a transform operation during the conversion is based on a low-frequency non-separable transform index indicated in the bitstream, wherein the rule specifies that the transform operation includes, during an encoding operation, coding the current video block into the bitstream by applying a forward transform on residual values of the current video block, or wherein the rule specifies that the transform operation includes, during a decoding operation, generating from the bitstream the current video block by applying an inverse transform to scaled coefficients indicated in the bitstream

FIG. 22

INDICATION OF MULTIPLE TRANSFORM MATRICES IN CODED VIDEO

CROSS REFERENCE TO RELATED APPLICATIONS

This application is a continuation of International Patent Application No. PCT/CN2021/095390, filed on May 24, 2021, which claims the priority to and benefits of International Patent Application No. PCT/CN2020/092592, filed on May 27, 2020. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, methods on multiple transforms for video coding, are described. The described methods may be applied to both the existing video coding standards (e.g., High Efficiency Video Coding (HEVC)) and future video coding standards (e.g., Versatile Video Coding (VVC)) or codecs.

In one representative aspect, the disclosed technology may be used to provide an example method of video processing. This method includes performing a conversion between a current video block of a video and a bitstream of the video based on a rule, wherein the rule specifies that a selection of a transform matrix set for performing a transform operation during the conversion is based on a low-frequency non-separable transform index indicated in the bitstream, wherein the rule specifies that the transform operation includes, during an encoding operation, coding the current video block into the bitstream by applying a forward transform on residual values of the current video block, or wherein the rule specifies that the transform operation includes, during a decoding operation, generating from the bitstream the current video block by applying an inverse transform to scaled coefficients indicated in the bitstream.

In another representative aspect, the disclosed technology may be used to provide an example method of video processing. This method includes determining, for a conversion between a current video block of a video and a bitstream of the video, a zero-out range of the current video block using a rule; and performing the conversion according to the determining, wherein the rule specifies that the zero-out range is based on a size of the current video block, and wherein, during operation of a secondary transform in the conversion, transform coefficients of the current video block in the zero-out range are treated as having zero values.

In another representative aspect, the disclosed technology may be used to provide an example method of video processing. This method includes determining, for a conversion between a current video block of a video and a bitstream of the video, whether a zero-out operation is disabled for the current video block according to a rule; and performing the conversion based on the determining, wherein the rule specifies that the zero-out operation includes use of a primary transform in which coefficients in a range are treated as having zero values.

In another representative aspect, the disclosed technology may be used to provide an example method of video processing. This method includes determining, for a conversion between a current video block of a video and a bitstream of the video, whether a zero-out range is enlarged in a primary transform for the current video block; and performing the conversion based on the determining, wherein, during operation of the primary transform in the conversion, transform coefficients of the current video block in the zero-out range are treated as having zero values.

In another representative aspect, the disclosed technology may be used to provide an example method of video processing. This method includes determining, for a conversion between a current video block of a video and a bitstream of the video, one or more primary transform matrices in a primary transform set according to a rule; and performing the conversion according to the determining, wherein the one or more primary transform matrices includes one or more of a Discrete Cosine Transform (DCT)-II, a Discrete Sine Transform (DST)-VII, a DCT-VII, a transform skip mode, an identity transform, and a transform based on a training process.

In another representative aspect, the disclosed technology may be used to provide an example method of video processing. This method includes determining, for a conversion between one or more video blocks of a video and a bitstream of the video, a set of transforms to use for a primary transform or a second transform tool according to a rule, wherein the rule specifies that the set of transforms are determined from two or more sets of transforms that have specific characteristics; and performing the conversion according to the determining.

In another representative aspect, the disclosed technology may be used to provide an example method of video processing. This method includes determining, for a conversion between a current video block of a video and a bitstream of the video, a zero-out range for a primary transform for the current video block based on a prediction mode of the current video block; and performing the conversion based on the determining, wherein, during operation of the primary transform in the conversion, transform coefficients of the current video block in the zero-out range are treated as having zero values.

In another representative aspect, the disclosed technology may be used to provide an example method of video processing. This method includes determining, for a conversion between a current video block of a video and a bitstream of the video, a zero-out range for a secondary transform for the current video block based on a sample number of the current video block; and performing the conversion based on the determining, wherein, during operation of the secondary transform in the conversion, transform coefficients of the current video block in the zero-out range are treated as having zero values.

In another representative aspect, the disclosed technology may be used to provide an example method of video processing. This method includes performing, based on a selection of a primary transform included in a transform set, a conversion between a current block of a video and a bitstream representation of the video, wherein the conversion comprises using the primary transform, and wherein the primary transform comprises one or more of a Discrete Cosine Transform (DCT)-II, a Discrete Sine Transform (DST)-VII, a DCT-VII, a transform skip mode, an identity transform, or a transform based on a training process.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 8 shows an example of dividing a block of 4×8 samples into two independently decodable areas.

FIG. 9 shows an example of the order of processing of the rows of pixels to maximize throughput for 4×N blocks with vertical predictor.

FIG. 13 shows an example of a forward RST 8×8 process with a 16×48 matrix.

FIGS. 22 to 29 are flowcharts for example methods of video processing.

DETAILED DESCRIPTION

1 Introduction

Figure 1:
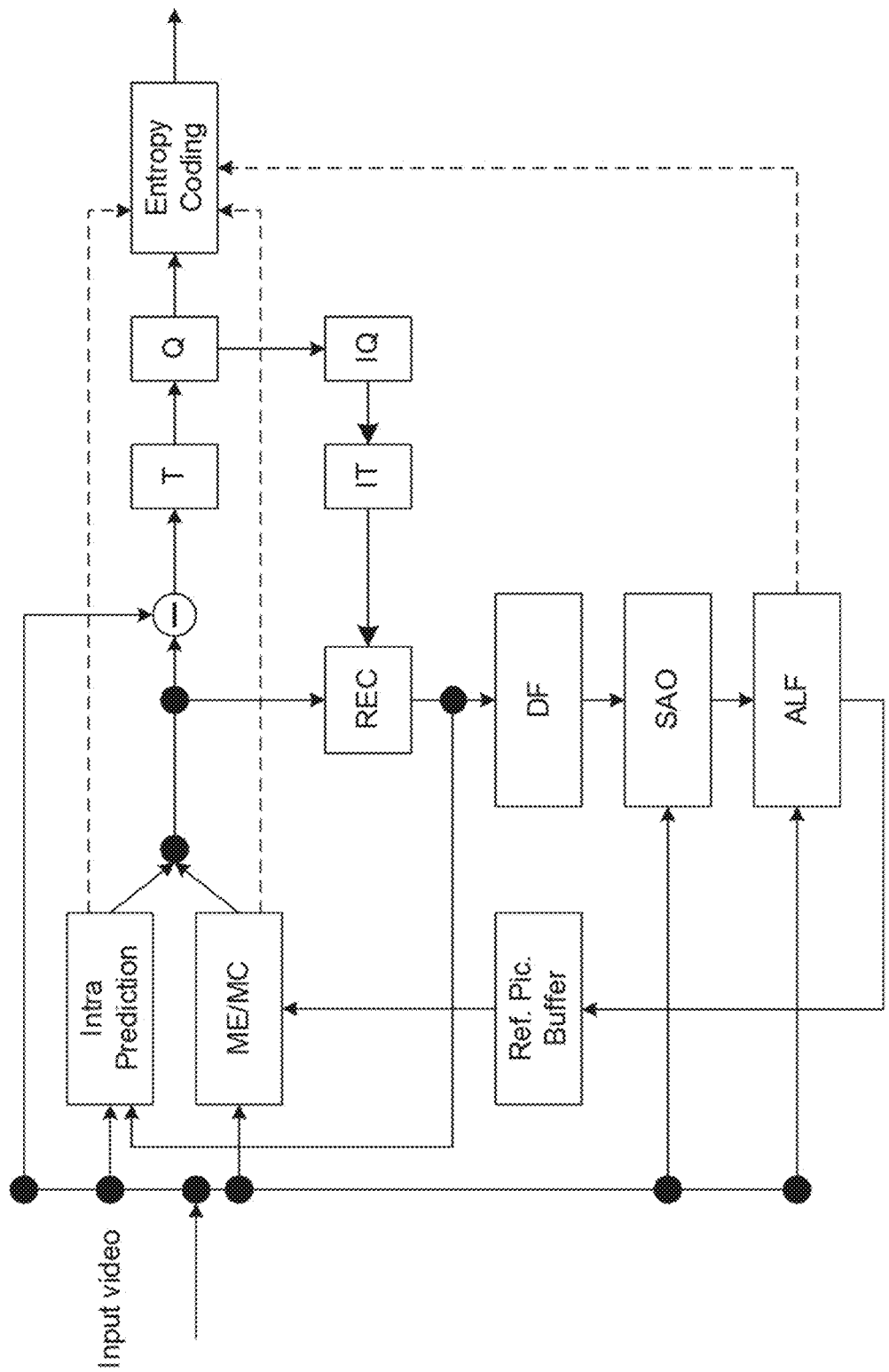
FIG. 1 shows an example of an encoder block diagram.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or Moving Picture Experts Group (MPEG)-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

2 Embodiments and Examples for Methods on Multiple Transforms

2.1 Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are luma, blue difference chroma, red difference chroma (YCbCr) and red, green, blue (RGB).

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

4:4:4 Format. Each of the three Y'CbCr components have the same sample rate, thus there is no chroma subsampling. This scheme is sometimes used in high-end film scanners and cinematic post production.

4:2:2 Format. The two chroma components are sampled at half the sample rate of luma: the horizontal chroma resolution is halved. This reduces the bandwidth of an uncompressed video signal by one-third with little to no visual difference 4:2:0 Format. In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

- In MPEG-2, Cb and Cr are cosited horizontally. Cb and Cr are sited between pixels in the vertical direction (sited interstitially).
- In joint photographic experts group (JPEG)/JPEG file interchange format (JFIF), H.261, and MPEG-1, Cb and Cr are sited interstitially, halfway between alternate luma samples.
- In 4:2:0 Digital Video (DV), Cb and Cr are co-sited in the horizontal direction. In the vertical direction, they are co-sited on alternating lines.

2.2 Coding Flow of an Example Video Codec

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.3 Intra Mode Coding with 67 Intra Prediction Modes

Figure 2:
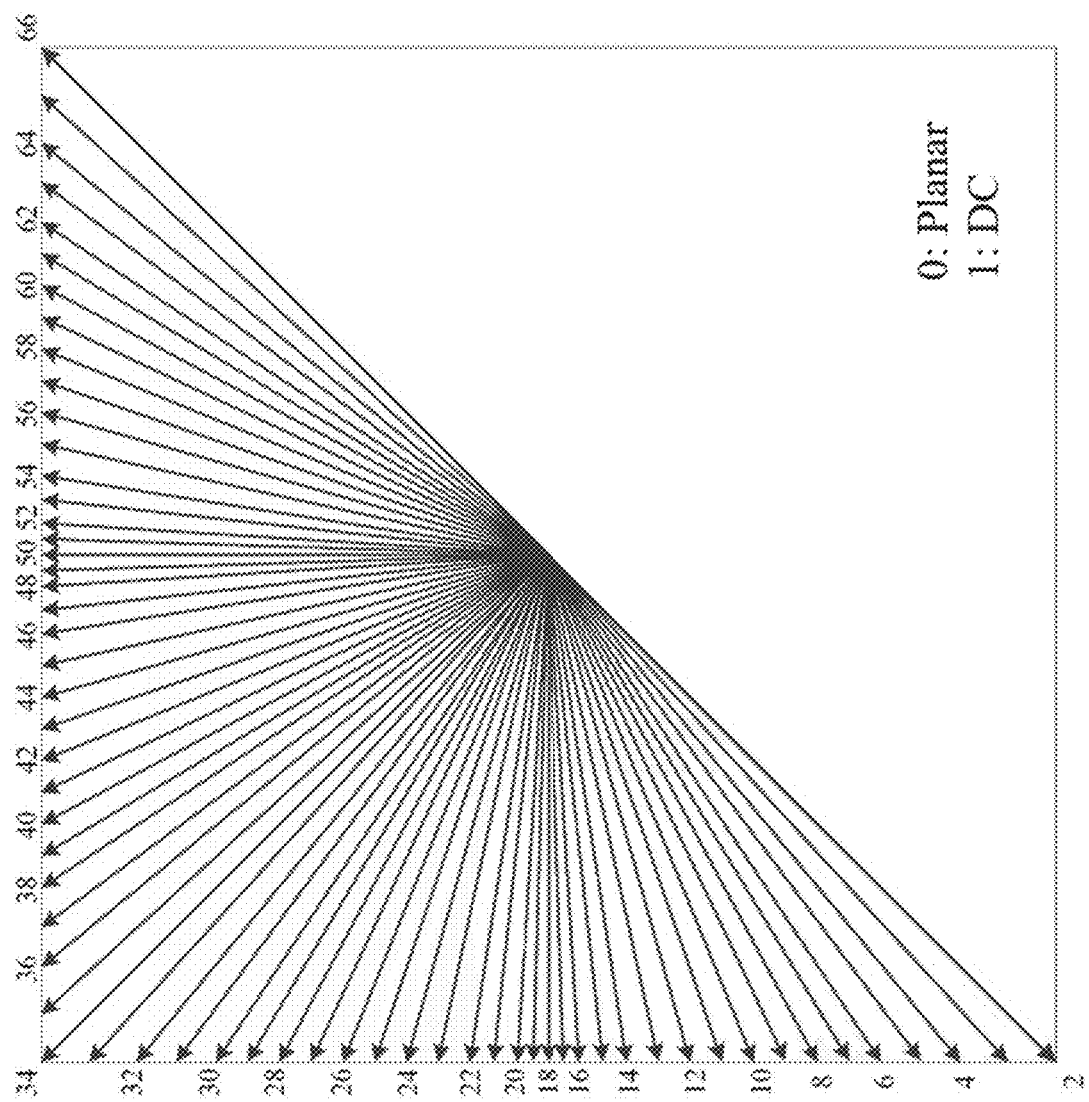
FIG. 2 shows an example of 67 intra prediction modes.

To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

Conventional angular intra prediction directions are defined from 45 degrees to −135 degrees in clockwise direction as shown in FIG. 1. In video test mode (VTM)2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged (e.g., 67), and the intra mode coding is unchanged.

In HEVC, every intra-coded block has a square shape and the length of each of its side is a power of 2. Thus, no division operations are required to generate an intra-predictor using DC mode. In VTM2, blocks can have a rectangular shape that necessitates the use of a division operation per block in the general case. To avoid division operations for DC prediction, only the longer side is used to compute the average for non-square blocks.

2.4 Wide-Angle Intra Prediction for Non-Square Blocks

In some embodiments, conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, e.g., 67, and the intra mode coding is unchanged.

Figure 3A:
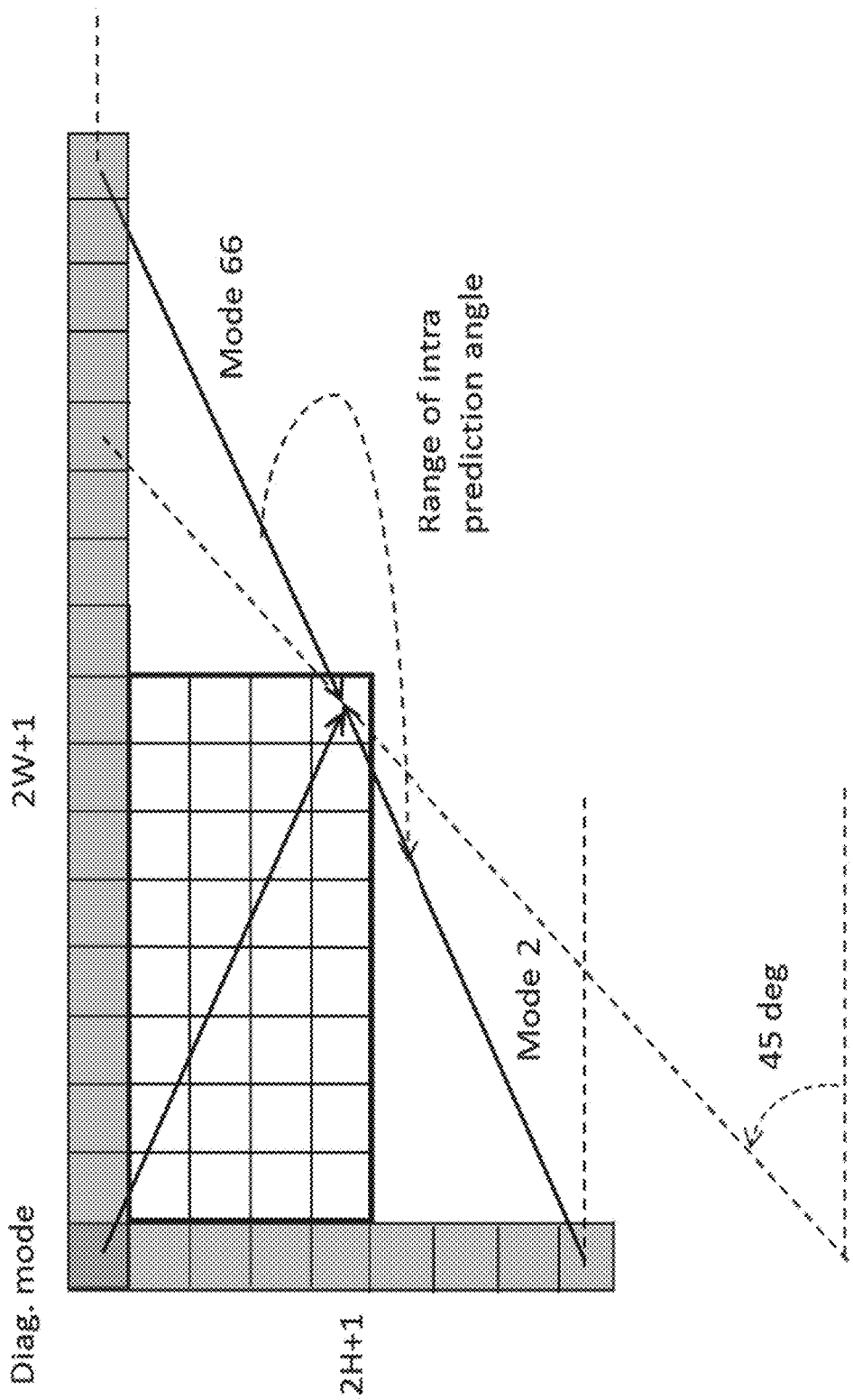
FIGS. 3A and 3B show examples of reference samples for wide-angle intra prediction modes for non-square blocks.
Figure 3B:
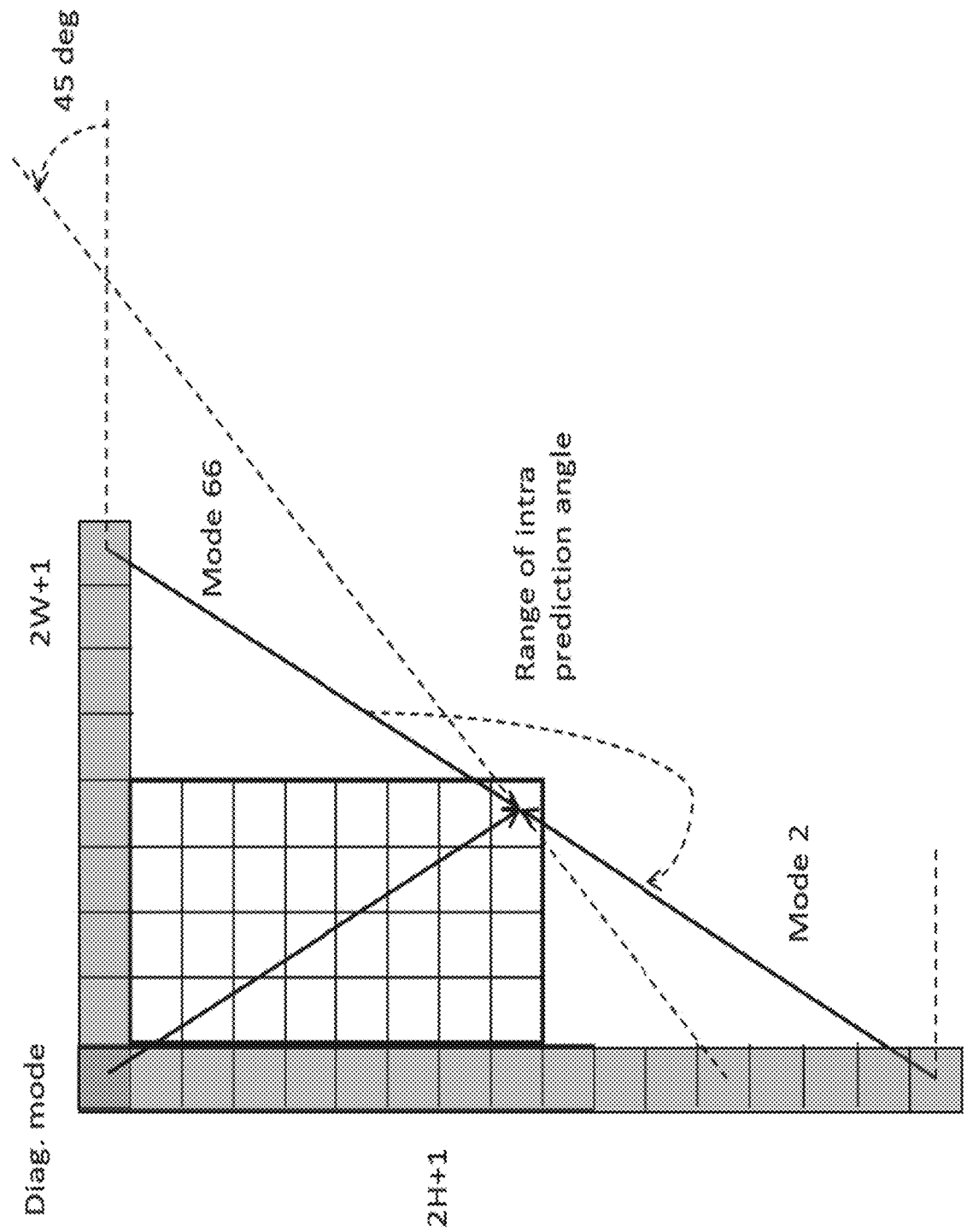

To support these prediction directions, the top reference with length 2 W+1, and the left reference with length 2H+1, are defined as shown in the examples in FIGS. 3A and 3B.

In some embodiments, the mode number of replaced mode in wide-angular direction mode is dependent on the aspect ratio of a block. The replaced intra prediction modes are illustrated in Table 1.

TABLE 1

| Intra prediction modes replaced by wide-angle modes | |
|---|---|
| Condition | Replaced intra prediction modes |
| W / H == 2 | Modes 2, 3, 4, 5, 6, 7 |
| W / H > 2 | Modes 2, 3, 4, 5, 6, 7, 8, 9, 10, 11 |
| W / H == 1 | None |
| H / W == ½ | Modes 61, 62, 63, 64, 65, 66 |
| H / W < ½ | Mode 57, 58, 59, 60, 61, 62, 63, 64, 65, 66 |

Figure 4:
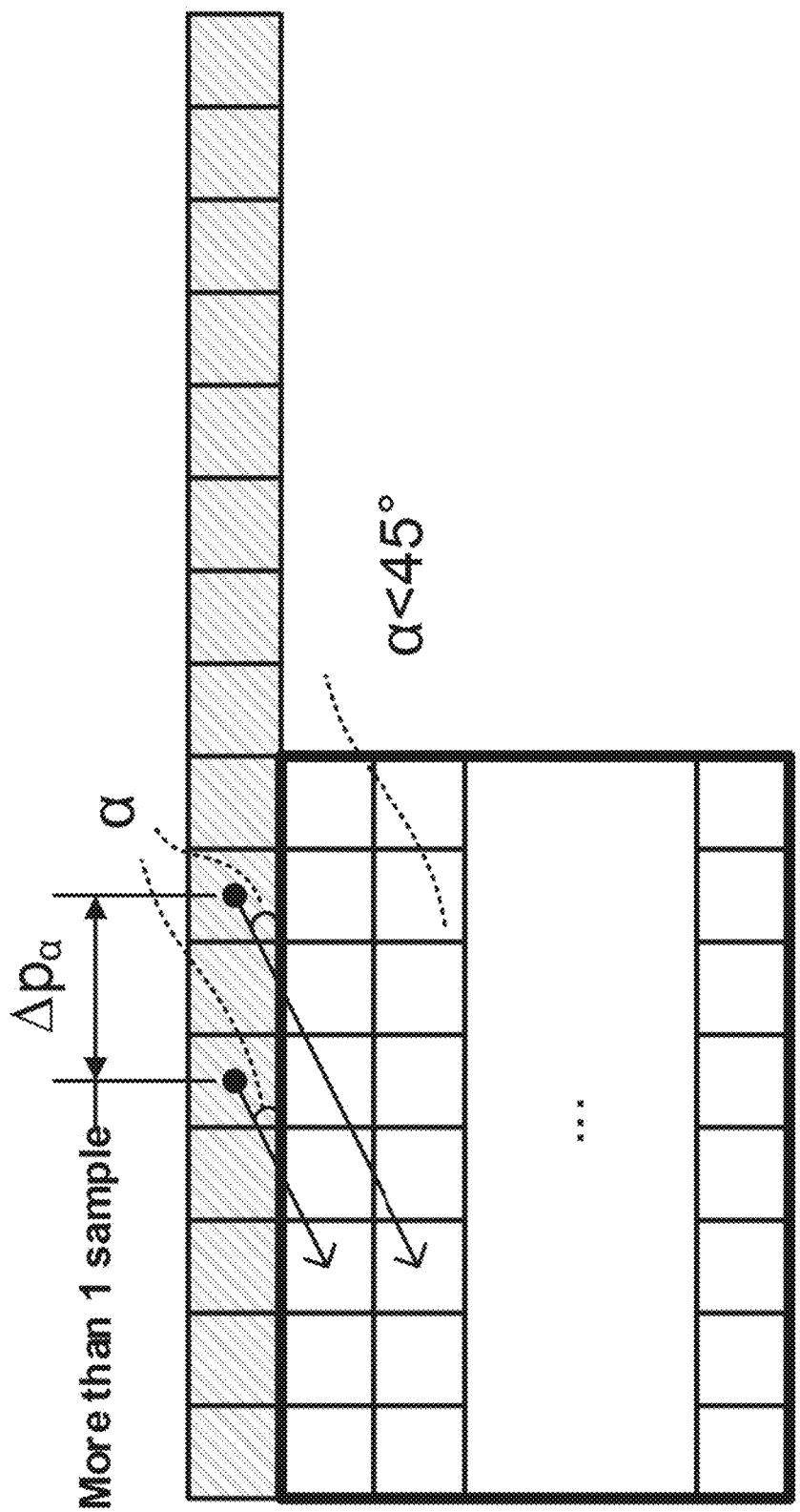
FIG. 4 shows an example of a discontinuity when using wide-angle intra prediction.
Figure 5A:
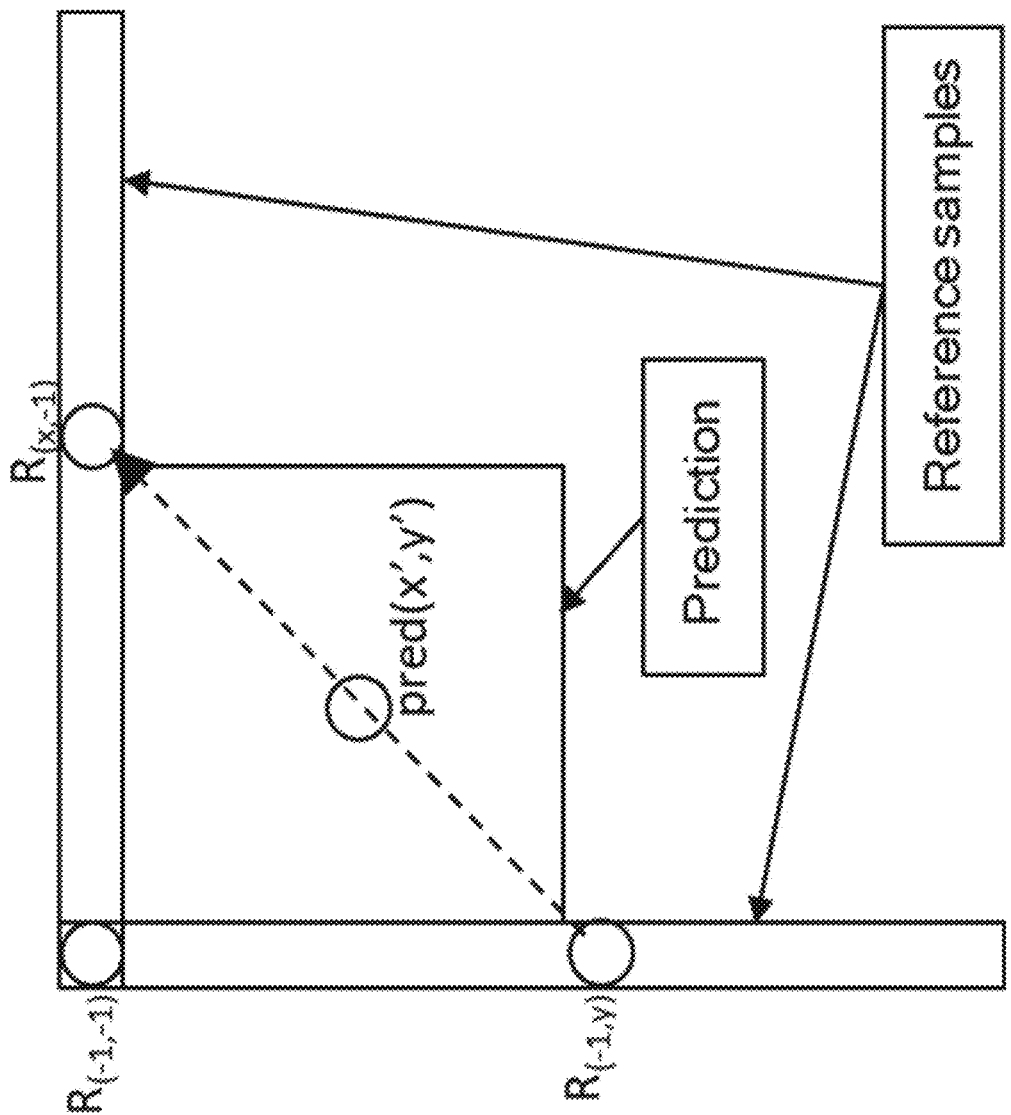
FIGS. 5A-5D show examples of samples used by a position-dependent intra prediction combination (PDPC) method.
Figure 5B:
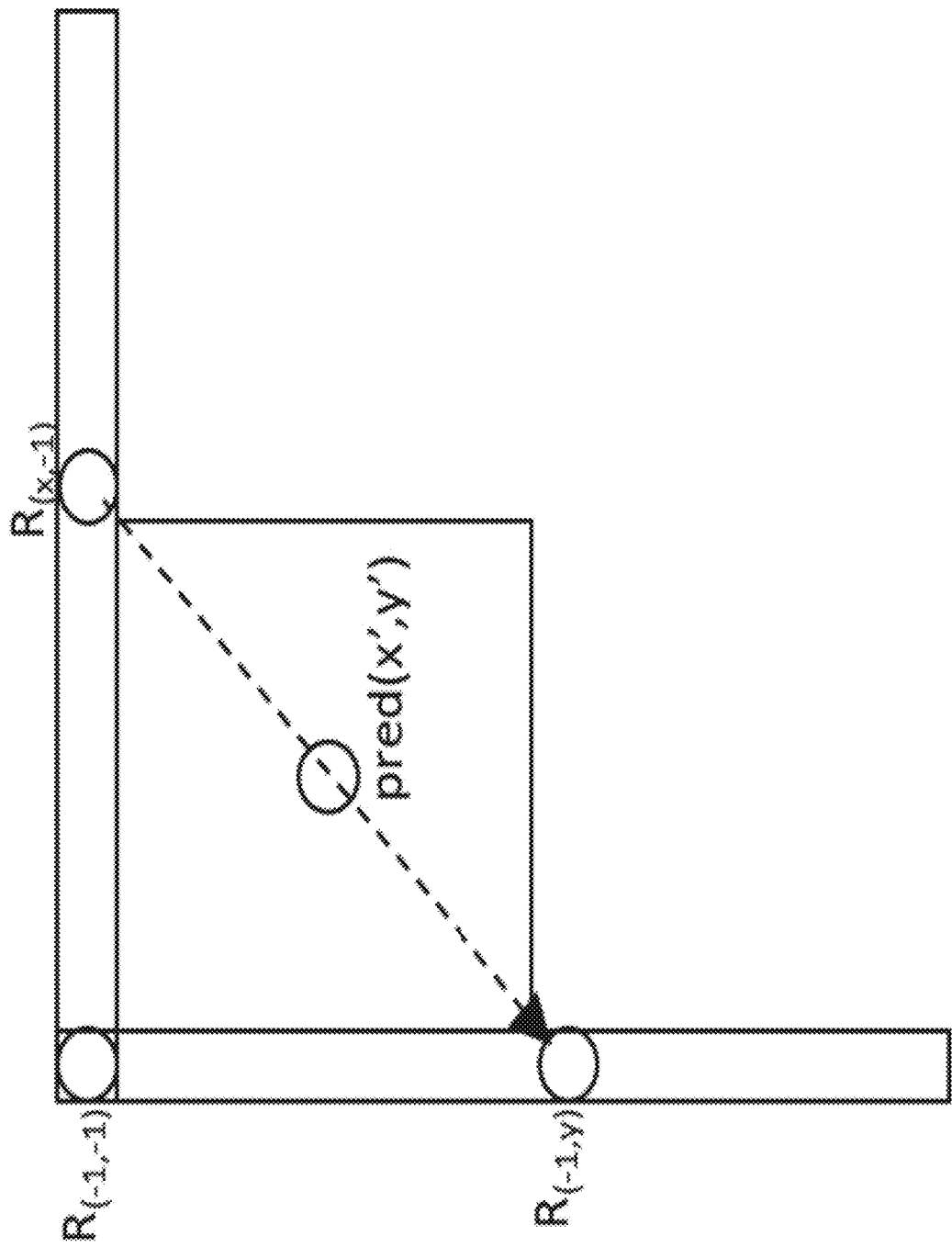
Figure 5C:
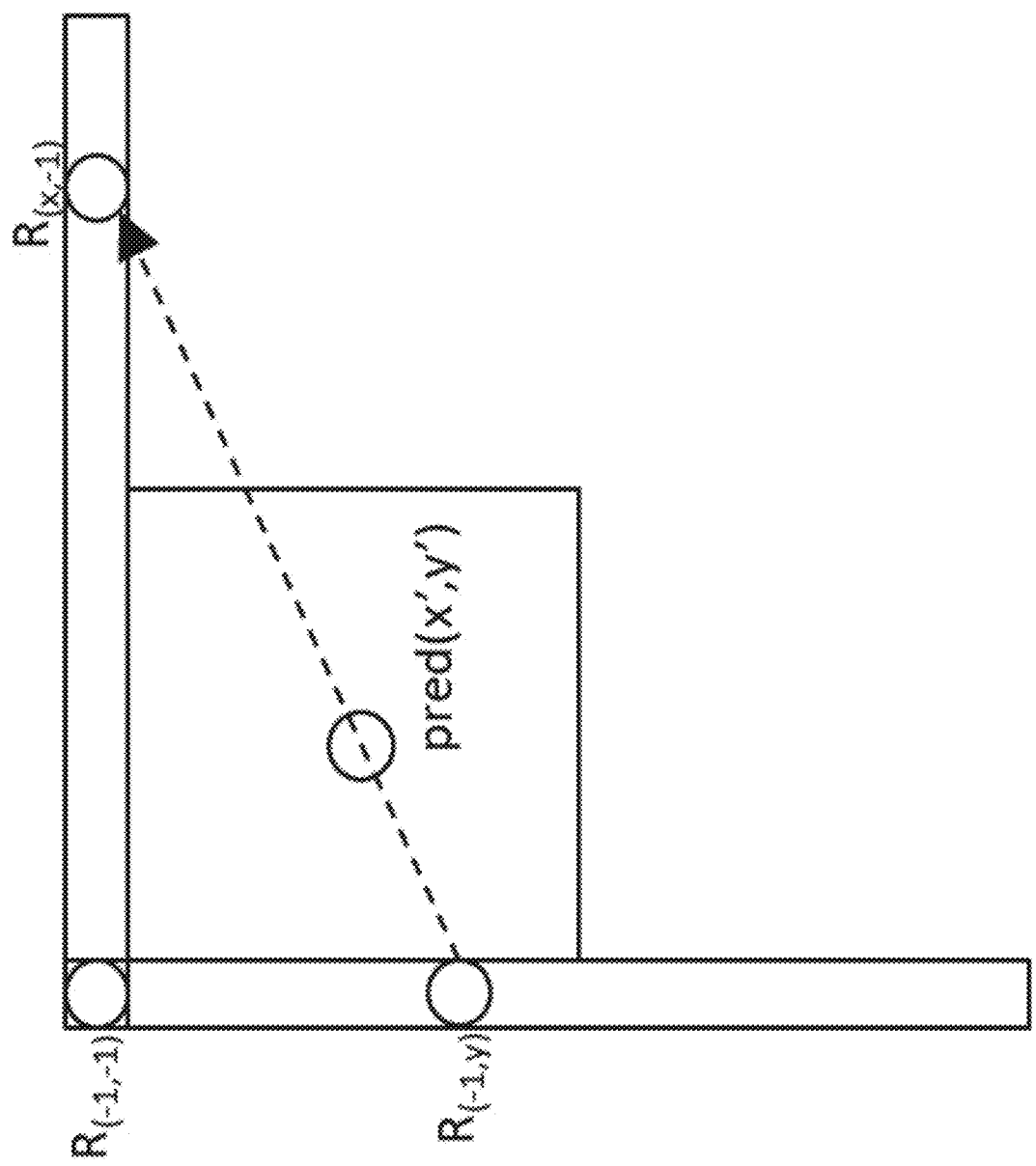
Figure 5D:
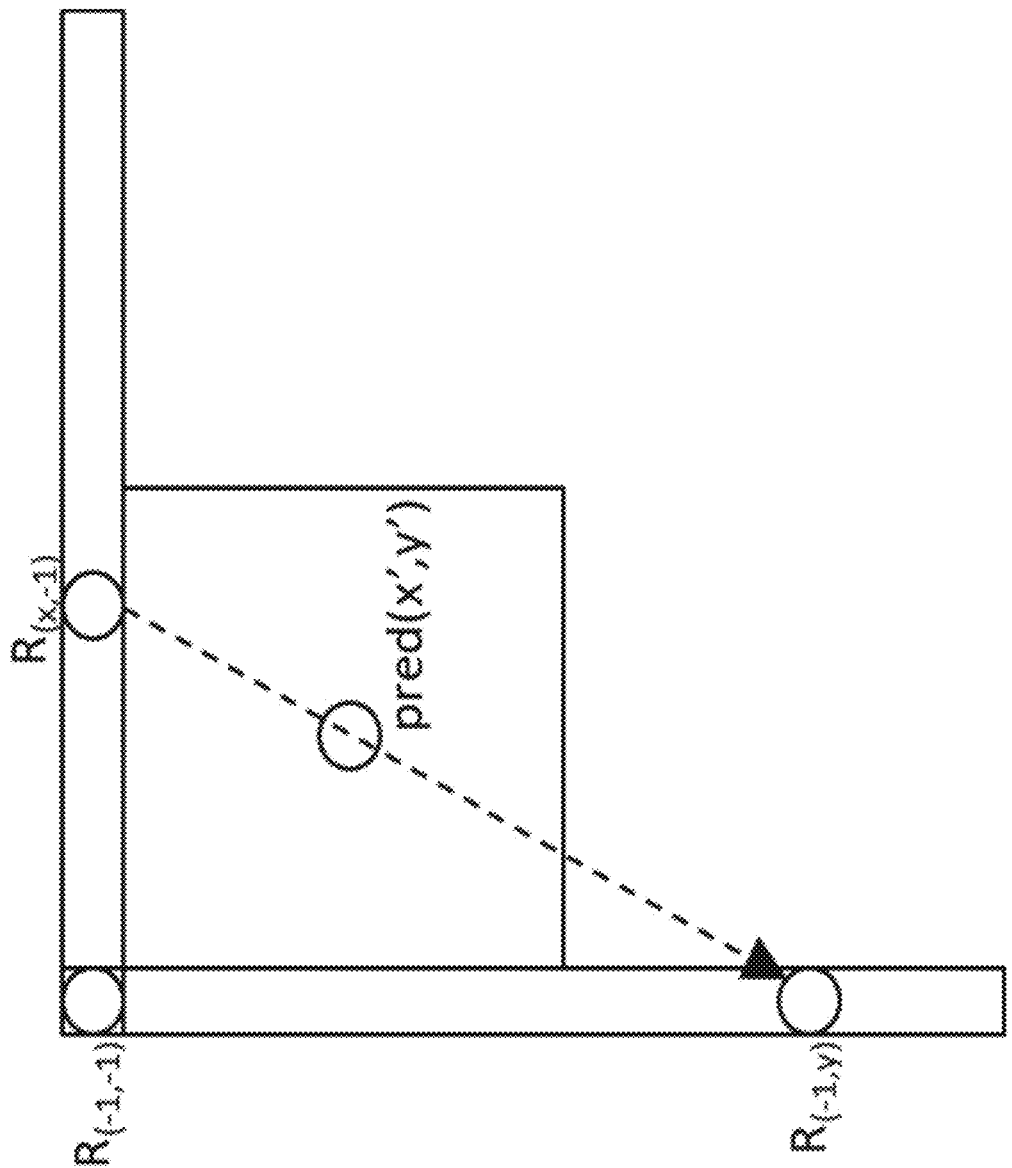

As shown in FIG. 4, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$.

2.5 Examples of Position Dependent Intra Prediction Combination (PDPC)

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the Equation as follows:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> \text{shift}$$

Herein, $R_{x,-1}$, $R_{-1,y}$ represent the reference samples located at the top and left of current sample (x, y), respectively, and $R_{-1,-1}$ represents the reference sample located at the top-left corner of the current block.

In some embodiments, and if PDPC is applied to DC, planar, horizontal, and vertical intra modes, additional boundary filters are not needed, as required in the case of HEVC DC mode boundary filter or horizontal/vertical mode edge filters.

FIGS. 5A-5D illustrate the definition of reference samples ($R_{x,-1}$, $R_{-1,y}$ and $R_{-1,-1}$) for PDPC applied over various prediction modes. The prediction sample pred (x', y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1.

In some embodiments, the PDPC weights are dependent on prediction modes and are shown in Table 2, where S=shift.

TABLE 2

Examples of PDPC weights according to prediction modes

| Prediction modes | WT | wL | wTL |
|---|---|---|---|
| Diagonal top-right | 1 >> ((y' << 1) >> S) | 16 >> ((x' << 1) >> S) | 0 |
| Diagonal bottom-left | 16 >> ((y' << 1) >> S) | 16 >> ((x' << 1) >> S) | 0 |
| Adjacent diag. top-right | 32 >> ((y' << 1) >> S) | 0 | 0 |
| Adjacent diag. bottom-left | 0 | 32 >> ((x' << 1) >> S) | 0 |

2.6 Multiple Reference Line (MRL)

Figure 6:
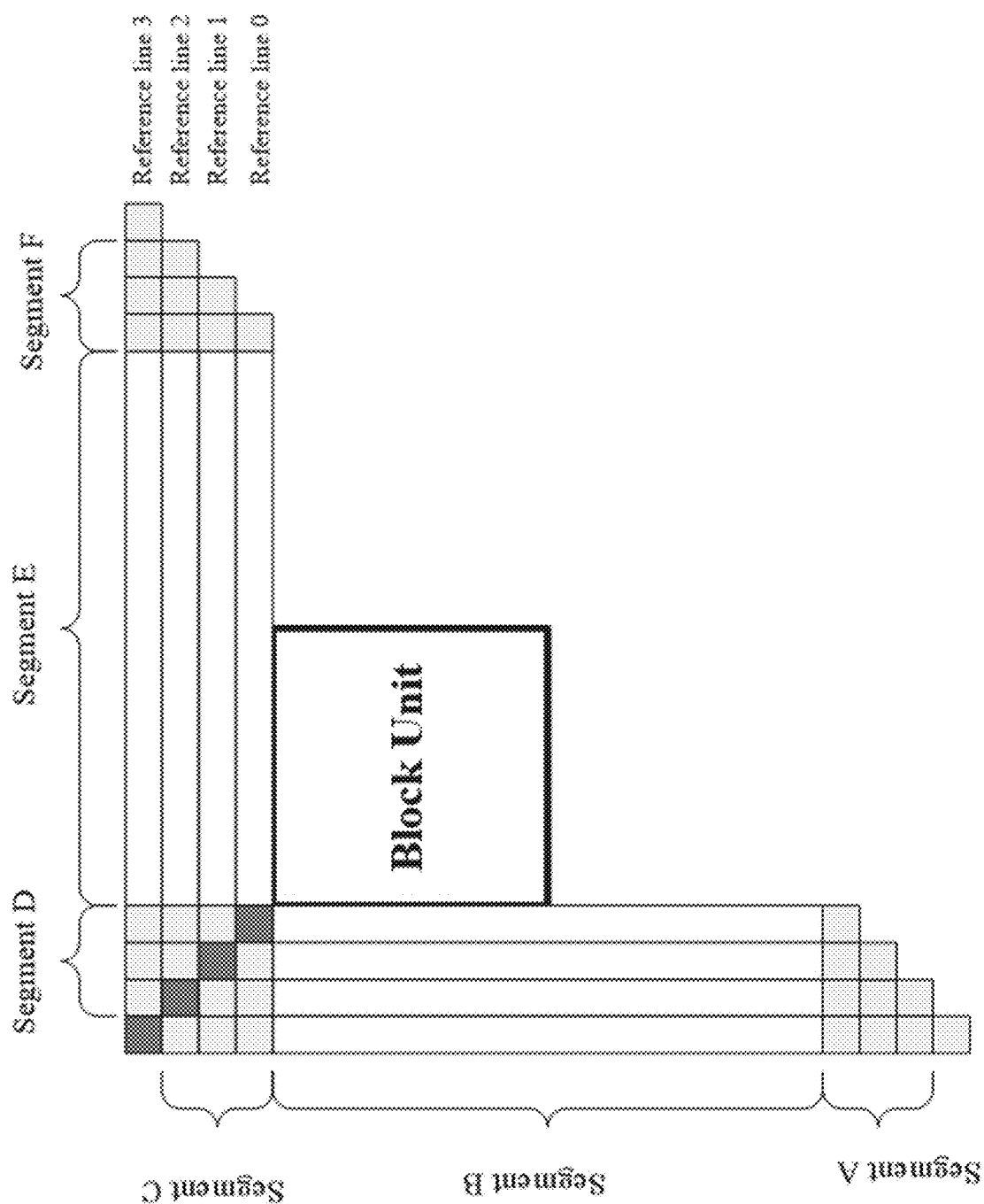
FIG. 6 shows an example of four reference lines neighboring to a prediction block.

Multiple reference line (MRL) intra prediction uses more reference lines for intra prediction. In FIG. 6, an example of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signaled and used to generate intra predictor. For reference line index, which is greater than 0, only include additional reference line modes in most probably mode (MPM) list and only signal MPM index without remaining mode. The reference line index is signaled before intra prediction modes, and Planar and DC modes are excluded from intra prediction modes in case a nonzero reference line index is signaled.

2.7 Intra Subblock Partitioning (ISP)

Figure 7A:
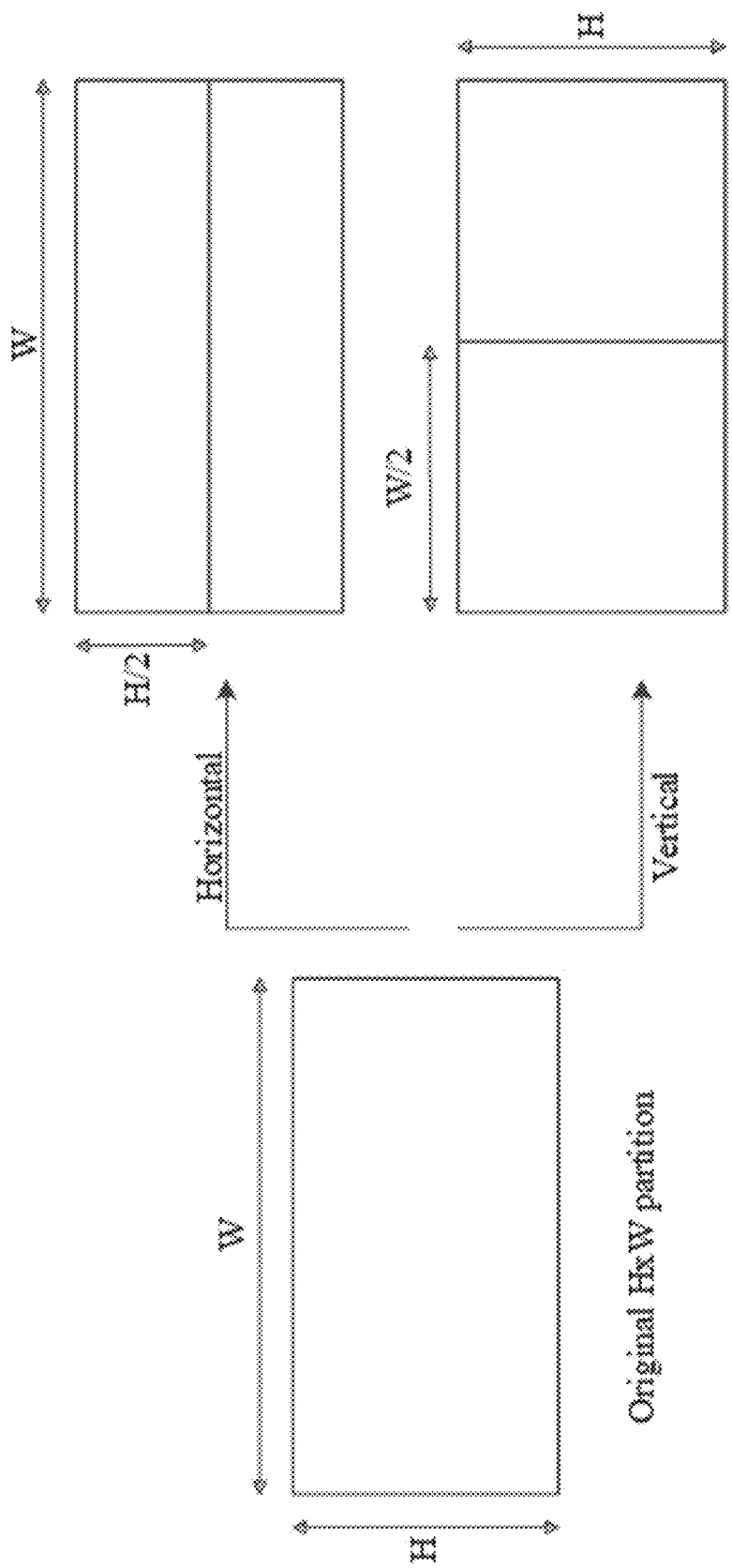
FIG. 7A shows an example of divisions of 4×8 and 8×4 blocks.
Figure 7B:
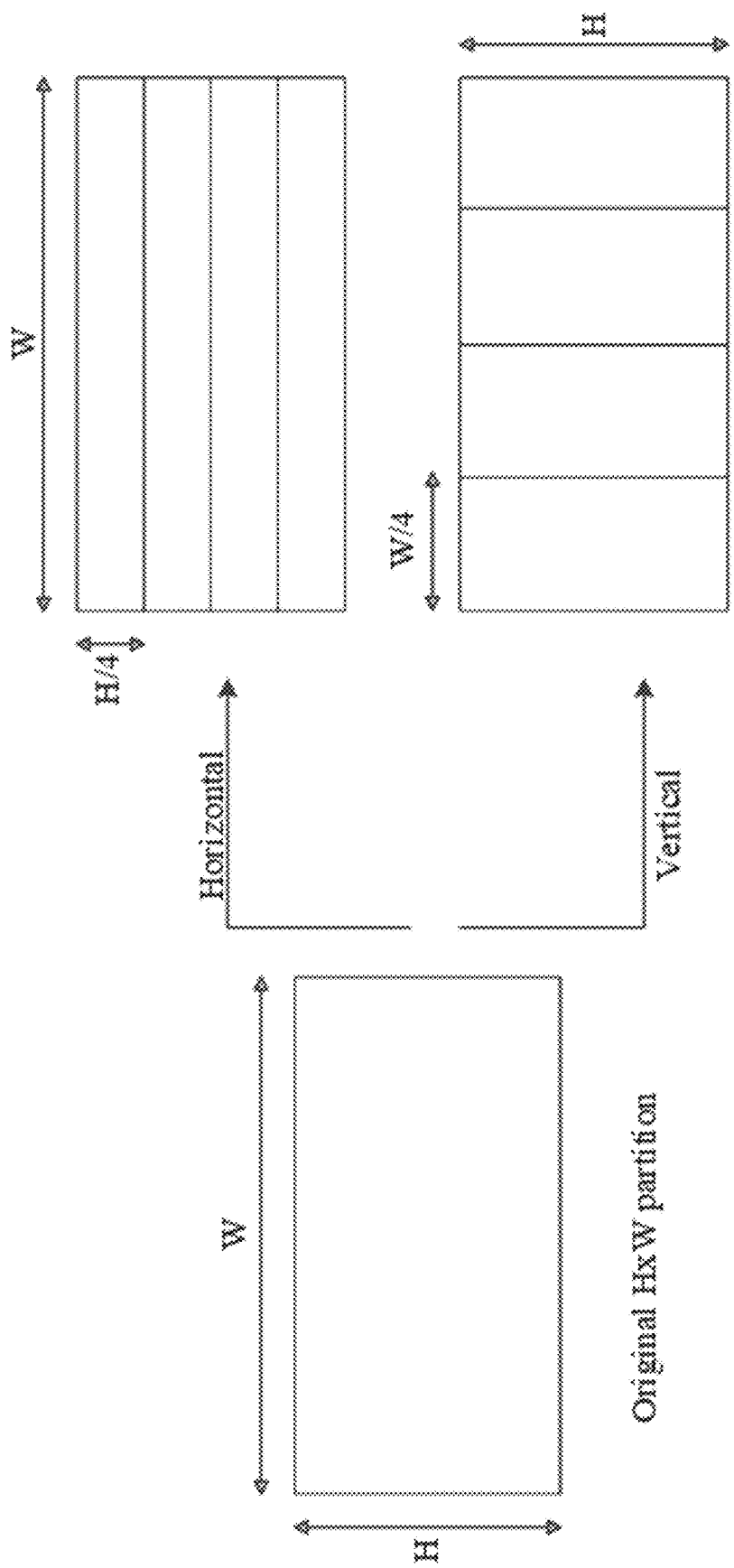
FIG. 7B shows an example of divisions all blocks except 4×8, 8×4 and 4×4.

In Joint Video Exploration Team (JVET)-M0102, ISP is proposed, which divides luma intra-predicted blocks vertically or horizontally into 2 or 4 sub-partitions depending on the block size dimensions, as shown in Table 3. FIGS. 7A and 7B show examples of the two possibilities. All sub-partitions fulfill the condition of having at least 16 samples.

TABLE 3

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Based on the intra mode and the split utilized, two different classes of processing orders are used, which are referred to as normal and reversed order. In the normal order, the first sub-partition to be processed is the one containing the top-left sample of the coding unit (CU) and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

2.8 Block Differential Pulse-Code Modulation Coding (BDPCM)

BDPCM is proposed in WET-M0057. Due to the shape of the horizontal (resp. vertical) predictors, which use the left (A) (resp. top (B)) pixel for prediction of the current pixel, the most throughput-efficient way of processing the block is to process all the pixels of one column (resp. line) in parallel, and to process these columns (resp. lines) sequentially. In order to increase throughput, we introduce the following process: a block of width 4 is divided into two halves with a horizontal frontier when the predictor chosen on this block is vertical, and a block of height 4 is divided into two halves with a vertical frontier when the predictor chosen on this block is horizontal.

When a block is divided, samples from one area are not allowed to use pixels from another area to compute the prediction: if this situation occurs, the prediction pixel is replaced by the reference pixel in the prediction direction. This is shown on FIG. 8 for different positions of current pixel X in a 4×8 block predicted vertically.

Figure 9:
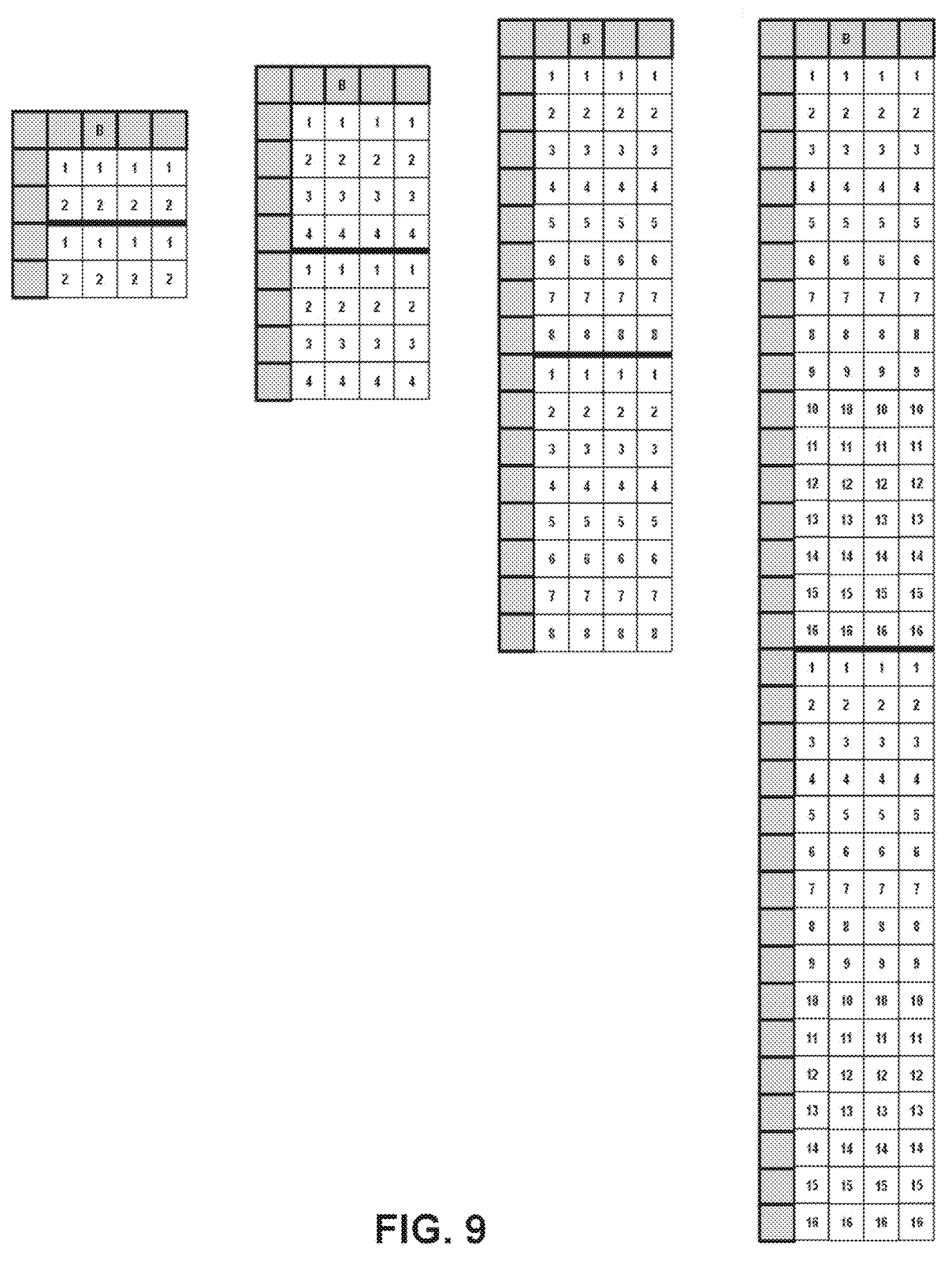

Because of this property, it becomes now possible to process a 4×4 block in 2 cycles, and a 4×8 or 8×4 block in 4 cycles, and so on, as shown on FIG. 9.

Table 4 summarizes the number of cycles required to process the block, depending on the block size. It is trivial to show that any block which has both dimensions larger or equal to 8 can be processed in 8 pixels per cycle or more.

TABLE 4

Throughput for blocks of size 4 × N, N × 4

| Block size | 4 × 4 | 4 × 8, 8 × 4 | 4 × 16, 16 × 4 | 4 × 32, 32 × 4 |
|---|---|---|---|---|
| Cycles | 2 | 4 | 8 | 16 |
| Pixels | 16 | 32 | 64 | 128 |
| Throughput (pixels/cycle) | 8 | 8 | 8 | 8 |

2.9 Quantized residual domain BDPCM

In JVET-N0413, quantized residual domain BDPCM (denote as RBDPCM hereinafter) is proposed. The intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (rows)×N (cols), let $r_{i,j}$, $0 \leq i \leq M-1$, $0 \leq j \leq N-1$. be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signaled:

$$\tilde{r}_{i,j} = \begin{cases} Q(r_{i,j}), & i=0, \ 0 \leq j \leq (N-1) \\ Q(r_{i,j}) - Q(r_{(i-1),j}), & 1 \leq i \leq (M-1), \ 0 \leq j \leq (N-1) \end{cases}$$

For horizontal prediction, similar rules apply, and the residual quantized samples are obtained by $$\tilde{r}_{i,j} = \begin{cases} Q(r_{i,j}), & 0 \leq i \leq (M-1), \ j=0 \\ Q(r_{i,j}) - Q(r_{i,(j-1)}), & 0 \leq i \leq (M-1), \ 1 \leq j \leq (N-1) \end{cases}$$

The residual quantized samples $\tilde{r}_{i,j}$ are sent to the decoder. On the decoder side, the above calculations are reversed to produce $Q(r_{i,j})$, $0 \leq i \leq M-1$, $0 \leq j \leq N-1$. For vertical prediction case, $$Q(r_{i,j}) = \sum_{k=0}^{i} \tilde{r}_{k,j}, \ 0 \leq i \leq (M-1), \ 0 \leq j \leq (N-1)$$

For horizontal case, $$Q(r_{i,j}) = \sum_{k=0}^{j} \tilde{r}_{i,k}, \ 0 \leq i \leq (M-1), \ 0 \leq j \leq (N-1)$$

The invert quantized residuals, $Q^{-1}(Q(r_{i,j}))$, are added to the intra block prediction values to produce the reconstructed sample values.

One of the benefits of this scheme is that inverting the DPCM can be done on the fly during coefficient parsing simply adding the predictor as the coefficients are parsed or it can be performed after parsing.

Transform skip is always used in quantized residual domain BDPCM.

2.10 Multiple Transform Set (MTS) in VVC

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. The Table 4 below shows the basis functions of the selected DST/DCT.

TABLE 4

Basis functions of transform matrices used in VVC

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br> where $\omega_0 = \begin{cases} \sqrt{\dfrac{2}{N}} & i=0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at sequence parameter set (SPS) level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32

Coded block flag (CBF) flag is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 5. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

| | | | Intra/inter | |
|---|---|---|---|---|
| MTS_CU_flag | MTS_Hor_flag | MTS_Ver_flag | Horizontal | Vertical |
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signalled when the CU level MTS_CU_flag is not equal to zero. The block size limitation for transform skip is the same to that for MTS in JEM4, which indicate that transform skip is applicable for a CU when both block width and height are equal to or less than 32.

2.11 Reduced Secondary Transform (RST) Proposed in JVET-N0193

2.11.1 Non-Separable Secondary Transform (NSST) in JEM

Figure 10:
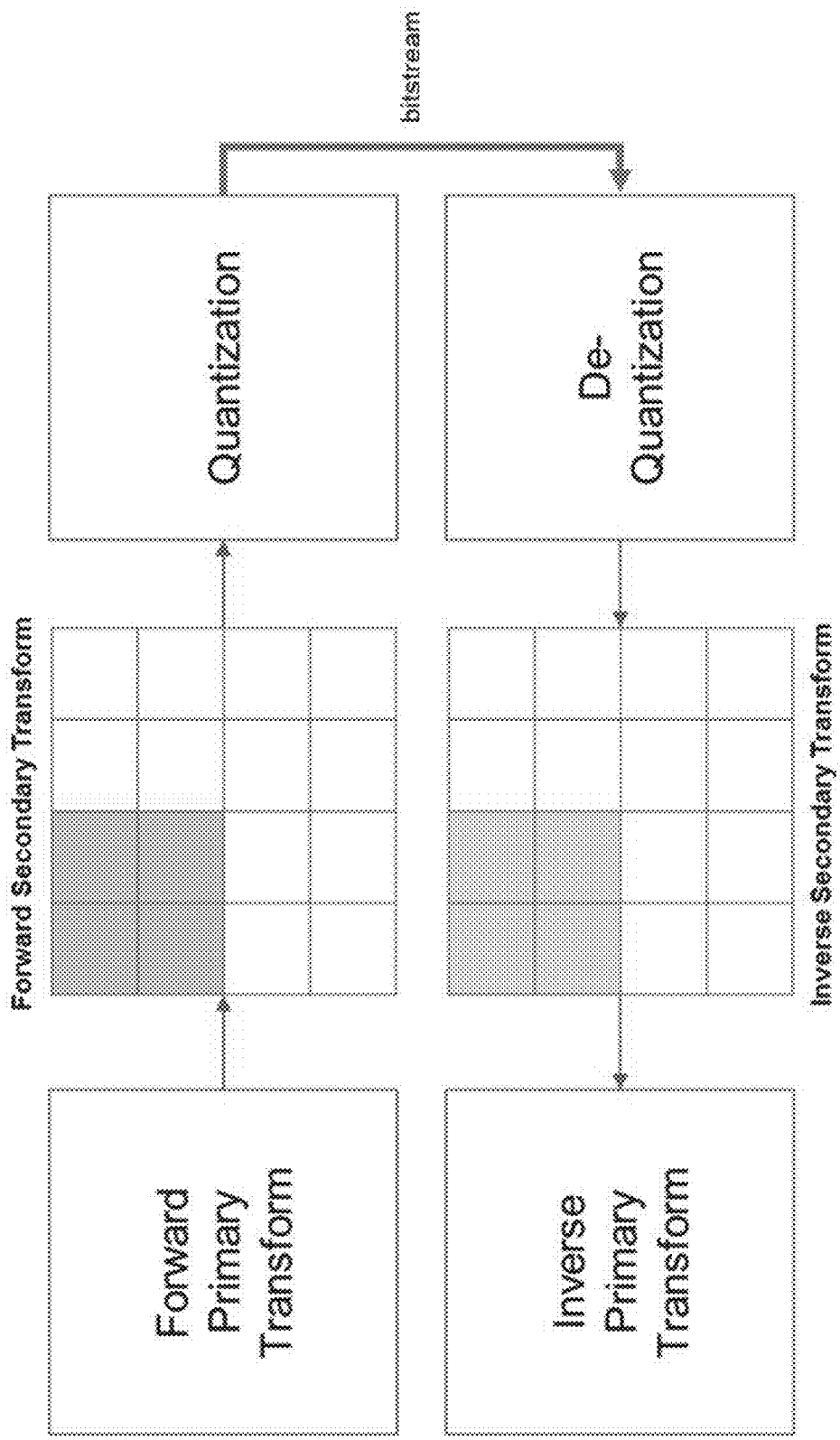
FIG. 10 shows an example of a secondary transform in Joint Exploration Model (JEM).

In JEM, secondary transform is applied between forward primary transform and quantization (at encoder) and between de-quantization and invert primary transform (at decoder side). As shown in FIG. 10, 4×4 (or 8×8) secondary transform is performed depends on block size. For example, 4×4 secondary transform is applied for small blocks (i.e., min (width, height)<8) and 8×8 secondary transform is applied for larger blocks (i.e., min (width, height)>4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$\vec{X} = [X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T$ The non-separable transform is calculated as $\vec{F} = \vec{T} \cdot \vec{X}$, where F indicates the transform coefficient vector, and T is a 16×16 transform matrix. The 16×1 coefficient vector F is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform (NSST) candidate is further specified by the explicitly signalled secondary transform index. The index is signalled in a bit-stream once per Intra CU after transform coefficients.

2.11.2 Reduced Secondary Transform (RST) in JVET-N0193

Figure 11:
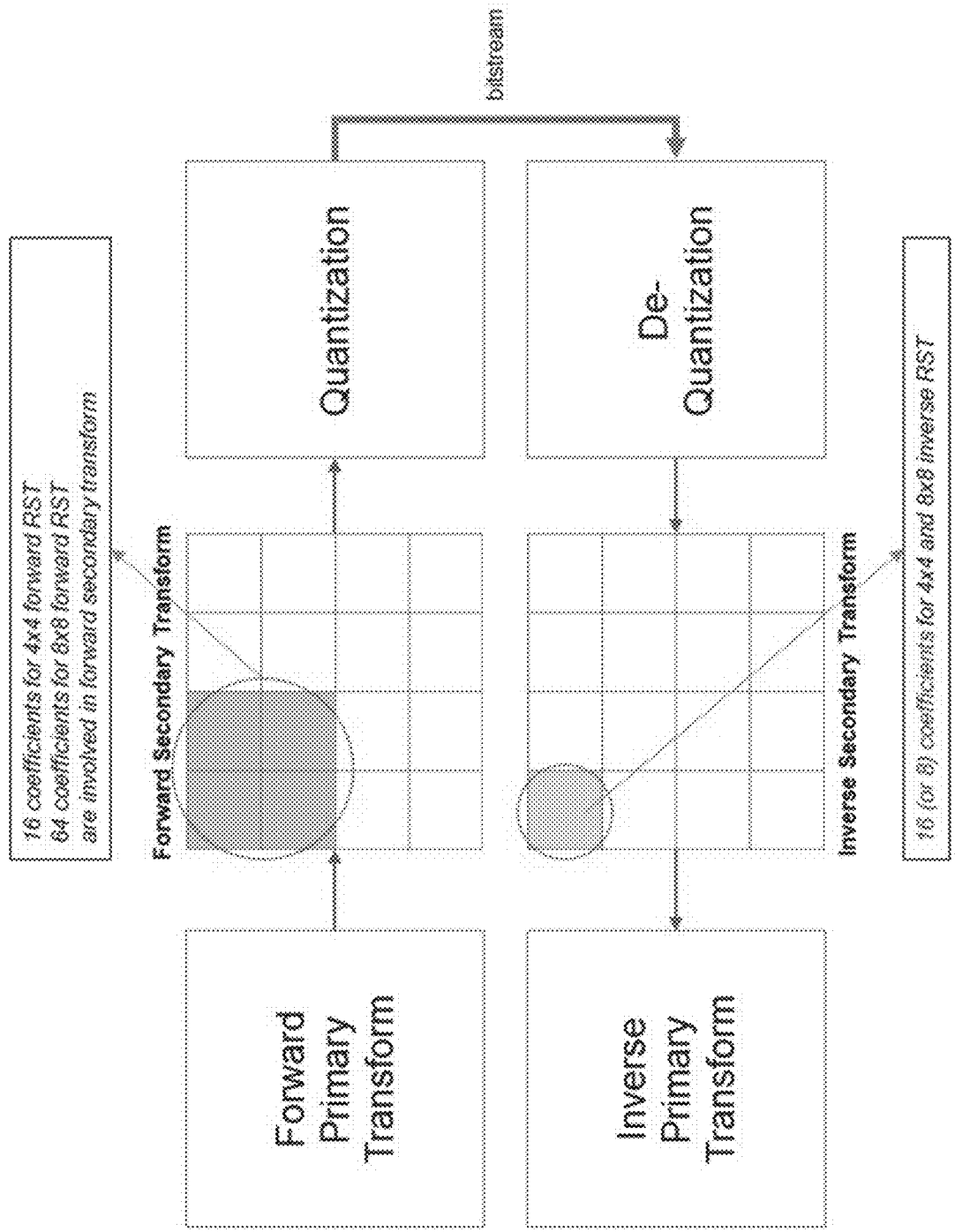
FIG. 11 shows an example of the proposed reduced secondary transform (RST).

The RST (a.k.a. Low Frequency Non-Separable Transform (LFNST)) was introduced in JVET-K0099 and 4 transform set (instead of 35 transform sets) mapping introduced in JVET-L0133. In this JVET-N0193, 16×64 (further reduced to 16×48) and 16×16 matrices are employed. For notational convenience, the 16×64 (reduced to 16×48) transform is denoted as RST8×8 and the 16×16 one as RST4×4. FIG. 11 shows an example of RST.

2.11.3 RST Computation

The main idea of a Reduced Transform (RT) is to map an N dimensional vector to an R dimensional vector in a different space, where R/N(R<N) is the reduction factor.

Figure 12:
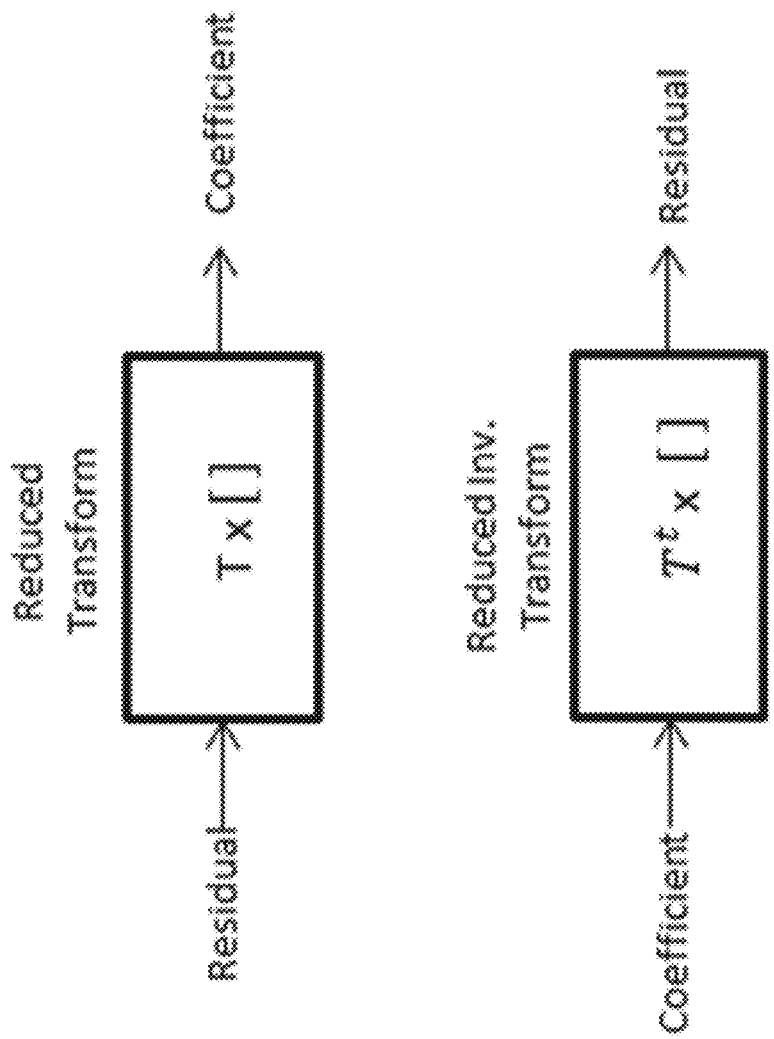
FIG. 12 shows examples of the forward and inverse reduced transforms.

The RT matrix is an R×N matrix as follows:

$$T_{R \times N} = \begin{bmatrix} t_{11} & t_{12} & t_{13} & \cdots & t_{1N} \\ t_{21} & t_{22} & t_{23} & \cdots & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The invert transform matrix for RT is the transpose of its forward transform. The forward and invert RT are depicted in FIG. 12.

In this contribution, the RST8×8 with a reduction factor of 4 (¼ size) is applied. Hence, instead of 64×64, which is conventional 8×8 non-separable transform matrix size, 16×64 direct matrix is used. In other words, the 64×16 invert RST matrix is used at the decoder side to generate core (primary) transform coefficients in 8×8 top-left regions. The forward RST8×8 uses 16×64 (or 8×64 for 8×8 block) matrices so that it produces non-zero coefficients only in the top-left 4×4 region within the given 8×8 region. In other words, if RST is applied then the 8×8 region except the top-left 4×4 region will have only zero coefficients. For RST4×4, 16×16 (or 8×16 for 4×4 block) direct matrix multiplication is applied.

An invert RST is conditionally applied when the following two conditions are satisfied:

Block size is greater than or equal to the given threshold (W>=4 && H>=4)

Transform skip mode flag is equal to zero

If both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

If RST index is equal to 0, RST is not applied. Otherwise, RST is applied, of which kernel is chosen with the RST index. The RST selection method and coding of the RST index are explained later.

Furthermore, RST is applied for intra CU in both intra and inter slices, and for both Luma and Chroma. If a dual tree is enabled, RST indices for Luma and Chroma are signaled separately. For inter slice (the dual tree is disabled), a single RST index is signaled and used for both Luma and Chroma.

In 13$^{th}$ JVET meeting, Intra Sub-Partitions (ISP), as a new intra prediction mode, was adopted. When ISP mode is selected, RST is disabled and RST index is not signaled, because performance improvement was marginal even if RST is applied to every feasible partition block. Furthermore, disabling RST for ISP-predicted residual could reduce encoding complexity.

2.11.4 RST Selection

A RST matrix is chosen from four transform sets, each of which consists of two transforms. Which transform set is applied is determined from intra prediction mode as the following:

(1) If one of three Cross-component Linear Model (CCLM) modes is indicated, transform set 0 is selected.

(2) Otherwise, transform set selection is performed according to the following table:

The transform set selection table

| Intra PredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index to access the above table, denoted as IntraPredMode, have a range of [−14, 83], which is a transformed mode index used for wide angle intra prediction.

2.11.5 RST Matrices of Reduced Dimension

As a further simplification, 16×48 matrices are applied instead of 16×64 with the same transform set configuration, each of which takes 48 input data from three 4×4 blocks in a top-left 8×8 block excluding right-bottom 4×4 block (as shown in FIG. 13).

2.11.6 RST Signaling

Figure 14:
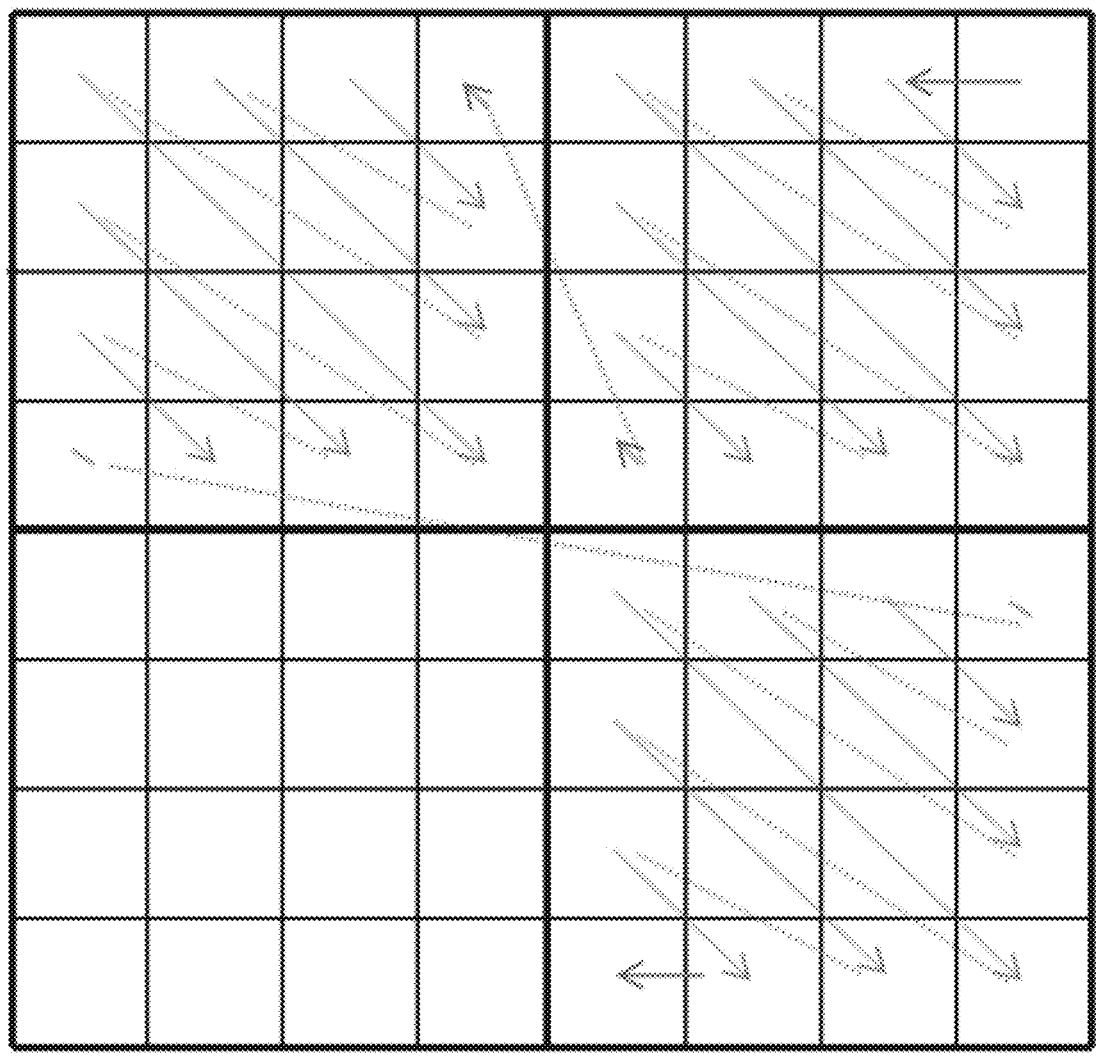
FIG. 14 shows an example of scanning positions 17 through 64 in an 8×8 block for a non-zero element.

The forward RST8×8 with R=16 uses 16×64 matrices so that it produces non-zero coefficients only in the top-left 4×4 region within the given 8×8 region. In other words, if RST is applied then the 8×8 region except the top-left 4×4 region generates only zero coefficients. As a result, RST index is not coded when any non-zero element is detected within 8×8 block region other than top-left 4×4 (which is depicted in FIG. 14) because it implies that RST was not applied. In such a case, RST index is inferred to be zero.

2.11.7 Zero-Out Range

Usually, before applying the invert RST on a 4×4 sub-block, any coefficient in the 4×4 sub-block may be non-zero. However, it is constrained that in some cases, some coefficients in the 4×4 sub-block must be zero before invert RST is applied on the sub-block.

Let nonZeroSize be a variable. It is required that any coefficient with the index no smaller than nonZeroSize when it is rearranged into a 1-D array before the invert RST must be zero.

When nonZeroSize is equal to 16, there is no zero-out constrain on the coefficients in the top-left 4×4 sub-block.

In WET-N0193, when the current block size is 4×4 or 8×8, nonZeroSize is set equal to 8 (that is, coefficients with the scanning index in the range [8, 15] as show in FIG. 14, shall be 0). For other block dimensions, nonZeroSize is set equal to 16.

2.12 Affine Linear Weighted Intra Prediction (ALWIP) or Matrix Based Intra Prediction (MIP)

Affine linear weighted intra prediction (ALWIP) or matrix based intra prediction (MIP)) is proposed in JVET-N0217.

In JVET-N0217, two tests are conducted. In test 1, ALWIP is designed with a memory restriction of 8K bytes and at most 4 multiplications per sample. Test 2 is similar to test 1, but further simplifies the design in terms of memory requirement and model architecture.

Single set of matrices and offset vectors for all block shapes.

Reduction of number of modes to 19 for all block shapes.

Reduction of memory requirement to 5760 10-bit values, that is 7.20 Kilobyte.

Linear interpolation of predicted samples is carried out in a single step per direction replacing iterative interpolation as in the first test.

2.13 Sub-Block Transform

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode.

Figure 15:
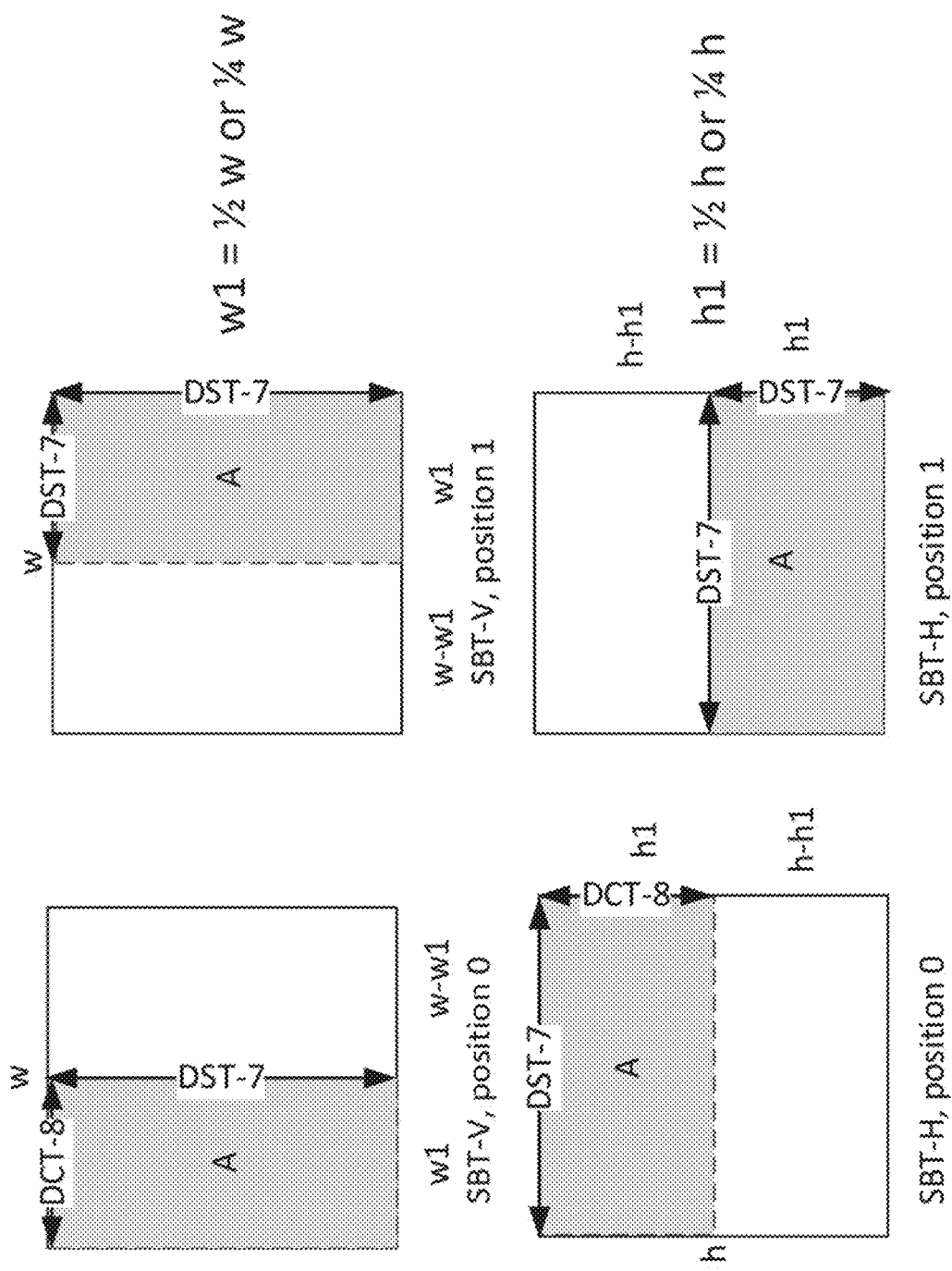
FIG. 15 shows an example of sub-block transform modes (SBT)-V and SBT-H.

In sub-block transform, position-dependent transform is applied on luma transform blocks in SBT-V and SBT-H (chroma transform block (TB) always using DCT-2). The two positions of SBT-H and SBT-V are associated with different core transforms. More specifically, the horizontal and vertical transforms for each SBT position is specified in FIG. 15. For example, the horizontal and vertical transforms for SBT-V position 0 is DCT-8 and DST-7, respectively. When one side of the residual transform unit (TU) is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

3 Examples of Drawbacks in Existing Implementations

The current design has the following problems:

Primary transforms (including DCT-2, DST-7, and DCT-8) may not work well for different prediction modes.

Primary transforms may not work well for some block sizes.

Primary transforms may not work well for different color components.

4 Exemplary Methods for Multiple Transforms

Embodiments of the presently disclosed technology overcome drawbacks of existing implementations, thereby providing video coding with higher coding efficiencies but lower computational complexity. Methods for multiple transforms, and as described in the present document, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

In the following examples, a CU may comprise information associated to all the three color components with the single tree coding structure. Or a CU may comprise information only associated to the luma color component with the mono-color coding. Or a CU may comprise information only associated to the luma color component (e.g., Y component in YCbCr format or G component in green, blue, red (GBR) format) with the dual tree coding structure. Or a CU may comprise information only associated to the two chroma components (e.g., Cb and Cr components in YCbCr format or B and R components in GBR format) with the dual-tree coding structure.

In the following examples, a "block" may refer to coding unit (CU) or a transform unit (TU) or any rectangle region of video data. a "current block" may refer to a current being decoded/coded coding unit (CU) or a current being decoded/coded transform unit (TU) or any being decoded/coded coding rectangle region of video data. "CU" or "TU" may be also known as "coding block" and"transform block".

In the following examples, the term "transform" may refer to the process of transform, or it may refer to the transform matrix.

In the following examples, a "current block" may refer to a current being decoded/coded coding unit (CU) or a current being decoded/coded transform unit (TU).

In the following examples, coding information may include prediction mode (e.g., intra/inter/IBC mode), motion vector, reference picture, inter prediction direction, intra prediction mode, CIIP (combined intra inter prediction) mode, ISP mode, affine intra mode, employed transform core, transform skip flag, etc., i.e., information required for encoding.

In the following examples, the primary transform indicates the transform to be applied to the prediction error before quantization and/or secondary transform, if needed. At decoder side, the primary transform indicates the transform to be used to generate a temporary block which is used to derive the final reconstruction block of a block.

In the following examples, the secondary transform (e.g., LFNST) indicates the transform to be applied to the prediction error after a primary transform, and before quantization if needed. At decoder side, the secondary transform indicates the transform to be used to generate a temporary block which is used as an input to the primary transform process.

1. The primary transform (matrix) included in a transform set may be one of but not limited to variances of DCT-II, DST-VII, DCT-VIII, Transform skip mode, Identity transform, or transform from training (like Karhunen-Loeve Transform (KLT) based transform).

2. The selection of primary transform matrices may depend on the color component.
   a. In one example, a first set of transform matrices may be used for luma (or G) component, and a second set for chroma components (or B/R).
   b. In one example, each color component may correspond to an individual transform set.

3. The selection of primary transform matrices may depend on the block size.
   a. In one example, two or more sets of primary transform matrices may be defined for different block sizes.
   b. In one example, if both the width and the height of a block are smaller than M, a first set of primary transform matrices may be used, e.g. M=8, 16, 32. Otherwise, a second set of primary transform matrices may be used.
   c. In one example, if the width or the height of a block is smaller than M, a first set of primary transform matrices may be used, e.g. M=8, 16, 32. Otherwise, a second set of primary transform matrices may be used.

4. The selection of primary transform matrices may depend on the prediction mode.
   a. In one example, two different sets of primary transform matrices may be specified for intra mode and inter mode, respectively.
   b. In one example, two or more different sets of primary transform matrices may be specified for intra mode.
   c. In one example, two or more different sets of primary transform matrices may be specified for inter mode.
   d. In one example, transMatrix with transform dimension equal to 4, 8, 16, 32 are included in the transform set.
      i. In one example, DCT-8 is not used for intra mode when transMatrix is used.

if transform dimension is equal to 4, the following applies:

$$transMatrix[m][n] = \begin{Bmatrix} \{ & & & & \} \\ \{ & 46 & 80 & 77 & 44 & \} \\ \{ & 71 & 52 & -49 & -79 & \} \\ \{ & 82 & -42 & -48 & 75 & \} \\ \{ & -51 & 75 & -75 & 50 & \} \\ \}, & & & & \end{Bmatrix}$$

Otherwise, if transform dimension is equal to 8, the following applies:

$$
transMatrix[m][n] = \begin{Bmatrix} \{ & & & & & & & & \} \\ \{ -33 & -60 & -80 & -90 & -85 & -66 & -41 & -21 & \} \\ \{ -48 & -76 & -71 & -23 & 43 & 84 & 85 & 56 & \} \\ \{ -68 & -75 & -10 & 69 & 76 & -5 & -77 & -77 & \} \\ \{ -87 & -40 & 74 & 60 & -54 & -67 & 34 & 77 & \} \\ \{ 76 & -16 & -76 & 51 & 55 & -84 & -24 & 88 & \} \\ \{ 79 & -69 & -14 & 78 & -70 & 3 & 72 & -72 & \} \\ \{ 62 & -87 & 65 & -22 & -27 & 69 & -88 & 58 & \} \\ \{ 35 & -59 & 75 & -82 & 80 & -71 & 58 & -31 & \} \\ \}, & & & & & & & & \end{Bmatrix}
$$

Otherwise, if transform dimension is equal to 16, the following applies:

$transMatrix[m][n] =$ $$
\begin{Bmatrix}
\{ & & & & & & & & & & & & & & & & \} \\
\{ -24 & -40 & -53 & -65 & -75 & -82 & -87 & -89 & -87 & -82 & -74 & -63 & -50 & -37 & -25 & -14 & \} \\
\{ -36 & -60 & -75 & -80 & -77 & -64 & -41 & -9 & 26 & 58 & 81 & 91 & 89 & 75 & 56 & 35 & \} \\
\{ -51 & -80 & -85 & -64 & -27 & 17 & 58 & 83 & 84 & 58 & 13 & -36 & -73 & -87 & -78 & -55 & \} \\
\{ -61 & -87 & -69 & -16 & 47 & 85 & 81 & 33 & -31 & -76 & -81 & -41 & 21 & 71 & 86 & 66 & \} \\
\{ 66 & 78 & 28 & -47 & -88 & -61 & 12 & 77 & 81 & 19 & -58 & -89 & -49 & 29 & 82 & 80 & \} \\
\{ -78 & -68 & 17 & 88 & 67 & -26 & -86 & -51 & 40 & 84 & 33 & -56 & -85 & -20 & 63 & 84 & \} \\
\{ 83 & 45 & -61 & -82 & 12 & 87 & 36 & -68 & -72 & 30 & 88 & 16 & -79 & -60 & 36 & 84 & \} \\
\{ -95 & -14 & 95 & 30 & -87 & -40 & 76 & 55 & -63 & -63 & 50 & 70 & -34 & -76 & 10 & 77 & \} \\
\{ 77 & -17 & -77 & 32 & 70 & -48 & -62 & 63 & 52 & -77 & -40 & 86 & 29 & -94 & -26 & 96 & \} \\
\{ 83 & -45 & -60 & 77 & 19 & -91 & 31 & 72 & -69 & -34 & 87 & -16 & -78 & 58 & 54 & -80 & \} \\
\{ 77 & -69 & -19 & 86 & -58 & -36 & -90 & -47 & -46 & 89 & -32 & -58 & 83 & -15 & -74 & 72 & \} \\
\{ -76 & 91 & -33 & -47 & 90 & -64 & -9 & 74 & -78 & 19 & 54 & -86 & 48 & 29 & -83 & 61 & \} \\
\{ -56 & 85 & -67 & 17 & 41 & -79 & 76 & -34 & -26 & 75 & -87 & 53 & 13 & -76 & 97 & -58 & \} \\
\{ 49 & -82 & 89 & -73 & 36 & 13 & -56 & 82 & -84 & 59 & -15 & -33 & 70 & -88 & 77 & -38 & \} \\
\{ -30 & 58 & -79 & 89 & -87 & 75 & -51 & 22 & 10 & -41 & 67 & -83 & 86 & -78 & 59 & -28 & \} \\
\{ -14 & 28 & -42 & 54 & -63 & 74 & -84 & 91 & -92 & 87 & -80 & 72 & -61 & 50 & -35 & 15 & \} \\
\}, & & & & & & & & & & & & & & & &
\end{Bmatrix}
$$

Otherwise, if transform dimension is equal to 32, the following applies:

$transMatrix[m][n] = transMatrixCol0to15[m][n]$ with $m = 0..15, n = 0..15 transMatrixCol0to15 =$ $$
\begin{Bmatrix}
\{ & & & & & & & & & & & & & & & & \} \\
\{ 25 & 33 & 40 & 47 & 54 & 61 & 67 & 73 & 78 & 83 & 86 & 87 & 88 & 88 & 88 & 87 & \} \\
\{ -43 & -56 & -67 & -75 & -81 & -84 & -85 & -82 & -77 & -70 & -61 & -49 & -34 & -18 & 1 & 19 & \} \\
\{ 61 & 80 & 90 & 92 & 87 & 75 & 58 & 36 & 11 & -15 & -40 & -60 & -75 & -84 & -87 & -84 & \} \\
\{ 57 & 73 & 79 & 75 & 59 & 35 & 5 & -27 & -54 & -74 & -82 & -81 & -68 & -45 & -13 & 22 & \} \\
\{ -63 & -78 & -77 & -57 & -24 & 15 & 52 & 79 & 88 & 77 & 50 & 14 & -25 & -59 & -80 & -84 & \} \\
\{ -72 & -84 & -68 & -33 & 12 & 53 & 79 & 83 & 65 & 31 & -14 & -55 & -81 & -84 & -59 & -14 & \} \\
\{ 78 & 82 & 54 & 1 & -53 & -87 & -88 & -55 & 0 & 56 & 92 & 89 & 48 & -11 & -66 & -97 & \} \\
\{ 83 & 77 & 29 & -32 & -73 & -79 & -45 & 11 & 58 & 74 & 53 & 4 & -50 & -81 & -66 & -15 & \} \\
\{ 101 & 81 & 8 & -71 & -105 & -72 & 6 & 76 & 95 & 53 & -22 & -79 & -82 & -33 & 35 & 80 & \} \\
\{ 76 & 50 & -21 & -78 & -70 & -2 & 66 & 82 & 32 & -44 & -87 & -63 & 8 & 75 & 85 & 25 & \} \\
\{ -96 & -43 & 52 & 97 & 47 & -46 & -92 & -48 & 40 & 88 & 54 & -27 & -81 & -58 & 16 & 72 & \} \\
\{ -106 & -27 & 85 & 90 & -4 & -87 & -72 & 22 & 92 & 58 & -40 & -91 & -42 & 52 & 87 & 22 & \} \\
\{ -55 & -8 & 54 & 45 & -26 & -68 & -20 & 63 & 69 & -19 & -88 & -43 & 62 & 90 & -1 & -94 & \} \\
\{ -105 & 17 & 106 & 31 & -84 & -72 & 46 & 96 & 6 & -90 & -54 & 58 & 86 & -11 & -88 & -37 & \} \\
\{ -101 & 32 & 102 & -9 & -91 & -15 & 81 & 40 & -67 & -59 & 40 & 73 & -9 & -77 & -17 & 70 & \} \\
\{ 82 & 51 & 82 & -51 & -85 & 46 & 88 & -34 & -88 & 20 & 94 & -6 & -97 & -10 & 88 & 21 & \{ \\
\}, & & & & & & & & & & & & & & & &
\end{Bmatrix}
$$

$transMatrix[m][n] = transMatrixCol16to31[m - 16][n]$ with $m = 16..31, n = 0..15 transMatrixCol16to31 =$ {
| { | 84 | 81 | 78 | 74 | 70 | 66 | 82 | 57 | 52 | 47 | 40 | 33 | 26 | 19 | 14 | 9 | } |
|---|---|---|---|---|---|---|---|---|---|---|---|---|---|---|---|---|---|
| { | 36 | 51 | 63 | 72 | 80 | 85 | 87 | 87 | 84 | 78 | 71 | 62 | 52 | 41 | 30 | 20 | } |
| { | −74 | −58 | −39 | −17 | 4 | 25 | 44 | 60 | 72 | 79 | 81 | 78 | 72 | 62 | 49 | 34 | } |
| { | 53 | 75 | 87 | 87 | 77 | 59 | 33 | 2 | −31 | −59 | −80 | −92 | −93 | −84 | −69 | −49 | } |
| { | −74 | −50 | −16 | 22 | 56 | 80 | 87 | 79 | 54 | 17 | −23 | −59 | −84 | −94 | −89 | −71 | } |
| { | 36 | 76 | 92 | 80 | 41 | −10 | −57 | −87 | −90 | −67 | −26 | 21 | 60 | 84 | 87 | 72 | } |
| { | −86 | −37 | 27 | 76 | 94 | 75 | 28 | −26 | −67 | −80 | −62 | −22 | 22 | 56 | 68 | 60 | } |
| { | 44 | 81 | 78 | 33 | −31 | −83 | −93 | −54 | 13 | 72 | 98 | 74 | 13 | −55 | −96 | −98 | } |
| { | 71 | 14 | −52 | −79 | −51 | 7 | 60 | 71 | 38 | −21 | −71 | −76 | −34 | 29 | 76 | 84 | } |
| { | −55 | −91 | −53 | 31 | 88 | 75 | 5 | −68 | −90 | −45 | 32 | 87 | 77 | 7 | −66 | −100 | } |
| { | 65 | −5 | −73 | −72 | −3 | 69 | 77 | 11 | −70 | −86 | −19 | 67 | 91 | 34 | −51 | −99 | } |
| { | −66 | −79 | −3 | 77 | 71 | −12 | −80 | −59 | 24 | 78 | 48 | −31 | −76 | −46 | 28 | 80 | } |
| { | −68 | 52 | 109 | 20 | −89 | −83 | 26 | 99 | 46 | −62 | −90 | −6 | 79 | 65 | −19 | −90 | } |
| { | 65 | 69 | −26 | −82 | −17 | 72 | 56 | −41 | −77 | −4 | 73 | 47 | −45 | −72 | 0 | 74 | } |
| { | 40 | −60 | −55 | 46 | 68 | −25 | −83 | −4 | 86 | 44 | −72 | −79 | 36 | 101 | 17 | −106 | } |
| { | −78 | −34 | 72 | 46 | −65 | −60 | 51 | 72 | −31 | −78 | 12 | 82 | 9 | −85 | −31 | 84 | } |

},

5. The selection of primary transform matrices may depend on the intra prediction method (including but not limited to ISP, MIP, MRL, CCLM, BDPCM).
   a. In one example, two or more sets of primary transform matrices may be used for different intra modes.
   b. In one example, a first set of transform matrix may be used for CCLM coded blocks, and a second set of transform matrix may be used for non-CCLM coded blocks.
   c. In one example, a first set of transform matrix may be used for normal intra prediction coded blocks, and a second set of transform matrix may be used for multiple reference line (MRL) blocks.
6. The selection of primary transform matrices may depend on the inter prediction method, including but not limited to merge mode, advanced motion vector prediction (AMVP) mode, Affine mode.
   a. Two or more set of primary transform matrices may be used for different inter modes.
   b. In one example, a first set of transform matrix may be used for merge mode blocks, and for normal inter prediction coded blocks, and a second set of transform matrix may be used for non-merge coded blocks.
   c. In one example, a first set of transform matrix may be used for AMVP mode blocks, and for normal inter prediction coded blocks, and a second set of transform matrix may be used for non-AMVP coded blocks.
7. In one example, a first set of transform matrix may be used when a coding tool X is applied on a block, and a second set of transform matrix may be used when the coding tool X is not applied on the block.
   a. Coding tool X may be: ISP, MIP, luma mapping with chroma scaling (LMCS), adaptive loop filter (ALF), sample adaptive offset (SAO), dependent quantization (DQ), Affine, motion vector difference (SMVD), sub-block transform (SBT), adaptive motion vector resolution (AMVR), sub-block transform (SBT), sub-block transform (SBT), decoder-side motion vector refinement (DMVR), low-frequency non-separable transform (LFNST), local illumination compensation (LIC), overlapped block motion compensation (OBMC), Joint coding of chroma residuals (JCCR), intra block copy (IBC).
8. The selection of primary transform matrices may depend on the transform modes, including but not limited to implicit MTS, explicit MTS, SBT mode, JCCR, different LFNST indices.
   a. In one example, two or more set of primary transform matrices may be used for different transform modes.
   b. In one example, a first set of transform matrices may be used for implicit MTS, and a second set of transform matrix may be used for explicit MTS.
   c. In one example, a first set of transform matrices may be used for SBT mode, and a second set of transform matrix may be used for non-SBT mode.
      i. In one example, transMatrix with transform dimension equal to 4, 8, 16, 32 may be used for SBT.
         1) In one example, DST-7 is not used for SBT when transMatrix is used.

if transform dimension is equal to 4, the following applies:

$$transMatrix[m][n] = \begin{Bmatrix} \{ & & & & \\ \{ & 19 & 50 & 80 & 84 & \} \\ \{ & 61 & 84 & 11 & -75 & \} \\ \{ & 88 & -5 & -75 & 55 & \} \\ \{ & 68 & -83 & 65 & -28 & \} \\ \}, & & & & \end{Bmatrix}$$

Otherwise, if transform dimension is equal to 8, the following applies:

$$transMatrix[m][n] = \begin{Bmatrix} \{ & & & & & & & & \\ \{ & 13 & 27 & 48 & 71 & 86 & 86 & 77 & 62 & \} \\ \{ & -28 & -58 & -84 & -79 & -31 & 36 & 79 & 82 & \} \\ \{ & -64 & -94 & -59 & 31 & 83 & 45 & -34 & -73 & \} \\ \{ & -83 & -62 & 40 & 79 & -21 & -85 & -8 & 80 & \} \\ \{ & -93 & 3 & 88 & -27 & -69 & 58 & 50 & -67 & \} \\ \{ & -84 & 69 & 16 & -78 & 65 & 13 & -82 & 59 & \} \\ \{ & -62 & 91 & -72 & 25 & 29 & -72 & 83 & -43 & \} \\ \{ & -26 & 54 & -72 & 82 & -85 & 78 & -58 & 24 & \} \\ \}, & & & & & & & & \end{Bmatrix}$$

Otherwise, if transform dimension is equal to 16, the following applies:

$transMatrix[m][n] =$

```
{
{   9   14   21   30   40   52   64   75   82   85   86   84   81   76   71   63 }
{  17   27   41   58   75   85   87   78   55   23  -11  -44  -70  -86  -91  -83 }
{ -39  -63  -85  -97  -89  -57   -7   46   80   86   67   32   -8  -44  -65  -67 }
{ -52  -76  -84  -64  -11   52   88   77   22  -47  -87  -82  -38   21   67   79 }
{  81   97   66   -6  -76  -90  -32   50   85   45  -29  -78  -69  -15   45   70 }
{ -83  -75   -9   67   74    2  -72  -66   18   88   57  -38  -94  -58   31   88 }
{  92   56  -42  -90  -20   76   58  -47  -81    8   83   42  -60  -83    2   80 }
{ -90  -18   77   54  -63  -65   48   75  -38  -81   18   89    0  -93  -28   80 }
{  95  -20  -92   14   88  -23  -83   37   72  -54  -61   65   51  -71  -48   70 }
{  86  -56  -64   73   29  -88   19   78  -64  -46   85    2  -84   36   70  -64 }
{  75  -74  -23   88  -55  -38   87  -38  -51   84  -23  -70   81    6  -87   59 }
{ -64   93  -37  -46   83  -46  -33   94  -89   22   52  -77   32   45  -88   51 }
{ -49   87  -72   14   49  -84   76  -29  -32   80  -85   39   28  -81   91  -45 }
{  41  -80   85  -57   11   36  -72   91  -90   69  -28  -24   67  -85   72  -31 }
{  14  -40   66  -83   89  -86   76  -65   62  -69   76  -76   65  -46   23   -5 }
{ -25   57  -76   81  -76   62  -39    9   26  -58   82  -93   93  -80   57  -23 }
},
```

Otherwise, if transform dimension is equal to 32, the following applies:

$transMatrix[m][n] = transMatrixCol0to15[m][n]$ with $m = 0..15, n = 0..15 transMatrixCol0to15 =$

```
{
{   -9  -11  -14  -16  -20  -24  -28  -33  -38  -43  -48  -54  -59  -65  -70  -74 }
{  -19  -24  -30  -37  -45  -53  -61  -68  -75  -79  -84  -86  -87  -84  -79  -72 }
{  -35  -44  -55  -65  -75  -84  -89  -90  -88  -80  -64  -45  -19    9   35   58 }
{   43   55   65   74   79   76   67   51   30    4  -28  -52  -76  -90  -89  -78 }
{  -71  -87  -96  -93  -79  -56  -23   14   49   78   92   89   69   33  -10  -50 }
{  -70  -83  -82  -67  -38   -1   38   69   83   77   49    4  -44  -79  -89  -70 }
{  -86  -95  -80  -41   10   60   91   93   61    6  -52  -89  -92  -55    8   64 }
{  -76  -82  -53    0   56   90   81   35  -24  -71  -83  -52    8   65   86   58 }
{  -89  -78  -29   35   82   87   43  -24  -79  -86  -37   39   88   77    7  -64 }
{   78   63    7  -56  -85  -55   17   76   80   23  -53  -88  -50   29   84   67 }
{   91   58  -25  -90  -82   -8   70   90   31  -56  -91  -39   52   90   40  -52 }
{ -101  -46   52   96   47  -45  -87  -39   53   85   22  -64  -76    2   77   68 }
{   92   27  -74  -90   -3   88   70  -33  -94  -35   67   82  -15  -85  -38   58 }
{  -82   -6   82   60  -43  -86   -4   88   50  -58  -80   13   85   32  -72  -72 }
{  -90   10   98   33  -88  -67   64   93  -32  -99   -3   92   28  -77  -50   65 }
{   68  -15  -74   -6   72   18  -66  -35   69   42  -69  -50   66   52  -57  -63 }
},
```

$transMatrix[m][n] = transMatrixCol16to31[m - 16][n]$ with $m = 16..31, n = 0..15 transMatrixCol16to31 =$

```
{
{ -78  -80  -82  -83  -84  -85  -85  -85  -83  -82  -80  -78  -75  -73  -70  -66 }
{ -62  -49  -32  -15    2   19   35   48   60   71   78   82   86   88   87   83 }
{  76   86   89   87   79   65   47   27    5  -17  -36  -52  -65  -73  -75  -72 }
{ -52  -19   18   51   75   91   94   85   66   37    4  -30  -56  -75  -85  -81 }
{ -76  -83  -73  -49  -12   29   62   80   81   67   39    6  -26  -53  -70  -71 }
{ -25   29   73   94   84   50    1  -48  -83  -93  -78  -42    4   45   72   78 }
{  90   75   29  -29  -70  -81  -62  -18   32   71   80   61   22  -21  -56  -69 }
{  -3  -61  -86  -66   -9   54   89   79   24  -45  -90  -92  -51   10   65   88 }
{ -87  -47   21   76   77   29  -36  -79  -74  -17   51   92   78   17  -53  -88 }
{ -11  -78  -83  -20   62   84   51  -32  -90  -76    1   78   93   40  -40  -88 }
{ -93  -34   57   89   29  -56  -81  -34   44   83   43  -38  -84  -57   22   79 }
{ -29  -86  -49   45   87   32  -57  -84  -18   71   79   -3  -83  -75   13   82 }
{  73  -12  -79  -45   51   83    7  -76  -66   26   88   39  -62  -86   -3   78 }
{  44   92    2  -95  -46   69   76  -22  -87  -23   72   63  -42  -90  -11   80 }
{  64  -47  -80   20   84    8  -74  -38   60   65  -35  -82    7   82   24  -65 }
{  56   68  -47  -85   43   96  -29 -106   12  107    8 -105  -24   97   45  -80 }
},
``` ii. In one example, transMatrix with transform dimension equal to 4, 8, 16, 32 may be used for SBT.
   1) In one example, DCT-8 is not used for SBT when transMatrix is used.

if transform dimension is equal to 4, the following applies:

$$transMatrix[m][n] = \begin{Bmatrix} \{ -90 & -80 & -43 & -13 \} \\ \{ -75 & 31 & 88 & 44 \} \\ \{ -49 & 85 & -34 & -75 \} \\ \{ -16 & 43 & -75 & 93 \} \end{Bmatrix},$$

Otherwise, if transform dimension is equal to 8, the following applies:

$$transMatrix[m][n] = \begin{Bmatrix} \{ 71 & 84 & 87 & 81 & 64 & 41 & 21 & 9 \} \\ \{ 85 & 74 & 21 & -46 & -88 & -83 & -50 & -20 \} \\ \{ 77 & 23 & -62 & -83 & -8 & 75 & 86 & 49 \} \\ \{ 73 & -19 & -82 & -2 & 85 & 16 & -82 & -79 \} \\ \{ 67 & -63 & -46 & 78 & 6 & -84 & 21 & 92 \} \\ \{ 53 & -81 & 25 & 53 & -86 & 45 & 48 & -92 \} \\ \{ 39 & -82 & 84 & -51 & -1 & 53 & -86 & 69 \} \\ \{ -19 & 47 & -66 & 74 & -78 & -81 & -75 & 46 \} \end{Bmatrix},$$

Otherwise, if transform dimension is equal to 16, the following applies:

transMatrix[m][n] =

$$\begin{Bmatrix} \{ 75 & 81 & 85 & 87 & 86 & 85 & 81 & 76 & 67 & 56 & 44 & 33 & 24 & 16 & 10 & 6 \} \\ \{ -85 & -89 & -79 & -58 & -29 & 2 & 37 & 69 & 88 & 93 & 86 & 72 & 54 & 36 & 21 & 12 \} \\ \{ -76 & -70 & -38 & 7 & 52 & 84 & 89 & 68 & 24 & -28 & -69 & -91 & -90 & -74 & -49 & -26 \} \\ \{ 80 & 62 & 4 & -59 & -89 & -74 & -18 & 49 & 86 & 75 & 23 & -42 & -82 & -87 & -66 & -38 \} \\ \{ 71 & 37 & -35 & -85 & -65 & 5 & 72 & 80 & 18 & -62 & -91 & -49 & 27 & 82 & 91 & 63 \} \\ \{ -83 & -16 & 73 & 86 & 4 & -78 & -69 & 16 & 80 & 50 & -38 & -87 & -45 & 40 & 88 & 72 \} \\ \{ 71 & -8 & -84 & -44 & 61 & 76 & -25 & -90 & -17 & 81 & 56 & -50 & -84 & -13 & 75 & 88 \} \\ \{ 69 & -30 & -80 & 12 & 83 & 0 & -83 & -16 & 84 & 29 & -77 & -52 & 71 & 74 & -42 & -102 \} \\ \{ 81 & -64 & -72 & 69 & 53 & -74 & -41 & 76 & 23 & -81 & -6 & 83 & -11 & -84 & 5 & 89 \} \\ \{ 61 & -71 & -26 & 80 & -22 & -71 & 63 & 42 & -90 & 8 & 88 & -55 & -60 & 80 & 37 & -91 \} \\ \{ -57 & 86 & -16 & -69 & 80 & 3 & -80 & 68 & 16 & -85 & 59 & 38 & -91 & 36 & 66 & -79 \} \\ \{ 46 & -83 & 51 & 21 & -77 & 64 & 6 & -77 & 94 & -43 & -35 & 84 & -65 & -14 & 89 & -79 \} \\ \{ 37 & -80 & 76 & -30 & -35 & 78 & -79 & 34 & 30 & -82 & 97 & -65 & 2 & 61 & -89 & 60 \} \\ \{ 4 & -17 & 35 & -54 & 70 & -78 & 78 & -72 & 80 & -76 & 81 & -82 & 81 & -72 & 50 & -22 \} \\ \{ -24 & 59 & -81 & 94 & -94 & 81 & -57 & 29 & 2 & -30 & 51 & -68 & 81 & -81 & 65 & -33 \} \end{Bmatrix},$$

Otherwise, if transform dimension is equal to 32, the following applies:

transMatrix[m][n]=transMatrixCo10to15[m][n]   with m=0..15, n=0..15

*transMatrixCol0to15* =

{
{ −73 −76 −78 −81 −83 −85 −86 −86 −87 −87 −87 −85 −83 −81 −77 −74 }
{ −94 −96 −96 −92 −85 −74 −60 −47 −34 −16  0  18  35  50  61  72 }
{  76  81  76  63  43  21  −1 −25 −46 −64 −80 −91 −93 −85 −69 −48 }
{  69  70  59  41  15 −12 −41 −70 −89 −92 −82 −61 −31   7  42  73 }
{ −80 −77 −56 −19  24  62  91  98  81  43   0 −44 −78 −91 −81 −60 }
{  80  69  38 −11 −54 −82 −92 −70 −24 −29  66  82  70  35  −9 −55 }
{ −88 −62  −3  49  80  85  54   5 −50 −87 −84 −49  16  71  92  71 }
{ −84 −49  17  64  74  55  14 −34 −72 −67 −27  33  78  75  27 −34 }
{ −99 −49  40  93  86  32 −47 −88 −65  −3  59  83  52 −12 −71 −90 }
{ −91 −38  52 100  58 −24 −83 −74   1  76  85  22 −62 −89 −37  40 }
{  67   9 −54 −70 −18  51  80  35 −58 −93 −29  58  88  29 −63 −90 }
{  70   1 −95 −73  43 117  52 −72 −113 −27  76  90   4 −74 −64  14 }
{ −69  11  82  45 −53 −72  −1  64  56 −32 −80 −14  74  58 −37 −93 }
{  71 −28 −85  −8  71  39 −50 −58  23  64  14 −67 −63  37 102  19 }
{  81 −41 −104  11 101  28 −89 −54  70  60 −48 −72  28  77  −1 −82 }
{  67 −45 −81  42  78 −23 −78   8  71  −5 −64 −10  68  23 −75 −41 }
},

*transMatrix*[*m*][*n*] = *transMatrixCol*16*to*31[*m* − 16][*n*] with *m* = 16 ..31, *n* = 0 ..15*transMatrixCol*16*to*31 =

{
{ −69 −64 −58 −52 −46 −42 −38 −33 −27 −23 −18 −15 −13 −10  −8  −6 }
{  80  85  85  84  81  76  72  67  60  54  46  40  33  28  23  17 }
{ −24  −2  19  38  55  72  84  90  91  87  80  71  60  52  43  31} }
{  91  97  92  72  43   9 −23 −51 −70 −82 −86 −81 −71 −61 −48 −35 }
{ −23  17  50  76  86  81  62  35   2 −36 −60 −77 −81 −76 −66 −49 }
{ −80 −73 −47 −10  35  71  92  90  62  19 −28 −71 −91 −90 −81 −63 }
{  25 −33 −72 −83 −66 −22  29  70  90  79  39 −15 −58 −81 −85 −68 }
{ −81 −89 −45  25  82 101  60  −6 −66 −94 −82 −40  21  75  98  86 }
{ −48  28  95  91  24 −54 −88 −63  −2  55  82  57  13 −38 −73 −64 }
{ −79  60   5 −64 −88 −39 −41  82  58  −6 −75 −93 −41  30  76  77 }
{ −22  59  82  35 −58 −103 −39  61  92  47 −38 −99 −68   9  79  86 }
{  74  41 −30 −71 −39  35  77  36 −44 −78 −26  62  79  21 −55 −75 }
{ −11  88  64 −43 −96 −25  77  86 −20 −94 −62  47  99  47 −54 −92 }
{ −102 −73  70  97 −22 −97 −27  84  65 −44 −92 −14  86  70 −30 −67 }
{ −20  72  47 −54 −64  34  75  −8 −77 −23  71  58 −58 −97  12 106 }
}, d. In one example, a first set of transform matrices may be used for JCCR mode, and a second set of transform matrix may be used for non-JCCR mode.
e. In one example, the sets of transform matrices may be selected depending on LFNST indices.
  i. In one example, signaling of MTS index may be conditioned on the LFNST index.
    1) In one example, MTS index may not be signaled when LFNST index is equal to some specified values, e.g. 1 and 2.
9. In above examples, for two sets of transforms (e.g., denoted by a first and a second set, for primary and/or secondary transform), the following may apply:
  a. In one example, the second set may include all transforms in the first set and has additional ones.
    i. Alternatively, the first set may include all transforms in the second set and has additional ones
  b. In one example, at least one matrix of the first transform set is not included in a second transform set or at least one matrix of the second transform set is not included in a first transform set if the two sets are different.
  c. In one example, the two sets may have the same number of transforms.
  d. In one example, the two sets may have different numbers of transforms.

Zero Out Range in Primary/Secondary Transform
10. The Zero-out range in the primary transform (e.g. including MTS and DCT2) may depend on the prediction mode.
  a. In one example, zero-out ranges in the primary transform may be different for intra mode and inter mode.
  b. In one example, zero-out ranges in the primary transform for intra mode and inter mode may be different with some specific block sizes.
  c. In one example, whether zero-out operation is applied may depend on the prediction mode.
11. The Zero-out range in secondary transform may depend on whether the block size is smaller (or no smaller, or greater, or no greater) than a specified size.
  a. In one example, different zero-out ranges may be specified for different block sizes.
    i. In one example, the zero-out range may be set to X when the block size is smaller than M×N. (In other words, any coefficients with a scanning order index larger than or equal to X should be equal to zero.)
   1) In one example, when the size (width or height, or both width and height) of a block is smaller than or equal to 8, the zero-out range of the block may be set to X.
  ii. In one example, the zero-out range may be set to Y when the block size is larger than M×N. (In other words, any coefficients with a scanning order index larger than or equal to Y should be equal to zero.)
   1) In one example, when the size (width or height, or both width and height) of a block is larger than or equal to 8, the zero-out range of the block may be set to Y.
   2) In one example, when the width of a block is larger than 8 and the height is larger than or equal to 8, or the width of a block is larger than or equal to 8 and the height is larger than 8, the zero-out range of the block may be set to Y.
  iii. For example, X is not identical to Y.
  iv. For example, X is equal to 16.
  v. For example, Y is equal to 32.
12. The Zero-out range in secondary transform may depend on the sample number of the block.
  a. In one example, different zero-out ranges may be specified based on the sample number of the transform block.
   i. In one example, the zero-out range may be set to X when the sample number of the transform block is smaller than N. (In other words, any coefficients with a scanning order index larger than or equal to X should be equal to zero.)
    1) In one example, when the sample number of a block is smaller than 256, the zero-out range of the block may be set to X.
   ii. In one example, the zero-out range may be set to Y when the sample number of the transform block is larger than N. (In other words, any coefficients with a scanning order index larger than or equal to Y should be equal to zero.)
    1) In one example, when the sample number of a block is larger than 256, the zero-out range of the block may be set to Y.
   iii. For example, X is not identical to Y.
   iv. For example, X is equal to 16.
   v. For example, Y is equal to 32.
13. The zero-out operation may be disabled in primary transform or secondary transform (a.k.a. LFNST).
  a. In one example, zero-out may be disabled for some block sizes in the primary transform.
  b. In one example, zero-out may be disabled for some transform modes in primary or secondary transform, including but not limited to implicit MTS, explicit MTS, SBT mode, JCCR, different LFNST indices.
   i. In one example, zero-out may be disabled for MTS.
   ii. In one example, zero-out may be disabled for DCT2.
  c. In one example, zero-out may be disabled for some sizes in the secondary transform.
   i. In one example, zero-out may be disabled for LFNST4×4.
   ii. In one example, zero-out may be disabled for LFNST8×8.
   iii. In one example, zero-out may be disabled for blocks larger than M×N, e.g. M=16, N=16.
   iv. In one example, zero-out may be disabled when the sample number of the block is larger than N, e.g. N=64.
14. The zero-out range may be enlarged in primary transform or secondary transform (a.k.a. LFNST).
  a. In one example, zero-out range may be enlarged for some block sizes in primary transform.
  b. In one example, zero-out range may be enlarged for some transform modes in primary or secondary transform, including but not limited to implicit MTS, explicit MTS, SBT mode, JCCR, different LFNST indices.
   i. In one example, zero-out range may be enlarged for MTS.
   ii. In one example, zero-out range may be enlarged for DCT2.
  c. In one example, zero-out range may be enlarged for some block sizes in secondary transform.
   i. In one example, zero-out range may be enlarged for LFNST4×4.
   ii. In one example, zero-out range may be enlarged for LFNST8×8.
   iii. In one example, zero-out range may be enlarged to X for blocks larger than M×N, e.g. M=16, N=16, X=32.
   iv. In one example, zero-out range may be enlarged to X when the sample number of the block is larger than N, e.g. N=64, X=32.
15. The transform process may be implemented in a butterfly computation manner.
  a. In one example, some primary transform may be implemented through butterfly computation.
  b. In one example, some secondary transform may be implemented through butterfly computation.
  c. In one example, the transform matrices may be adjusted to facilitate butterfly computation.

The examples described above may be incorporated in the context of the method described below, e.g., method 1600, which may be implemented at a video encoder or decoder.

Figure 16:
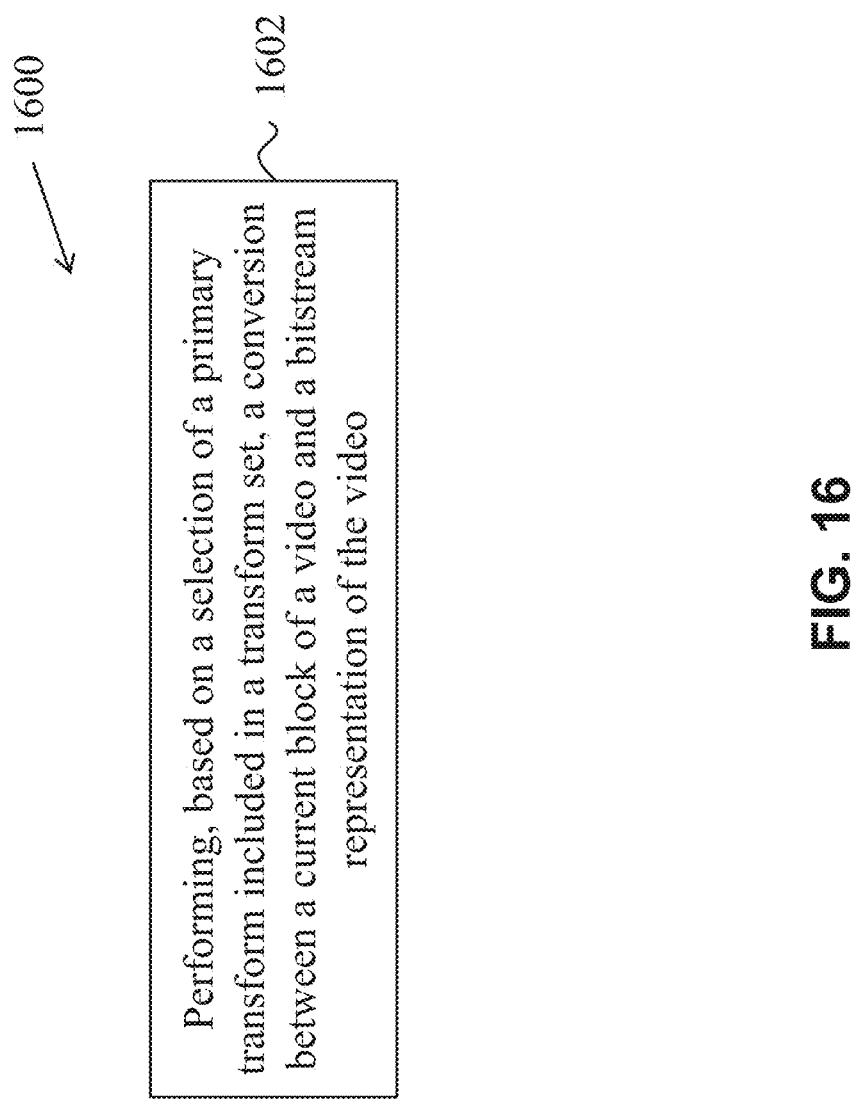
FIG. 16 shows a flowchart of an example of a method for multiple transforms, in accordance with the disclosed technology.

FIG. 16 shows a flowchart of an exemplary method of video processing. The method 1600 includes, at step 1602, performing, based on a selection of a primary transform included in a transform set, a conversion between a current block of a video and a bitstream representation of the video. In some embodiments, the conversion comprises using the primary transform, and the primary transform comprises one or more of a Discrete Cosine Transform (DCT)-II, a Discrete Sine Transform (DST)-VII, a DCT-VII, a transform skip mode, an identity transform, or a transform based on a training process.

In some embodiments, the following technical solutions may be implemented:

1. A method of video processing, comprising performing, based on a selection of a primary transform included in a transform set, a conversion between a current block of a video and a bitstream representation of the video, wherein the conversion comprises using the primary transform, and wherein the primary transform comprises one or more of a Discrete Cosine Transform (DCT)-II, a Discrete Sine Transform (DST)-VII, a DCT-VII, a transform skip mode, an identity transform, or a transform based on a training process.

2. The method of solution 1, wherein the transform based on the training process is a transform based on a Karhunen-Loeve Transform (KLT).

3. The method of solution 1, wherein the selection of the primary transform is based on a chroma component of the video.

4. The method of solution 3, wherein the transform set comprises a first set of transform matrices that is used for a luma component of the video and a second set of transform matrices that is used for the chroma component.

5. The method of solution 1, wherein the selection of the primary transform is based on a size of the current block.

6. The method of solution 5, wherein a first primary transform matrix is selected when a height or a width of the current block is smaller than M, wherein a second primary transform matrix is selected otherwise, and wherein M is a positive integer.

7. The method of solution 1, wherein the selection of the primary transform is based on a prediction mode of the current block.

8. The method of solution 7, wherein the prediction mode is an inter mode or an intra mode.

9. The method of solution 1, wherein the selection of the primary transform is based on an intra prediction method applied to the current block.

10. The method of solution 9, wherein the intra prediction method comprises one or more of an intra subblock partitioning (ISP), a matrix-based intra prediction (MIP), a multiple reference line (MRL) method, a cross-component linear model (CCLM), and block differential pulse-code modulation coding (BDPCM).

11. The method of solution 1, wherein the selection of the primary transform is based on an inter prediction method applied to the current block.

12. The method of solution 1, wherein the transform set comprises a first transform set when a coding tool is applied to the current block, and wherein the transform set comprises a second transform set when the coding tool is not applied to the current block.

13. The method of solution 12, wherein the coding tool comprises one or more of an intra subblock partitioning (ISP), a matrix-based intra prediction (MIP), luma mapping with chroma scaling (LMCS), adaptive loop filtering (ALF), a sample adaptive offset (SAO), dependent quantization (DQ), Affine, symmetric motion vector difference (SMVD), a sub-block transform (SBT), adaptive motion vector resolution (AMVR), bi-directional optical flow (BDOF), prediction refinement with optical flow (PROF), decoder-side motion vector refinement (DMVR), a low-frequency non-separable transform (LFNST), local illumination compensation (LIC), overlapped block motion compensation (OBMC), joint coding or chrominance residuals (JCCR), or an intra block copy (IBC).

14. The method of solution 1, wherein the selection of the primary transform is based on a transform mode of the current block.

15. The method of solution 14, wherein the transform mode comprises one or more of an implicit MTS, an explicit MTS, an SBT mode, JCCR, and different LFNST indices.

16. The method of solution 1, wherein the transform set comprises a first transform set and a second transform set.

17. The method of solution 16, wherein a first number of transforms in the first transform set is identical to a second number of transforms in the second transform set.

18. The method of solution 1, wherein a zero-out range of the primary transform is based on a prediction mode of the current block.

19. The method of solution 1, wherein the conversion further comprises using a secondary transform included in the transform set.

20. The method of solution 19, wherein a zero-out range of the secondary transform is based on a comparison of at least one dimension of the current block to a predetermined threshold.

21. The method of solution 19, wherein a zero-out range of the secondary transform is based on a sample number of the current block.

22. The method of solution 19, wherein a zero-out operation in the primary transform and/or the secondary transform is disabled.

23. The method of solution 19, wherein a zero-out range of the primary transform and/or the secondary transform is enlarged.

24. The method of any of solutions 1 to 23, wherein the primary transform is implemented in using a butterfly computation.

25. The method of any of solutions 1 to 24, wherein the conversion generates the current block from the bitstream representation.

26. The method of any of solutions 1 to 24, wherein the conversion generates the bitstream representation from the current block.

27. An apparatus in a video system comprising a processor and a non-transitory memory with instructions thereon, wherein the instructions upon execution by the processor, cause the processor to implement the method in any one of solutions 1 to 26.

28. A computer program product stored on a non-transitory computer readable media, the computer program product including program code for carrying out the method in any one of solutions 1 to 26.

Figure 17:
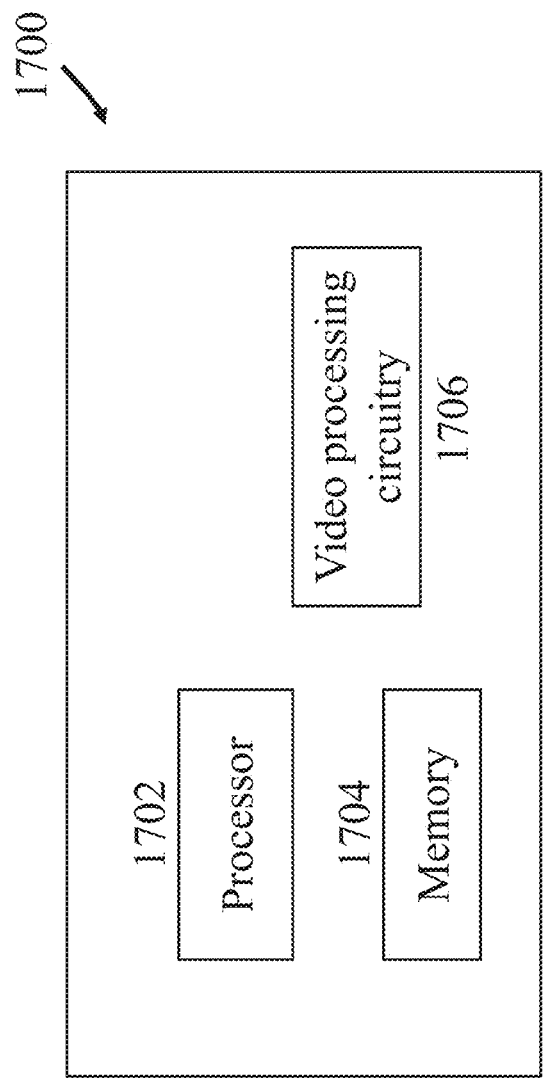
FIG. 17 is a block diagram of an example of a video processing apparatus.

FIG. 17 is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706. The processor(s) 1702 may be configured to implement one or more methods (including, but not limited to, method 1600) described in the present document. The memory (memories) 1704 may be used for storing data and code used for implementing the methods and techniques described herein. The video processing hardware 1706 may be used to implement, in hardware circuitry, some techniques described in the present document.

In some embodiments, the video coding methods and technical solutions described in this document may be implemented using an apparatus that is implemented on a hardware platform as described with respect to FIG. 17.

Figure 18:
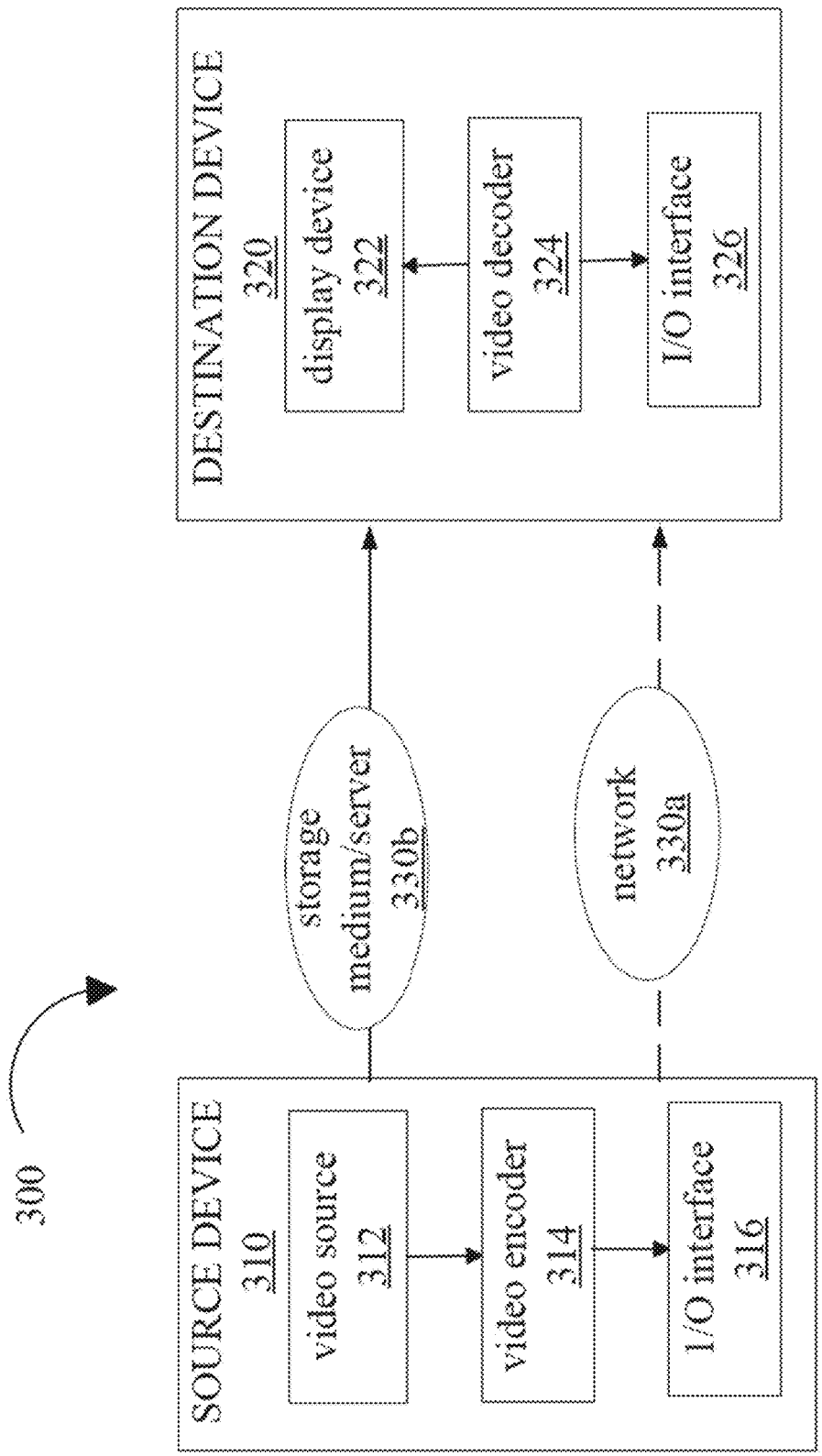
FIG. 18 is a block diagram that illustrates an example video coding system.

FIG. 18 is a block diagram that illustrates an example video coding system 300 that may utilize the techniques of this disclosure.

As shown in FIG. 18, video coding system 300 may include a source device 310 and a destination device 320. Source device 310 generates encoded video data which may be referred to as a video encoding device. Destination device 320 may decode the encoded video data generated by source device 310 which may be referred to as a video decoding device.

Source device 310 may include a video source 312, a video encoder 314, and an input/output (I/O) interface 316.

Video source 312 may include a source such as a video capture device, an interface to receive video data from a video content provider, and/or a computer graphics system for generating video data, or a combination of such sources. The video data may comprise one or more pictures. Video encoder 314 encodes the video data from video source 312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 316 may include a modulator/demodulator (modem) and/or a transmitter. The encoded video data may be transmitted directly to destination device 320 via I/O interface 316 through network 330a. The encoded video data may also be stored onto a storage medium/server 330b for access by destination device 320.

Destination device 320 may include an I/O interface 326, a video decoder 324, and a display device 322.

I/O interface 326 may include a receiver and/or a modem. I/O interface 326 may acquire encoded video data from the source device 310 or the storage medium/server 330b. Video decoder 324 may decode the encoded video data. Display device 322 may display the decoded video data to a user. Display device 322 may be integrated with the destination device 320, or may be external to destination device 320 which be configured to interface with an external display device.

Video encoder 314 and video decoder 324 may operate according to a video compression standard, such as the High Efficiency Video Coding (HEVC) standard, Versatile Video Coding (VVC) standard and other current and/or further standards.

Figure 19:
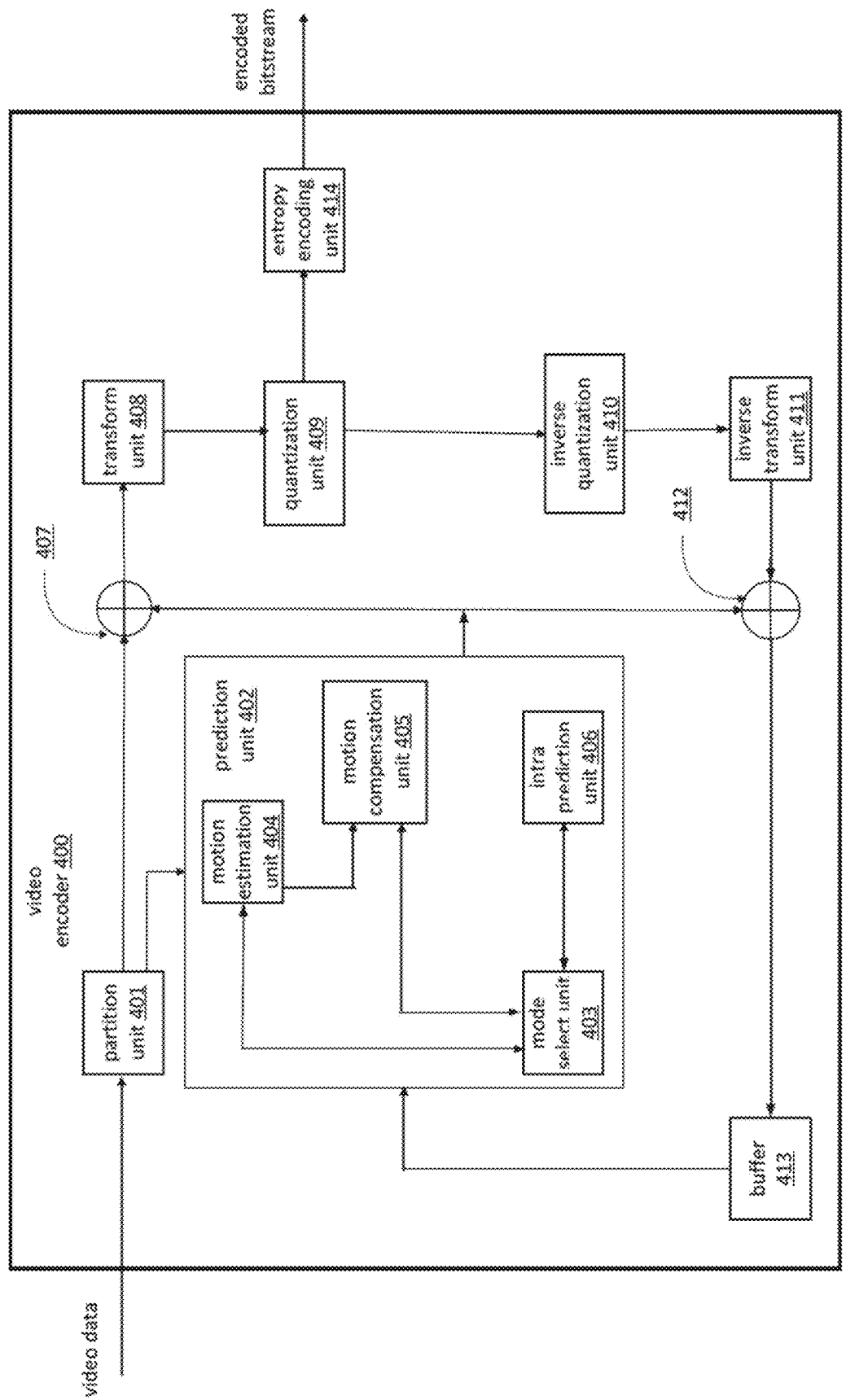
FIG. 19 is a block diagram that illustrates an example encoder.

FIG. 19 is a block diagram illustrating an example of video encoder 400, which may be video encoder 314 in the system 300 illustrated in FIG. 18.

Video encoder 400 may be configured to perform any or all of the techniques of this disclosure. In the example of FIG. 19, video encoder 400 includes a plurality of functional components. The techniques described in this disclosure may be shared among the various components of video encoder 400. In some examples, a processor may be configured to perform any or all of the techniques described in this disclosure.

The functional components of video encoder 400 may include a partition unit 401, a prediction unit 402 which may include a mode select unit 403, a motion estimation unit 404, a motion compensation unit 405 and an intra prediction unit 406, a residual generation unit 407, a transform unit 408, a quantization unit 409, an inverse quantization unit 410, an inverse transform unit 411, a reconstruction unit 412, a buffer 413, and an entropy encoding unit 414.

In other examples, video encoder 400 may include more, fewer, or different functional components. In an example, prediction unit 402 may include an intra block copy(IBC) unit. The IBC unit may perform prediction in an IBC mode in which at least one reference picture is a picture where the current video block is located.

Furthermore, some components, such as motion estimation unit 404 and motion compensation unit 405 may be highly integrated, but are represented in the example of FIG. 19 separately for purposes of explanation.

Partition unit 401 may partition a picture into one or more video blocks. Video encoder 400 and video decoder 500 may support various video block sizes.

Mode select unit 403 may select one of the coding modes, intra or inter, e.g., based on error results, and provide the resulting intra- or inter-coded block to a residual generation unit 407 to generate residual block data and to a reconstruction unit 412 to reconstruct the encoded block for use as a reference picture. In some example, mode select unit 403 may select a combination of intra and inter prediction (CIIP) mode in which the prediction is based on an inter prediction signal and an intra prediction signal. Mode select unit 403 may also select a resolution for a motion vector (e.g., a sub-pixel or integer pixel precision) for the block in the case of inter-prediction.

To perform inter prediction on a current video block, motion estimation unit 404 may generate motion information for the current video block by comparing one or more reference frames from buffer 413 to the current video block. Motion compensation unit 405 may determine a predicted video block for the current video block based on the motion information and decoded samples of pictures from buffer 413 other than the picture associated with the current video block.

Motion estimation unit 404 and motion compensation unit 405 may perform different operations for a current video block, for example, depending on whether the current video block is in an I slice, a P slice, or a B slice.

In some examples, motion estimation unit 404 may perform uni-directional prediction for the current video block, and motion estimation unit 404 may search reference pictures of list 0 or list 1 for a reference video block for the current video block. Motion estimation unit 404 may then generate a reference index that indicates the reference picture in list 0 or list 1 that contains the reference video block and a motion vector that indicates a spatial displacement between the current video block and the reference video block. Motion estimation unit 404 may output the reference index, a prediction direction indicator, and the motion vector as the motion information of the current video block. Motion compensation unit 405 may generate the predicted video block of the current block based on the reference video block indicated by the motion information of the current video block.

In other examples, motion estimation unit 404 may perform bi-directional prediction for the current video block, motion estimation unit 404 may search the reference pictures in list 0 for a reference video block for the current video block and may also search the reference pictures in list 1 for another reference video block for the current video block. Motion estimation unit 404 may then generate reference indexes that indicate the reference pictures in list 0 and list 1 containing the reference video blocks and motion vectors that indicate spatial displacements between the reference video blocks and the current video block. Motion estimation unit 404 may output the reference indexes and the motion vectors of the current video block as the motion information of the current video block. Motion compensation unit 405 may generate the predicted video block of the current video block based on the reference video blocks indicated by the motion information of the current video block.

In some examples, motion estimation unit 404 may output a full set of motion information for decoding processing of a decoder.

In some examples, motion estimation unit 404 may do not output a full set of motion information for the current video. Rather, motion estimation unit 404 may signal the motion information of the current video block with reference to the motion information of another video block. For example, motion estimation unit 404 may determine that the motion information of the current video block is sufficiently similar to the motion information of a neighboring video block.

In one example, motion estimation unit 404 may indicate, in a syntax structure associated with the current video block, a value that indicates to the video decoder 500 that the current video block has the same motion information as the another video block.

In another example, motion estimation unit 404 may identify, in a syntax structure associated with the current video block, another video block and a motion vector difference (MVD). The motion vector difference indicates a difference between the motion vector of the current video block and the motion vector of the indicated video block. The video decoder 500 may use the motion vector of the indicated video block and the motion vector difference to determine the motion vector of the current video block.

As discussed above, video encoder 400 may predictively signal the motion vector. Two examples of predictive signaling techniques that may be implemented by video encoder 400 include advanced motion vector prediction (AMVP) and merge mode signaling.

Intra prediction unit 406 may perform intra prediction on the current video block. When intra prediction unit 406 performs intra prediction on the current video block, intra prediction unit 406 may generate prediction data for the current video block based on decoded samples of other video blocks in the same picture. The prediction data for the current video block may include a predicted video block and various syntax elements.

Residual generation unit 407 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 407 may not perform the subtracting operation.

Transform processing unit 408 may generate one or more transform coefficient video blocks for the current video block by applying one or more transforms to a residual video block associated with the current video block.

After transform processing unit 408 generates a transform coefficient video block associated with the current video block, quantization unit 409 may quantize the transform coefficient video block associated with the current video block based on one or more quantization parameter (QP) values associated with the current video block.

Inverse quantization unit 410 and inverse transform unit 411 may apply inverse quantization and inverse transforms to the transform coefficient video block, respectively, to reconstruct a residual video block from the transform coefficient video block. Reconstruction unit 412 may add the reconstructed residual video block to corresponding samples from one or more predicted video blocks generated by the prediction unit 402 to produce a reconstructed video block associated with the current block for storage in the buffer 413.

After reconstruction unit 412 reconstructs the video block, loop filtering operation may be performed reduce video blocking artifacts in the video block.

Entropy encoding unit 414 may receive data from other functional components of the video encoder 400. When entropy encoding unit 414 receives the data, entropy encoding unit 414 may perform one or more entropy encoding operations to generate entropy encoded data and output a bitstream that includes the entropy encoded data.

Figure 20:
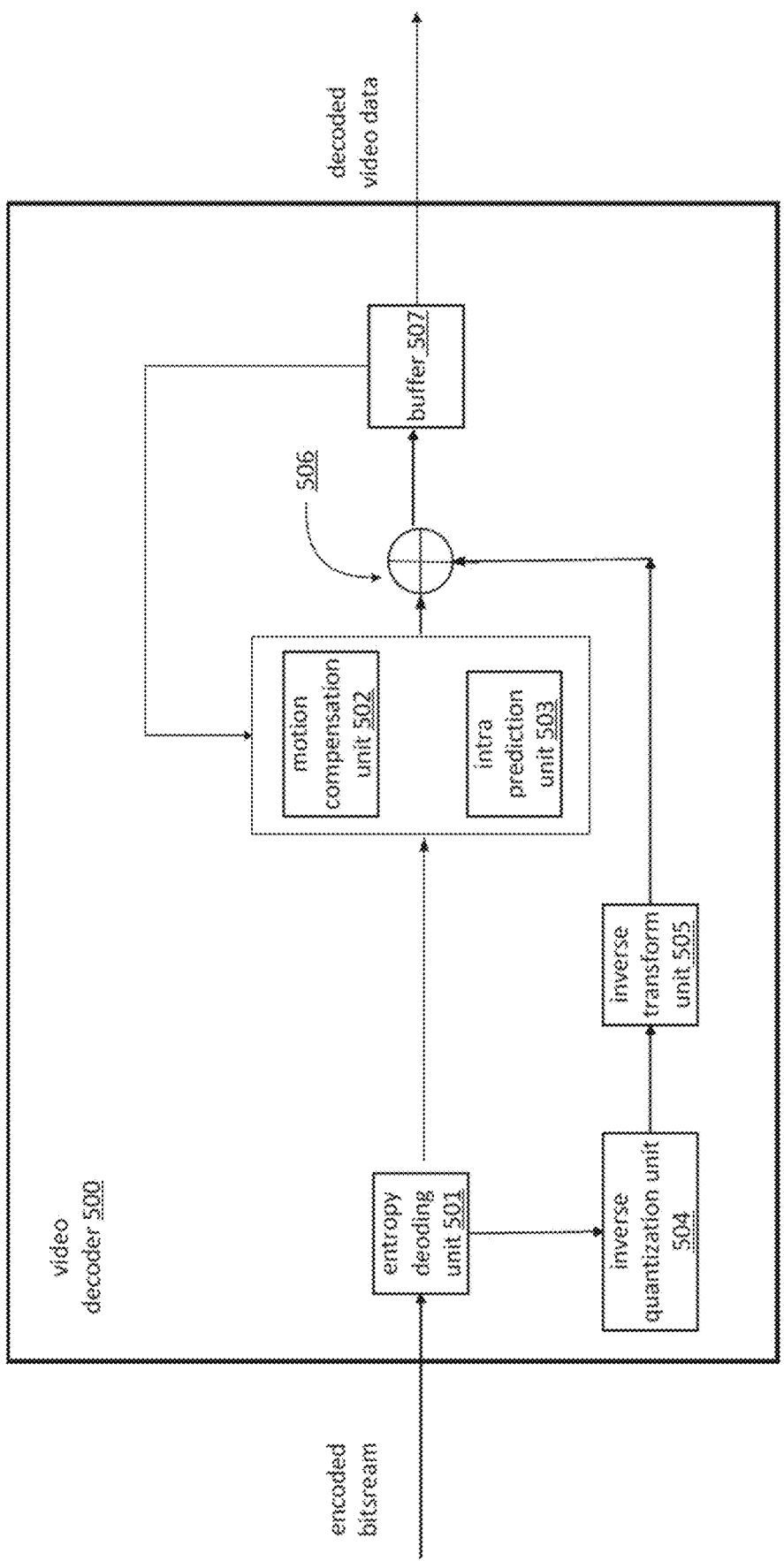
FIG. 20 is a block diagram that illustrates an example decoder.

FIG. 20 is a block diagram illustrating an example of video decoder 500 which may be video decoder 314 in the system 300 illustrated in FIG. 18.

The video decoder 500 may be configured to perform any or all of the techniques of this disclosure. In the example of FIG. 20, the video decoder 500 includes a plurality of functional components. The techniques described in this disclosure may be shared among the various components of the video decoder 500. In some examples, a processor may be configured to perform any or all of the techniques described in this disclosure.

In the example of FIG. 20, video decoder 500 includes an entropy decoding unit 501, a motion compensation unit 502, an intra prediction unit 503, an inverse quantization unit 504, an inverse transformation unit 505, and a reconstruction unit 506 and a buffer 507. Video decoder 500 may, in some examples, perform a decoding pass generally reciprocal to the encoding pass described with respect to video encoder 400 (FIG. 19).

Entropy decoding unit 501 may retrieve an encoded bitstream. The encoded bitstream may include entropy coded video data (e.g., encoded blocks of video data). Entropy decoding unit 501 may decode the entropy coded video data, and from the entropy decoded video data, motion compensation unit 502 may determine motion information including motion vectors, motion vector precision, reference picture list indexes, and other motion information. Motion compensation unit 502 may, for example, determine such information by performing the AMVP and merge mode.

Motion compensation unit 502 may produce motion compensated blocks, possibly performing interpolation based on interpolation filters. Identifiers for interpolation filters to be used with sub-pixel precision may be included in the syntax elements.

Motion compensation unit 502 may use interpolation filters as used by video encoder 400 during encoding of the video block to calculate interpolated values for sub-integer pixels of a reference block. Motion compensation unit 502 may determine the interpolation filters used by video encoder 400 according to received syntax information and use the interpolation filters to produce predictive blocks.

Motion compensation unit 502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 503 may use intra prediction modes for example received in the bitstream to form a prediction block from spatially adjacent blocks. Inverse quantization unit 504 inverse quantizes, i.e., de-quantizes, the quantized video block coefficients provided in the bitstream and decoded by entropy decoding unit 501. Inverse transform unit 505 applies an inverse transform.

Reconstruction unit 506 may sum the residual blocks with the corresponding prediction blocks generated by motion compensation unit 502 or intra-prediction unit 503 to form decoded blocks. If desired, a deblocking filter may also be applied to filter the decoded blocks in order to remove blockiness artifacts. The decoded video blocks are then stored in buffer 507, which provides reference blocks for subsequent motion compensation/intra prediction and also produces decoded video for presentation on a display device.

Figure 21:
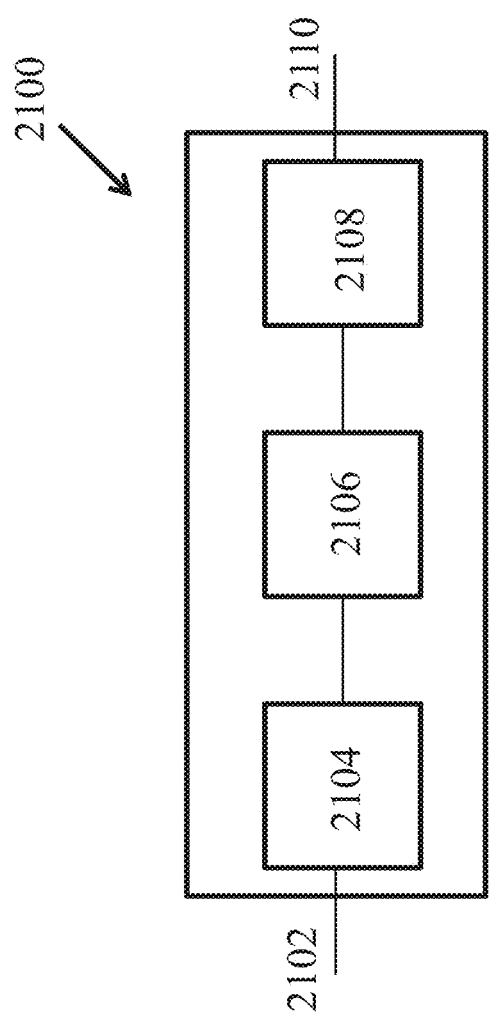
FIG. 21 is a block diagram of an example video processing system in which disclosed techniques may be implemented.

FIG. 21 is a block diagram showing an example video processing system 2100 in which various techniques disclosed herein may be implemented. Various implementations may include some or all of the components of the system 2100. The system 2100 may include input 2102 for receiving video content. The video content may be received in a raw or uncompressed format, e.g., 8 or 10 bit multi-component pixel values, or may be in a compressed or encoded format. The input 2102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2100 may include a coding component 2104 that may implement the various coding or encoding methods described in the present document. The coding component 2104 may reduce the average bitrate of video from the input 2102 to the output of the coding component 2104 to produce a coded representation of the video. The coding techniques are therefore sometimes called video compression or video transcoding techniques. The output of the coding component 2104 may be either stored, or transmitted via a communication connected, as represented by the component 2106. The stored or communicated bitstream (or coded) representation of the video received at the input 2102 may be used by the component 2108 for generating pixel values or displayable video that is sent to a display interface 2110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

FIG. 22 is a flowchart for an example method 2200 of video processing. Operation 2202 includes performing a conversion between a current video block of a video and a bitstream of the video based on a rule, wherein the rule specifies that a selection of a transform matrix set for performing a transform operation during the conversion is based on a low-frequency non-separable transform index indicated in the bitstream, wherein the rule specifies that the transform operation includes, during an encoding operation, coding the current video block into the bitstream by applying a forward transform on residual values of the current video block, or wherein the rule specifies that the transform operation includes, during a decoding operation, generating from the bitstream the current video block by applying an inverse transform to scaled coefficients indicated in the bitstream.

In some embodiments, the rule specifies whether the bitstream includes an index that indicates the transform matrix set is based on the low-frequency non-separable transform index. In some embodiments, the rule specifies that the index that indicates the transform matrix set is not included in the bitstream in response to the low-frequency non-separable transform index being equal to a specific value. In some embodiments, the specific value is equal to 1 or 2.

Figure 23:
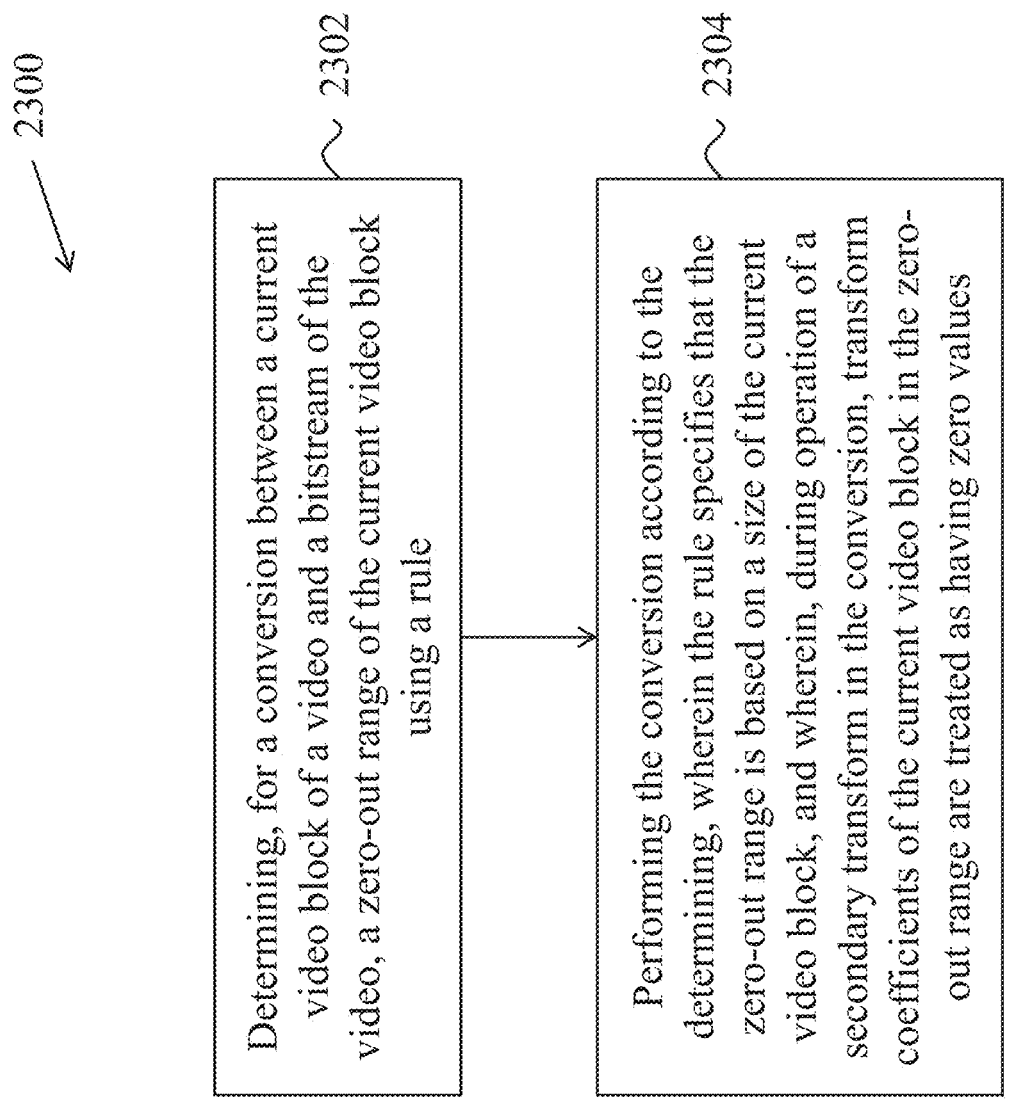

FIG. 23 is a flowchart for an example method 2300 of video processing. Operation 2302 includes determining, for a conversion between a current video block of a video and a bitstream of the video, a zero-out range of the current video block using a rule. Operation 2304 includes performing the conversion according to the determining, wherein the rule specifies that the zero-out range is based on a size of the current video block, and wherein, during operation of a secondary transform in the conversion, transform coefficients of the current video block in the zero-out range are treated as having zero values.

In some embodiments, the rule specifies that the zero-out range is a first zero-out range in response to the current video block having a first size, the rule specifies that the zero-out range is a second zero-out range in response to the current video block having a second size, the second zero-out range is different from the first zero-out range, and the second size is different from the first size. In some embodiments, the rule specifies that the zero-out range is the first zero-out range in response to the current video block having the first size that is less than or equal to M×N, wherein M and N are integers. In some embodiments, one or more transform coefficients of the current video block with a scanning order index greater than or equal to the first zero-out range are equal to zero. In some embodiments, the rule specifies that the zero-out range is the first zero-out range in response to the first size of the current video block being less than or equal to 8. In some embodiments, the first size includes a width of the current video block, or a height of the current video block, or the width and the height of the current video block.

In some embodiments, the rule specifies that the zero-out range is the second zero-out range in response to the current video block having the second size that is greater than M×N, wherein M and N are integers. In some embodiments, one or more transform coefficients of the current video block with a scanning order index greater than or equal to the second zero-out range are equal to zero. In some embodiments, the rule specifies that the zero-out range is the second zero-out range in response to the second size of the current video block being greater than 8. In some embodiments, the second size includes a width of the current video block, or a height of the current video block, or the width and the height of the current video block. In some embodiments, the rule specifies that the zero-out range is the second zero-out range in response to: (1) a width of the current video block being greater than 8 and a height of the current video block being greater than or equal to 8, or (2) the width of the current video block being greater than or equal to 8 and the height of the current video block being greater than 8. In some embodiments, the second zero-out range is 16, and wherein the first zero-out range is 8.

Figure 24:
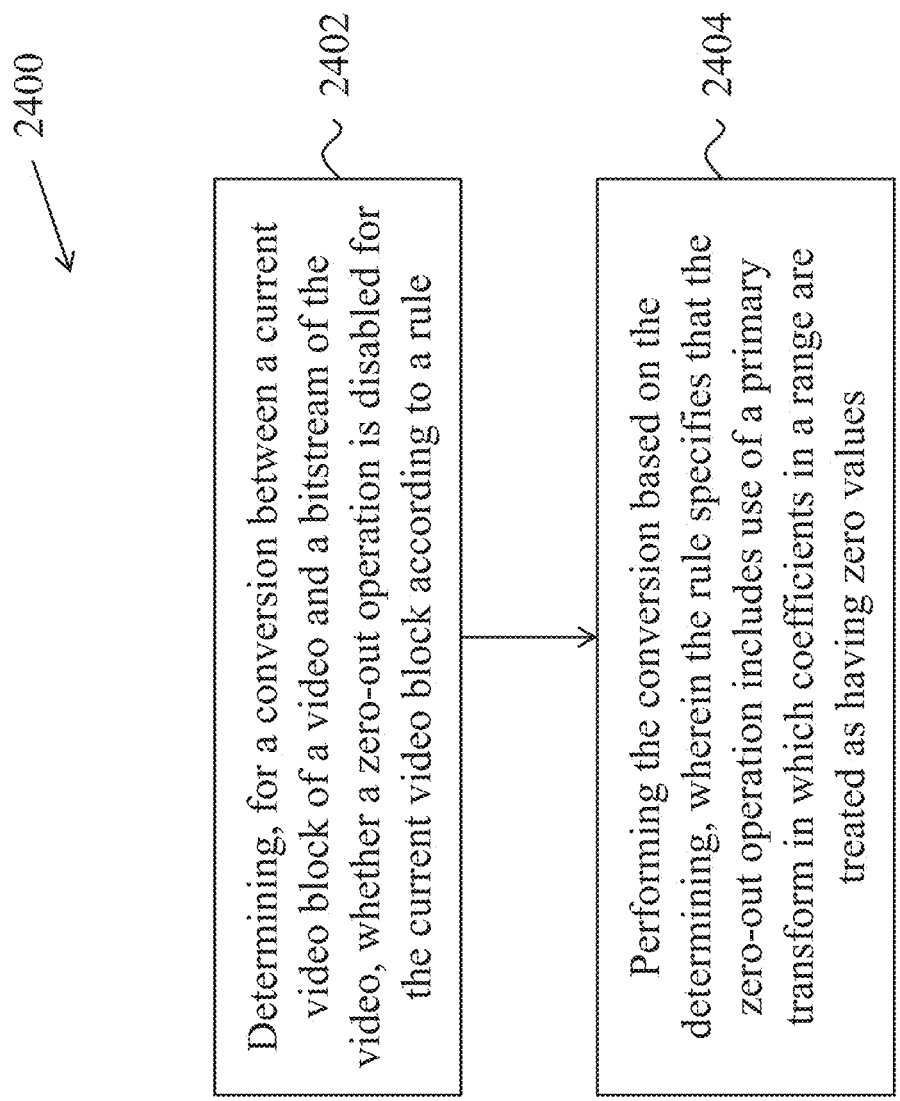

FIG. 24 is a flowchart for an example method 2400 of video processing. Operation 2402 includes determining, for a conversion between a current video block of a video and a bitstream of the video, whether a zero-out operation is disabled for the current video block according to a rule. Operation 2404 includes performing the conversion based on the determining, wherein the rule specifies that the zero-out operation includes use of a primary transform in which coefficients in a range are treated as having zero values.

In some embodiments, the primary transform includes a Discrete Cosine Transform (DCT)-II.

Figure 25:
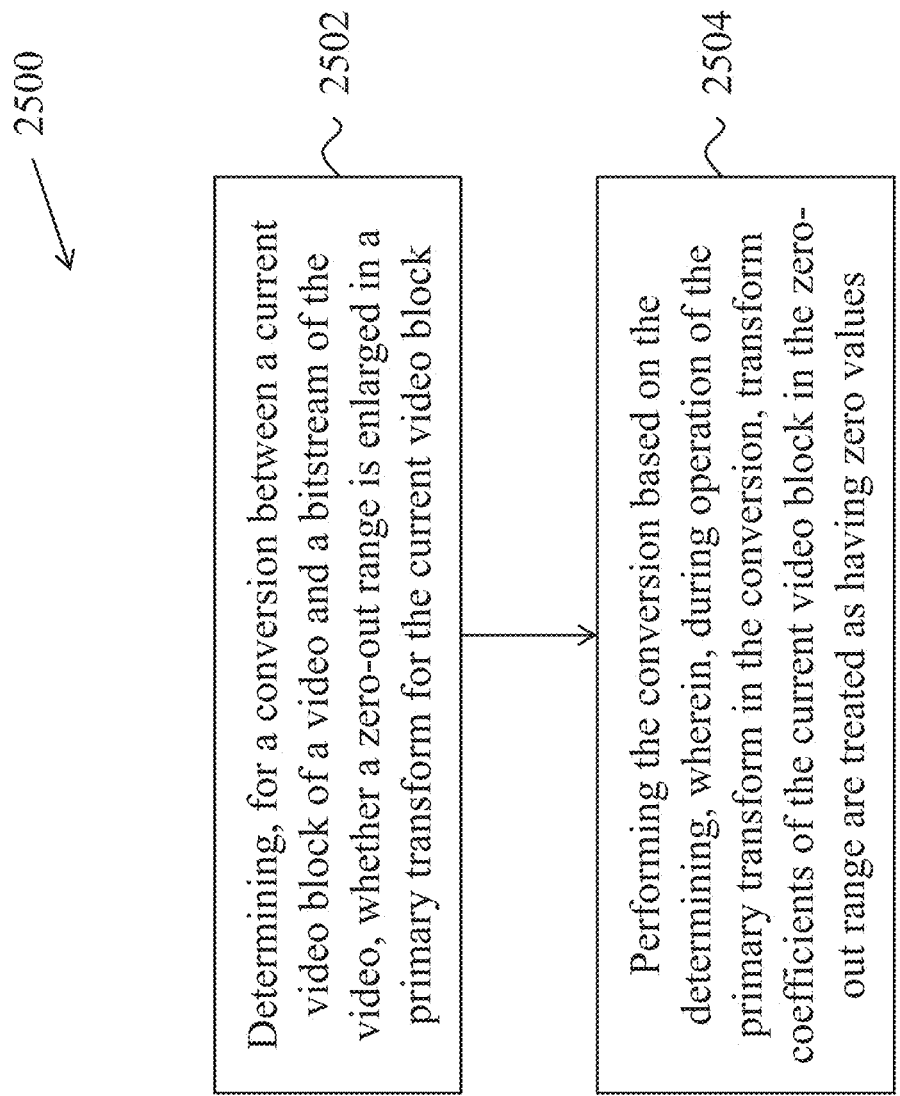

FIG. 25 is a flowchart for an example method 2500 of video processing. Operation 2502 includes determining, for a conversion between a current video block of a video and a bitstream of the video, whether a zero-out range is enlarged in a primary transform for the current video block. Operation 2504 includes performing the conversion based on the determining, wherein, during operation of the primary transform in the conversion, transform coefficients of the current video block in the zero-out range are treated as having zero values.

In some embodiments, the primary transform includes a multiple transform set (MTS). In some embodiments, the primary transform includes a Discrete Cosine Transform (DCT)-II.

Figure 26:
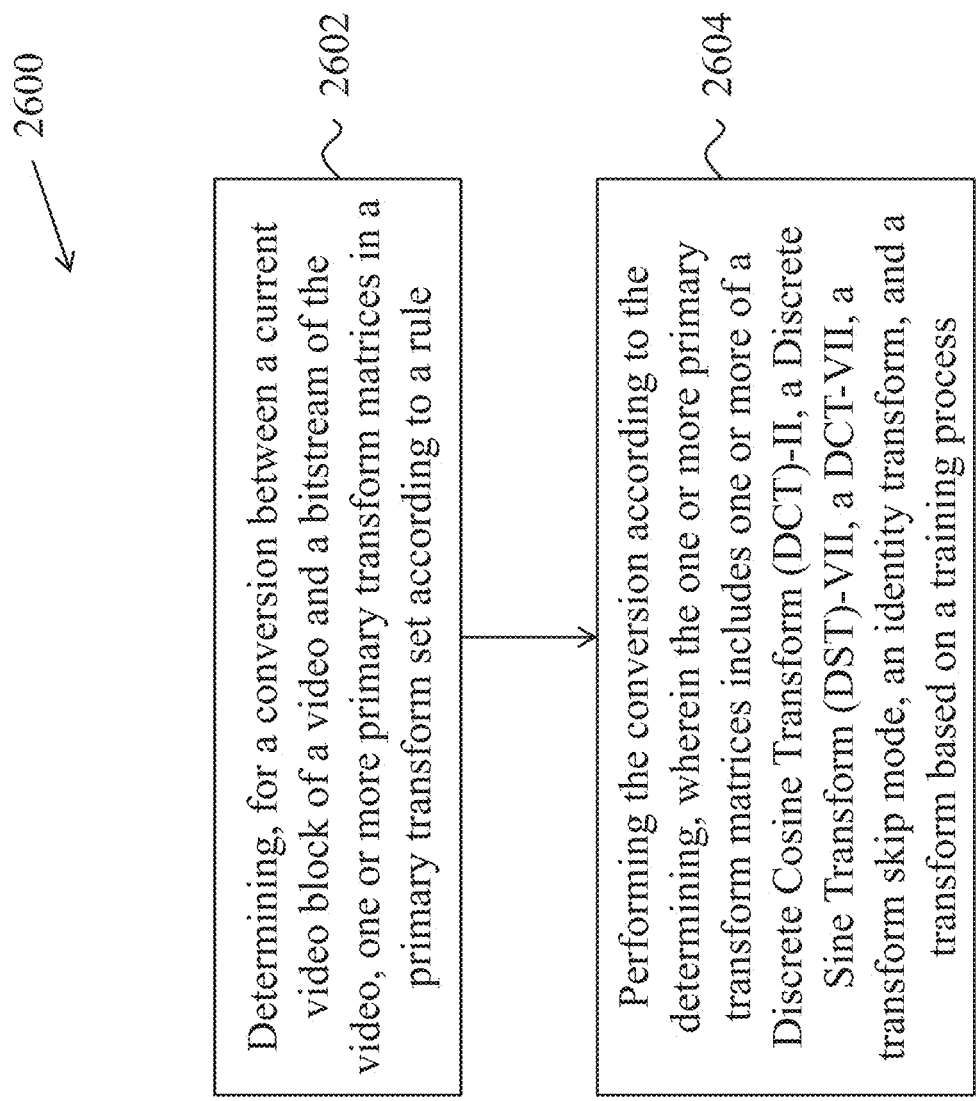

FIG. 26 is a flowchart for an example method 2600 of video processing. Operation 2602 includes determining, for a conversion between a current video block of a video and a bitstream of the video, one or more primary transform matrices in a primary transform set according to a rule. Operation 2604 includes performing the conversion according to the determining, wherein the one or more primary transform matrices includes one or more of a Discrete Cosine Transform (DCT)-II, a Discrete Sine Transform (DST)-VII, a DCT-VII, a transform skip mode, an identity transform, and a transform based on a training process.

In some embodiments, the transform based on the training process includes a transform based on a Karhunen-Loeve Transform (KLT). In some embodiments, the rule specifies that the determining the one or more primary transform matrices is based on a chroma component of the video. In some embodiments, the transform set comprises a first set of transform matrices that is used for a luma component of the video and a second set of transform matrices that is used for the chroma component of the video. In some embodiments, each color component of the video corresponds to an individual transform set. In some embodiments, the rule specifies that the determining the one or more primary transform matrices is based on a size of the current video block. In some embodiments, two or more sets of primary transform matrices are defined for different video block sizes. In some embodiments, the rule specifies that the one or more primary transform matrices from a first set are determined in response to a height and a width of the current block being less than M, or the rule specifies that the one or more primary transform matrices from a second set are determined in response to the height and the width of the current block being greater than or equal to M, and M is a positive integer. In some embodiments, the rule specifies that the one or more primary transform matrices from a first set are determined in response to a height or a width of the current block being less than M, or the rule specifies that the one or more primary transform matrices from a second set are determined in response to the height or the width of the current block being greater than or equal to M, and M is a positive integer. In some embodiments, M is equal to 8, 16, or 32.

In some embodiments, the rule specifies that the determining the one or more primary transform matrices is based on a prediction mode of the current video block. In some embodiments, two different sets of primary transform matrices are specified for an intra mode and an inter mode, respectively, wherein the prediction mode includes the intra mode or the inter mode. In some embodiments, two or more different sets of primary transform matrices are specified for an intra mode, wherein the prediction mode includes the intra mode. In some embodiments, two or more different sets of primary transform matrices are specified for an inter mode, wherein the prediction mode includes the inter mode. In some embodiments, a transformation matrix with transform dimension equal to 4, 8, 16, or 32 are included in the transform set. In some embodiments, the rule specifies that the determining the one or more primary transform matrices is based on an intra prediction mode applied to the current video block. In some embodiments, the intra prediction mode comprises an intra subblock partitioning (ISP), a matrix-based intra prediction (MIP), a multiple reference line (MRL) method, a cross-component linear model (CCLM), or block differential pulse-code modulation coding (BDPCM).

In some embodiments, two or more sets of primary transform matrices are used for different intra prediction modes. In some embodiments, a first set of transform matrices are used for a first set of video blocks on which the CCLM is applied, and wherein a second set of transform matrices are used for a second set of video blocks on which the intra prediction mode other than the CCLM is applied. In some embodiments, a first set of transform matrices are used for a first set of video blocks on which the intra prediction mode other than the MRL and the MIP is applied, and wherein a second set of transform matrices are used for a second set of video blocks on which the MRL is applied. In some embodiments, the rule specifies that the determining the one or more primary transform matrices is based on an inter prediction mode applied to the current block. In some embodiments, the inter prediction mode includes a merge mode, advanced motion vector prediction (AMVP) mode, or an affine mode. In some embodiments, two or more sets of primary transform matrices are used for different inter prediction modes. In some embodiments, a first set of transform matrices are used for a first set of video blocks on which the merge mode or an inter prediction mode is applied, and wherein a second set of transform matrices are used for a second set of video blocks on which the inter prediction mode other than the merge mode is applied.

In some embodiments, a first set of transform matrices are used for a first set of video blocks on which the AMVP mode or an inter prediction mode is applied, and wherein a second set of transform matrices are used for a second set of video blocks on which the inter prediction mode other than the AMVP mode is applied. In some embodiments, the transform set comprises a first transform set in response to a coding tool being applied to the current video block, and the transform set comprises a second transform set in response to the coding tool not being applied to the current video block. In some embodiments, the coding tool comprises an intra subblock partitioning (ISP), a matrix-based intra prediction (MIP), luma mapping with chroma scaling (LMCS), adaptive loop filtering (ALF), a sample adaptive offset (SAO), dependent quantization (DQ), Affine, symmetric motion vector difference (SMVD), a sub-block transform (SBT), adaptive motion vector resolution (AMVR), bi-directional optical flow (BDOF), prediction refinement with optical flow (PROF), decoder-side motion vector refinement (DMVR), a low-frequency non-separable transform (LFNST), local illumination compensation (LIC), overlapped block motion compensation (OBMC), a joint coding or chrominance residuals (JCCR), or an intra block copy (IBC). In some embodiments, the rule specifies that the determining the one or more primary transform matrices is based on a transform mode of the current video block. In some embodiments, the transform mode comprises an implicit multiple transform set (MTS), an explicit MTS, a sub-block transform (SBT) mode, a joint coding or chrominance residuals (JCCR), or different low-frequency non-separable transform (LFNST) indices.

In some embodiments, two or more sets of primary transform matrices are used for different transform modes. In some embodiments, a first set of transform matrices are used for the implicit MTS, and a second set of transform matrices are used for the explicit MTS. In some embodiments, a first set of transform matrices are used for the SBT, and a second set of transform matrices are used for the transform mode other than the SBT. In some embodiments, a transformation matrix with transform dimension equal to 4, 8, 16, or 32 is used for the SBT. In some embodiments, a first set of transform matrices are used for the JCCR, and a second set of transform matrices are used for the transform mode other than the JCCR.

Figure 27:
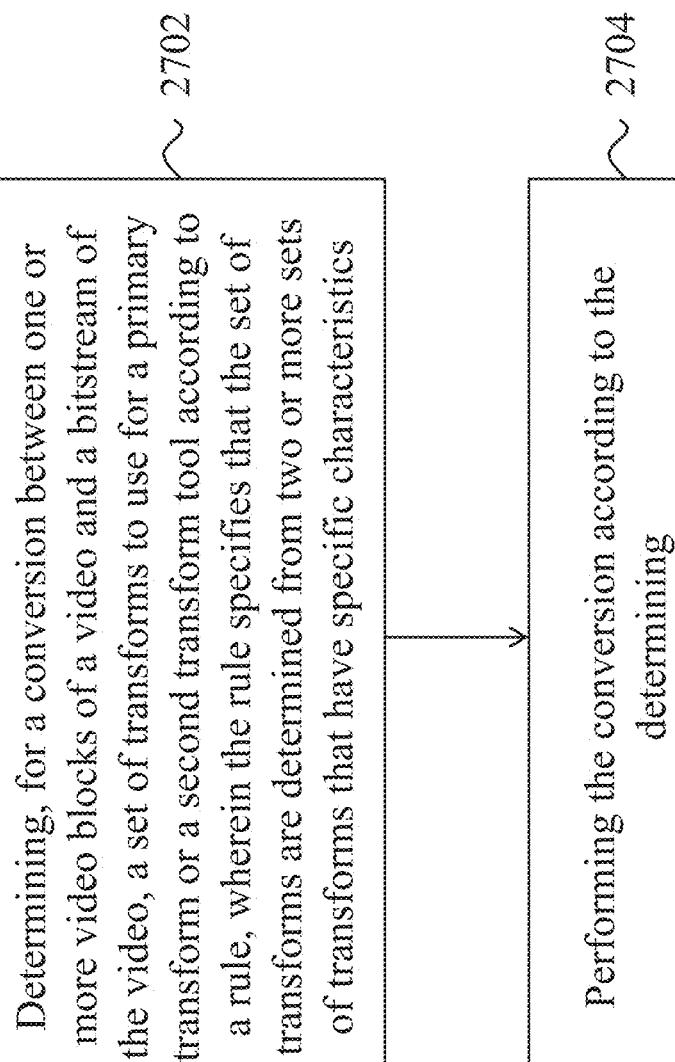

FIG. 27 is a flowchart for an example method 2700 of video processing. Operation 2702 includes determining, for a conversion between one or more video blocks of a video and a bitstream of the video, a set of transforms to use for a primary transform or a second transform tool according to a rule, wherein the rule specifies that the set of transforms are determined from two or more sets of transforms that have specific characteristics. Operation 2704 includes performing the conversion according to the determining.

In some embodiments, the two or more sets of transforms include a first set of transforms and a second set of transforms, and the second set of transforms includes one or more transforms and all transforms from the first set of transforms.

Figure 28:
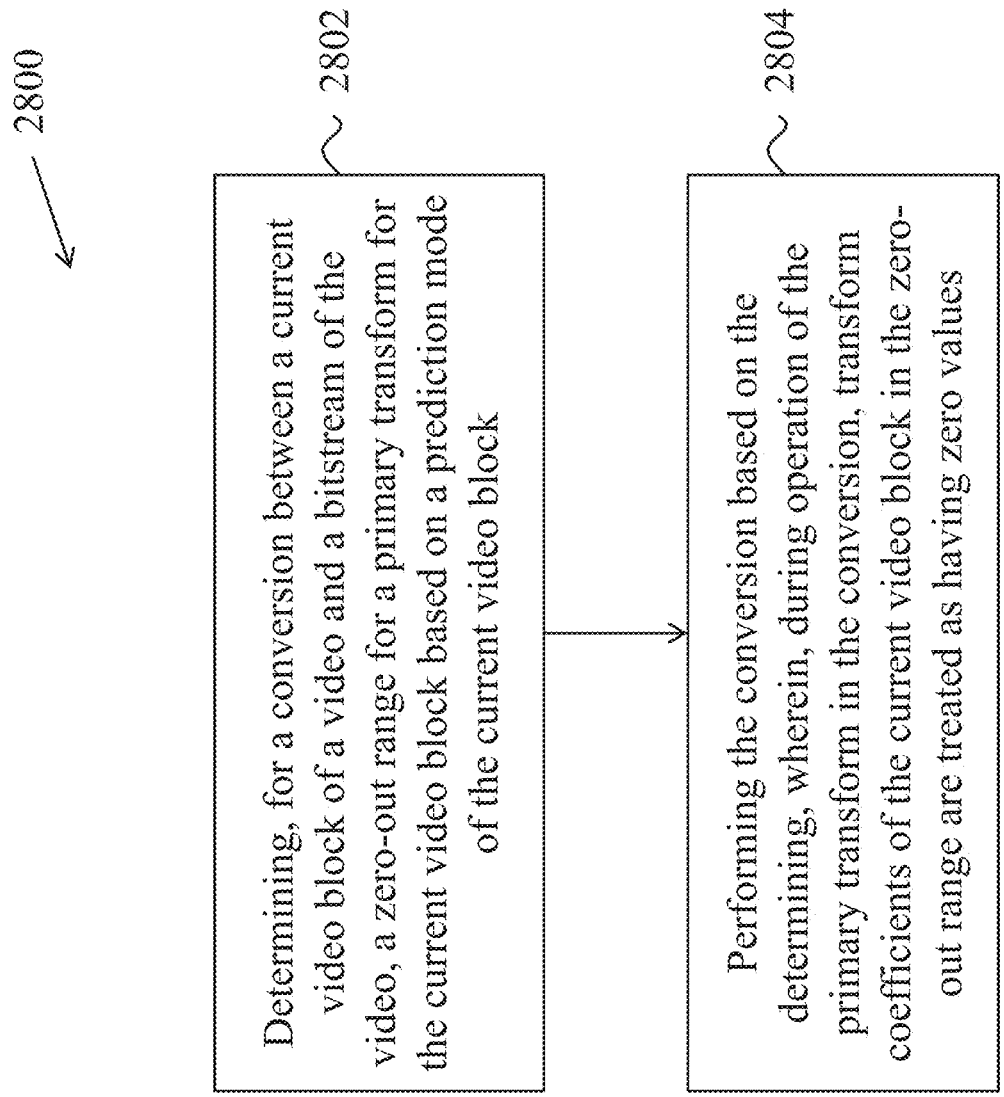

FIG. 28 is a flowchart for an example method 2800 of video processing. Operation 2802 includes determining, for a conversion between a current video block of a video and a bitstream of the video, a zero-out range for a primary transform for the current video block based on a prediction mode of the current video block. Operation 2804 includes performing the conversion based on the determining, wherein, during operation of the primary transform in the conversion, transform coefficients of the current video block in the zero-out range are treated as having zero values.

In some embodiments, the zero-out range is a first range in response to the prediction mode being an intra prediction mode, the zero-out range is a second range in response to the prediction mode being an inter prediction mode, and the first range is different than the second range.

Figure 29:
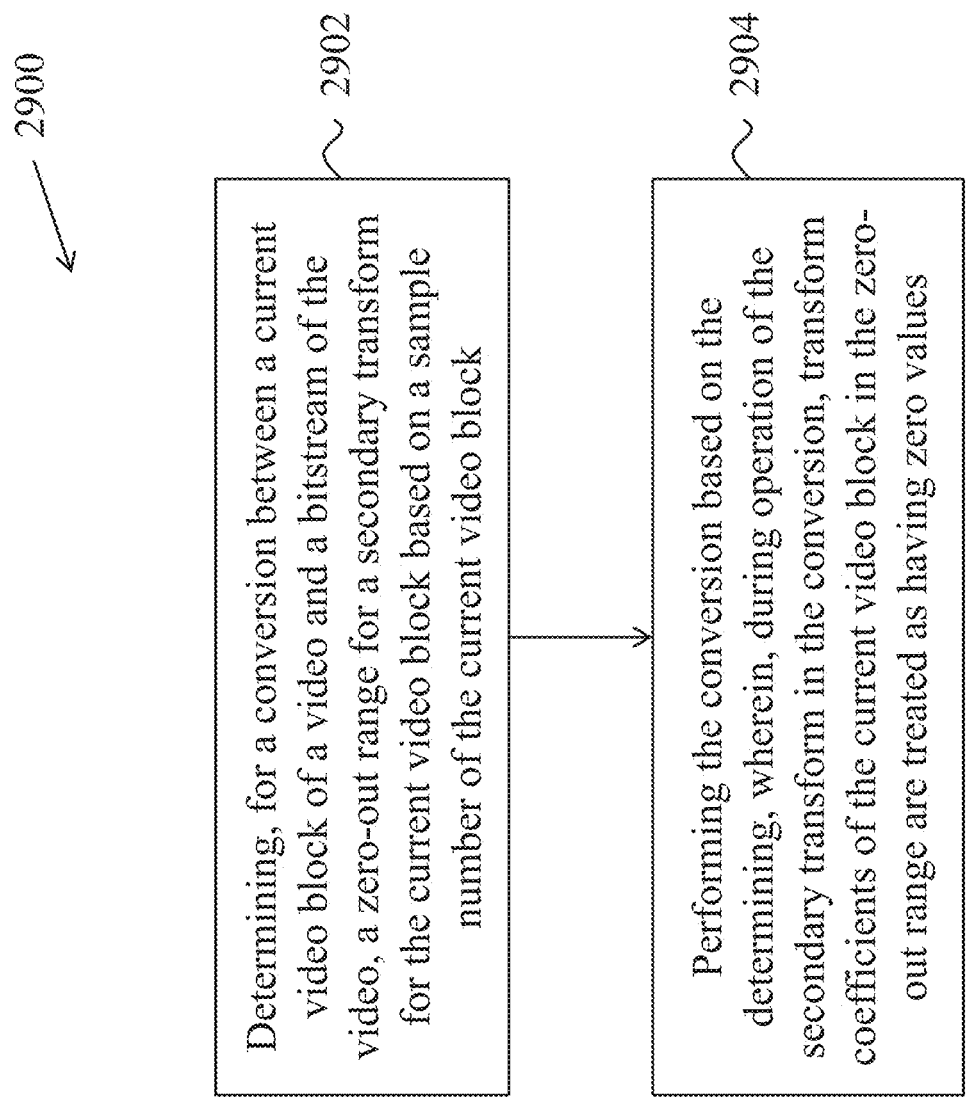

FIG. 29 is a flowchart for an example method 2900 of video processing. Operation 2902 includes determining, for a conversion between a current video block of a video and a bitstream of the video, a zero-out range for a secondary transform for the current video block based on a sample number of the current video block. Operation 2904 includes performing the conversion based on the determining, wherein, during operation of the secondary transform in the conversion, transform coefficients of the current video block in the zero-out range are treated as having zero values.

In some embodiments, the zero-out range is a first zero-out range in response to the current video block having a first sample number, the zero-out range is a second zero-our range in response to the current video block having a second sample number, the first zero-out range is different than the second zero-out range, the first sample number is different than the second sample number, and the current video block is a transform block. In some embodiments, the primary transform or the secondary transform is implemented with a butterfly computation. In some embodiments, the primary transform is used during an encoding operation during the conversion by applying a forward primary transform to a prediction error before a quantization operation or a secondary transform is performed, and the primary transform is used during a decoding operation during the conversion by applying an inverse primary transform to generate a temporary video block which is used to derive a final reconstruction block of the current video block In some embodiments, the secondary transform is used during an encoding operation during the conversion by applying a forward secondary transform to an output of a forward primary transform applied to a residual of the current video block prior to quantization, and the secondary transform is used during a decoding operation during the conversion by applying an inverse secondary transform to an output of dequantization to the current video block before applying an inverse primary transform. In some embodiments, the performing the conversion comprising encoding the video into the bitstream. In some embodiments, the performing the conversion comprises generating the bitstream from the video, and the method further comprises storing the bitstream in a non-transitory computer-readable recording medium. In some embodiments, the performing the conversion comprises decoding the video from the bitstream.

In some embodiments, a video decoding apparatus comprising a processor configured to implement a method recited for one or more of method(s) 2200 to 2900. In some embodiments, a video encoding apparatus comprising a processor configured to implement a method recited for one or more of method(s) 2200 to 2900. In some embodiments, a computer program product having computer instructions stored thereon, the instructions, when executed by a processor, causes the processor to implement a method recited for one or more of method(s) 2200 to 2900. In some embodiments, a non-transitory computer-readable storage medium that stores a bitstream generated according to the method recited for one or more of method(s) 2200 to 2900. In some embodiments, a non-transitory computer-readable storage medium storing instructions that cause a processor to implement a method recited for one or more of method(s) 2200 to 2900. In some embodiments, a method of bitstream generation, comprising: generating a bitstream of a video according to a method recited for one or more of method(s) 2200 to 2900, and storing the bitstream on a computer-readable program medium. In some embodiments, a method, an apparatus, a bitstream generated according to a disclosed method or a system described in the present document.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

From the foregoing, it will be appreciated that specific embodiments of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any embodiments or of what may be claimed, but rather as descriptions of features that may be specific to particular embodiments of particular examples. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
   determining, for a conversion between a current video block of a video and a bitstream of the video, a zero-out range of the current video block using a rule; and
   performing the conversion according to the determining,
   wherein the rule specifies that the zero-out range is based on a size of the current video block,
   wherein, during operation of a secondary transform in the conversion, transform coefficients of the current video block in the zero-out range are treated as having zero values,
   wherein the rule specifies that the zero-out range is a first zero-out range when the current video block has a first size,
   wherein the rule specifies that the zero-out range is a second zero-out range when the current video block has a second size,
   wherein the second zero-out range is different from the first zero-out range,
   wherein the second size is different from the first size,
   wherein the rule specifies that a selection of a transform kernel for performing a primary transform operation during the conversion is based on a first index of the secondary transform indicated in the bitstream, and
   wherein the secondary transform is a low frequency non-separable transform (LFNST), and the first index is an index for the LFNST;
   wherein the rule specifies whether the bitstream includes a second index that indicates the selection of the transform kernel is based on the first index of the secondary transform, and the second index is an index for a multiple transform selection (MTS); and
   wherein the rule specifies that the second index is not included in the bitstream when the first index is equal to a specific value.

2. The method of claim 1, wherein when the zero-out range is the first zero-out range, one or more transform coefficients of the current video block with a scanning order index greater than or equal to the first zero-out range are equal to zero.

3. The method of claim 1, wherein when the zero-out range is the second zero-out range, one or more transform coefficients of the current video block with a scanning order index greater than or equal to the second zero-out range are equal to zero.

4. The method of claim 1, wherein the rule specifies that the zero-out range is the first zero-out range when the current video block has the first size and the first size is equal to 4×4 or equal to 8×8.

5. The method of claim 1, wherein the rule specifies that the zero-out range is the second zero-out range when the current video block has the second size such that:
   (1) a width of the current video block is greater than 8 and a height of the current video block is greater than or equal to 8, or
   (2) the width of the current video block is greater than or equal to 8 and the height of the current video block is greater than 8.

6. The method of claim 1, wherein the second zero-out range is 16, and wherein the first zero-out range is 8.

7. The method of claim 1, wherein the rule specifies that the primary transform operation includes, during an encoding operation, coding the current video block into the bitstream by applying a forward primary transform on residual values of the current video block, or wherein the rule specifies that the primary transform operation includes, during a decoding operation, generating residual values of the current video block by applying an inverse primary transform to scaled coefficients indicated in the bitstream.

8. The method of claim 1, wherein the specific value is equal to 1 or 2.

9. The method of claim 1, wherein the performing the conversion comprises encoding the video into the bitstream.

10. The method of claim 1, wherein the performing the conversion comprises decoding the video from the bitstream.

11. An apparatus for processing video data comprising a processor and a non-transitory memory with instructions thereon, wherein the instructions upon execution by the processor, cause the processor to:
    determine, for a conversion between a current video block of a video and a bitstream of the video, a zero-out range of the current video block using a rule; and
    perform the conversion according to the determining,
    wherein the rule specifies that the zero-out range is based on a size of the current video block,
    wherein, during operation of a secondary transform in the conversion, transform coefficients of the current video block in the zero-out range are treated as having zero values,
    wherein the rule specifies that the zero-out range is a first zero-out range when the current video block has a first size,
    wherein the rule specifies that the zero-out range is a second zero-out range when the current video block has a second size,
    wherein the second zero-out range is different from the first zero-out range,
    wherein the second size is different from the first size,
    wherein the rule specifies that a selection of a transform kernel for performing a primary transform operation during the conversion is based on a first index of the secondary transform indicated in the bitstream, and
    wherein the secondary transform is a low frequency non-separable transform (LFNST), and the first index is an index for the LFNST;
    wherein the rule specifies whether the bitstream includes a second index that indicates the selection of the transform kernel is based on the first index of the secondary transform, and the second index is an index for a multiple transform selection (MTS); and
    wherein the rule specifies that the second index is not included in the bitstream when the first index is equal to a specific value.

12. The apparatus of claim 11, wherein when the zero-out range is the first zero-out range, one or more transform coefficients of the current video block with a scanning order index greater than or equal to the first zero-out range are equal to zero,
    wherein when the zero-out range is the second zero-out range, one or more transform coefficients of the current video block with a scanning order index greater than or equal to the second zero-out range are equal to zero,
    wherein the rule specifies that the zero-out range is the first zero-out range when the current video block has the first size and the first size is equal to 4×4 or equal to 8×8, wherein the rule specifies that the zero-out range is the second zero-out range when the current video block has the second size such that:
(1) a width of the current video block is greater than 8 and a height of the current video block is greater than or equal to 8, or
(2) the width of the current video block is greater than or equal to 8 and the height of the current video block is greater than 8, and
wherein the second zero-out range is 16, and wherein the first zero-out range is 8.

13. The apparatus of claim 11,
wherein the rule specifies that the primary transform operation includes, during an encoding operation, coding the current video block into the bitstream by applying a forward primary transform on residual values of the current video block, or wherein the rule specifies that the primary transform operation includes, during a decoding operation, generating residual values of the current video block by applying an inverse primary transform to scaled coefficients indicated in the bitstream, and
wherein the specific value is equal to 1 or 2.

14. A non-transitory computer-readable storage medium storing instructions that cause a processor to:
determine, for a conversion between a current video block of a video and a bitstream of the video, a zero-out range of the current video block using a rule; and
perform the conversion according to the determining,
wherein the rule specifies that the zero-out range is based on a size of the current video block,
wherein, during operation of a secondary transform in the conversion, transform coefficients of the current video block in the zero-out range are treated as having zero values,
wherein the rule specifies that the zero-out range is a first zero-out range when the current video block has a first size,
wherein the rule specifies that the zero-out range is a second zero-out range when the current video block has a second size,
wherein the second zero-out range is different from the first zero-out range,
wherein the second size is different from the first size,
wherein the rule specifies that a selection of a transform kernel for performing a primary transform operation during the conversion is based on a first index of the secondary transform indicated in the bitstream, and
wherein the secondary transform is a low frequency non-separable transform (LFNST), and the first index is an index for the LFNST;
wherein the rule specifies whether the bitstream includes a second index that indicates the selection of the transform kernel is based on the first index of the secondary transform, and the second index is an index for a multiple transform selection (MTS); and
wherein the rule specifies that the second index is not included in the bitstream when the first index is equal to a specific value.

15. The non-transitory computer-readable storage medium of claim 14, wherein when the zero-out range is the first zero-out range, one or more transform coefficients of the current video block with a scanning order index greater than or equal to the first zero-out range are equal to zero,
wherein when the zero-out range is the second zero-out range, one or more transform coefficients of the current video block with a scanning order index greater than or equal to the second zero-out range are equal to zero,
wherein the rule specifies that the zero-out range is the first zero-out range when the current video block has the first size and the first size is equal to 4×4 or equal to 8×8,
wherein the rule specifies that the zero-out range is the second zero-out range when the current video block has the second size such that:
(1) a width of the current video block is greater than 8 and a height of the current video block is greater than or equal to 8, or
(2) the width of the current video block is greater than or equal to 8 and the height of the current video block is greater than 8, and
wherein the second zero-out range is 16, and wherein the first zero-out range is 8.

16. A non-transitory computer-readable recording medium storing a bitstream of a video which is generated by a method performed by a video processing apparatus, wherein the method comprises:
determining, for a current video block of the video, a zero-out range of the current video block using a rule; and
generating the bitstream based on the determining,
wherein the rule specifies that the zero-out range is based on a size of the current video block,
wherein, during operation of a secondary transform in the generation, transform coefficients of the current video block in the zero-out range are treated as having zero values,
wherein the rule specifies that the zero-out range is a first zero-out range when the current video block has a first size,
wherein the rule specifies that the zero-out range is a second zero-out range when the current video block has a second size,
wherein the second zero-out range is different from the first zero-out range,
wherein the second size is different from the first size;
wherein the rule specifies that a selection of a transform kernel for performing a primary transform operation during a conversion is based on a first index of the secondary transform indicated in the bitstream, and
wherein the secondary transform is a low frequency non-separable transform (LFNST), and the first index is an index for the LFNST;
wherein the rule specifies whether the bitstream includes a second index that indicates the selection of the transform kernel is based on the first index of the secondary transform, and the second index is an index for a multiple transform selection (MTS); and
wherein the rule specifies that the second index is not included in the bitstream when the first index is equal to a specific value.

17. The non-transitory computer-readable recording medium of claim 16, wherein when the zero-out range is the first zero-out range, one or more transform coefficients of the current video block with a scanning order index greater than or equal to the first zero-out range are equal to zero,
wherein when the zero-out range is the second zero-out range, one or more transform coefficients of the current video block with a scanning order index greater than or equal to the second zero-out range are equal to zero, wherein the rule specifies that the zero-out range is the first zero-out range when the current video block has the first size and the first size is equal to 4×4 or equal to 8×8, wherein the rule specifies that the zero-out range is the second zero-out range when the current video block has the second size such that:

(1) a width of the current video block is greater than 8 and a height of the current video block is greater than or equal to 8, or (2) the width of the current video block is greater than or equal to 8 and the height of the current video block is greater than 8, and wherein the second zero-out range is 16, and wherein the first zero-out range is 8.

* * * * *